(12) United States Patent
Yahata et al.

(10) Patent No.: US 7,844,355 B2
(45) Date of Patent: Nov. 30, 2010

(54) STREAM REPRODUCTION DEVICE AND STREAM SUPPLY DEVICE

(75) Inventors: Hiroshi Yahata, Osaka (JP); Tomoyuki Okada, Nara (JP); Akihisa Kawamura, Osaka (JP)

(73) Assignee: Panasonic Corporation, Osaka (JP)

( * ) Notice: Subject to any disclaimer, the term of this patent is extended or adjusted under 35 U.S.C. 154(b) by 993 days.

(21) Appl. No.: 11/629,439

(22) PCT Filed: Feb. 17, 2006

(86) PCT No.: PCT/JP2006/302854

§ 371 (c)(1),
(2), (4) Date: Dec. 13, 2006

(87) PCT Pub. No.: WO2006/088145

PCT Pub. Date: Aug. 24, 2006

(65) Prior Publication Data

US 2007/0225840 A1    Sep. 27, 2007

(30) Foreign Application Priority Data

Feb. 18, 2005   (JP) .............................. 2005-041975

(51) Int. Cl.
*G06F 17/00* (2006.01)
(52) U.S. Cl. ...................................................... 700/94
(58) Field of Classification Search .................... 700/94
See application file for complete search history.

(56) References Cited

U.S. PATENT DOCUMENTS 6,490,627 B1 * 12/2002 Kalra et al. ................. 709/231

| | | |
|---|---|---|
| 2004/0228621 A1 | 11/2004 | Imoto |
| 2005/0013208 A1 | 1/2005 | Hirabayashi et al. |
| 2005/0152452 A1 | 7/2005 | Suzuki |
| 2006/0288851 A1 | 12/2006 | Kawamura et al. |
| 2007/0225840 A1 | 9/2007 | Yahata et al. |
| 2008/0063071 A1 | 3/2008 | Suzuki |
| 2008/0063072 A1 | 3/2008 | Suzuki |
| 2008/0069225 A1 | 3/2008 | Suzuki |
| 2008/0075171 A1 | 3/2008 | Suzuki |

FOREIGN PATENT DOCUMENTS

| | | |
|---|---|---|
| JP | 9-282848 | 10/1997 |
| JP | 10-222928 | 8/1998 |
| JP | 2001-023302 | 1/2001 |
| JP | 2002-251827 | 9/2002 |
| JP | 2004-48396 | 2/2004 |
| JP | 2004-227630 | 8/2004 |
| JP | 2004-260384 | 9/2004 |
| JP | 2004-303324 | 10/2004 |
| JP | 2006-527864 | 12/2006 |
| WO | 2004/008775 | 1/2004 |
| WO | 2006/088145 A1 | 8/2006 |

* cited by examiner

*Primary Examiner*—Andrew C Flanders
(74) *Attorney, Agent, or Firm*—Panasonic Patent Center; Dhiren Odedra; Kerry Culpepper

(57) ABSTRACT

A stream playback device for playing back an audio stream including audio frames which are each made up of base data and extension data is provided. The stream playback device includes a decoder and an interface unit operable to receive the audio stream supplied from a stream supply device. The stream playback device notifies the stream supply device whether only the base data or both the base data and the extension data are usable in decoding of the audio stream by the decoder, through the interface unit.

5 Claims, 45 Drawing Sheets

FIG. 13

| PID value | corresponding stream |
|---|---|
| 0x0100 | program_map |
| 0x1001 | PCR |
| 0x1011 | video stream |
| 0x1100~0x111F | Primary audio stream |
| 0x1200~0x121F | PG stream |
| 0x1400~0x141F | IG stream |
| 0x1A00~0x1A1F | Secondary audio stream |

FIG. 14A
structure of Secondary audio stream
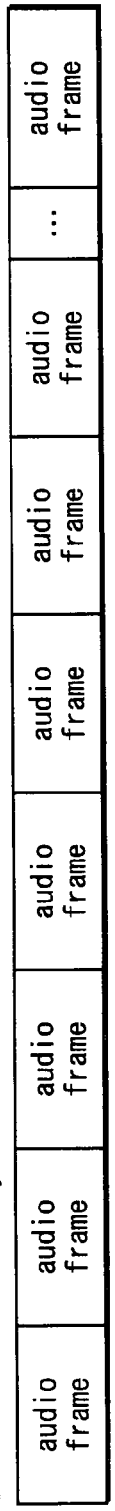
FIG. 14B  audio frame
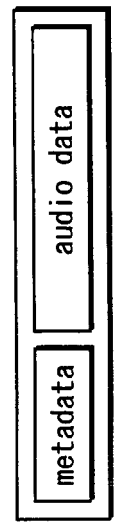
FIG. 14C
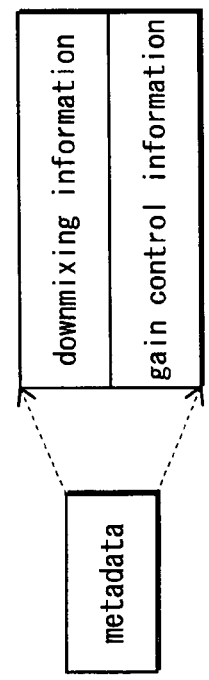
FIG. 14D  gain control information
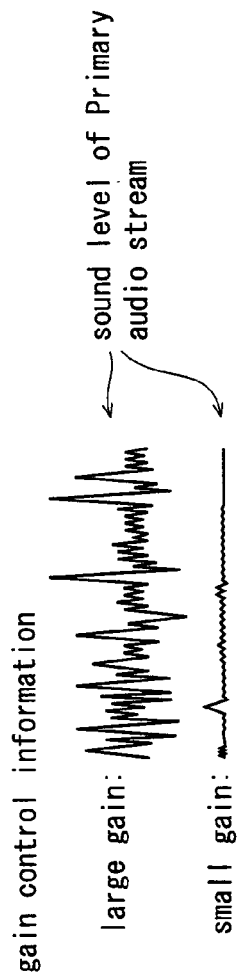

FIG. 20

STN_table

| | |
|---|---|
| | number_of_video_stream_entries |
| | number_of_audio_stream_entries |
| | number_of_PG_stream_entries |
| video_stream playable in PlayItem | number_of_IG_stream_entries |
| | entry-attribute |
| | entry-attribute |
| | entry-attribute |
| Primary audio stream playable in PlayItem | entry-attribute |
| | entry-attribute |
| | ⋮ |
| | entry-attribute |
| | entry-attribute |
| | Comb_info_Secondary_audio_Primary_audio |
| | entry-attribute |
| Secondary audio stream playable in PlayItem | Comb_info_Secondary_audio_Primary_audio |
| | ⋮ |
| | entry-attribute |
| | Comb_info_Secondary_audio_Primary_audio |
| | entry-attribute |
| | entry-attribute |
| PG_stream playable in PlayItem | entry-attribute |
| | entry-attribute |
| | ⋮ |
| | entry-attribute |
| IG_stream playable in PlayItem | entry-attribute |
| | entry-attribute |

FIG. 21A

| video stream | |
|---|---|
| Video_format | |
| frame_rate | |

FIG. 21B

| audio stream | |
|---|---|
| Stream_coding_type | |
| Format_depending_coding_type | |
| audio_presentation_type | |
| Sampling_frequency | |
| audio_language_code | |

FIG. 21C

| ref_to_Stream_PID_of_Main_Clip |
|---|

FIG. 21D

| ref_to_Sub_Path_id |
|---|
| ref_to_Sub_Clip_entry_id |
| ref_to_Stream_PID_of_Sub_Clip |

FIG. 21E

| Comb_info_Secondary_audio_Primary_audio |
|---|

| | Primary audio stream combinable with Secondary audio stream |
|---|---|
| number_of_Primary_audio_ref_entries | |
| Primary_audio_Stream_id_ref[0] | |
| Primary_audio_Stream_id_ref[1] | |
| Primary_audio_Stream_id_ref[2] | |
| Primary_audio_Stream_id_ref[3] | |
| ... | |
| Primary_audio_Stream_id_ref[n] | |

FIG. 26A

| DIB |
|---|
| CODING TYPE |
| Format depending coding type |
| Channel Count |
| Channel/Speaker Allocation |
| SampleFrequency |

FIG. 26B

| CODING TYPE | DTS-HD | or | MLP | or | DD+ |
|---|---|---|---|---|---|
| Format depending coding type | Base | or Level1 or Level2 or Level3 | | | |
| Channel Count | 5.1ch | or | 7.1ch | or | 2ch |
| Channel/Speaker Allocation | L/R/C/LS/RS/LFE | or | L/R/C/LS/RS/LR/RR/LFE | or | L/R |
| Sample Frequency | 48kHz | or | 96kHz | or | 192kHz |

DIB

FIG. 29

|   | 7 | 6 | 5 | 4 | 3 | 2 | 1 | 0 |
|---|---|---|---|---|---|---|---|---|
| first Byte | \multicolumn{3}{c}{CT} | | | Rsvd | \multicolumn{3}{c}{CC} | | |

| | 7  6  5  4  3  2  1  0 |
|---|---|
| first Byte | CT / Rsvd / CC |
| second Byte | Reserved / SF / SS |
| third Byte | Format depending coding type |
| fourth Byte | CA |
| fifth Byte | DM-INH / LSV / Reserved |
| sixth Byte | Reserved |
| seventh Byte | Reserved |
| eighth Byte | Reserved |
| ninth Byte | Reserved |
| tenth Byte | Reserved |

CT ···　0000b: Refer to Stream Header
　　　　0001B: IEC60956
　　　　0010b: AC3
　　　　0011b: MPEG1
　　　　0100b: MP3
　　　　0101b: MPEG2
　　　　0110b: AAC
　　　　0111b: DTS
　　　　1000b: ATRAC Format depending coding type
　　··· 00000001b: DTS
　　　　00000011b: DTS-ES
　　　　00000101b: DTS-96/24
　　　　00001001b: DTS-HD (XLL)

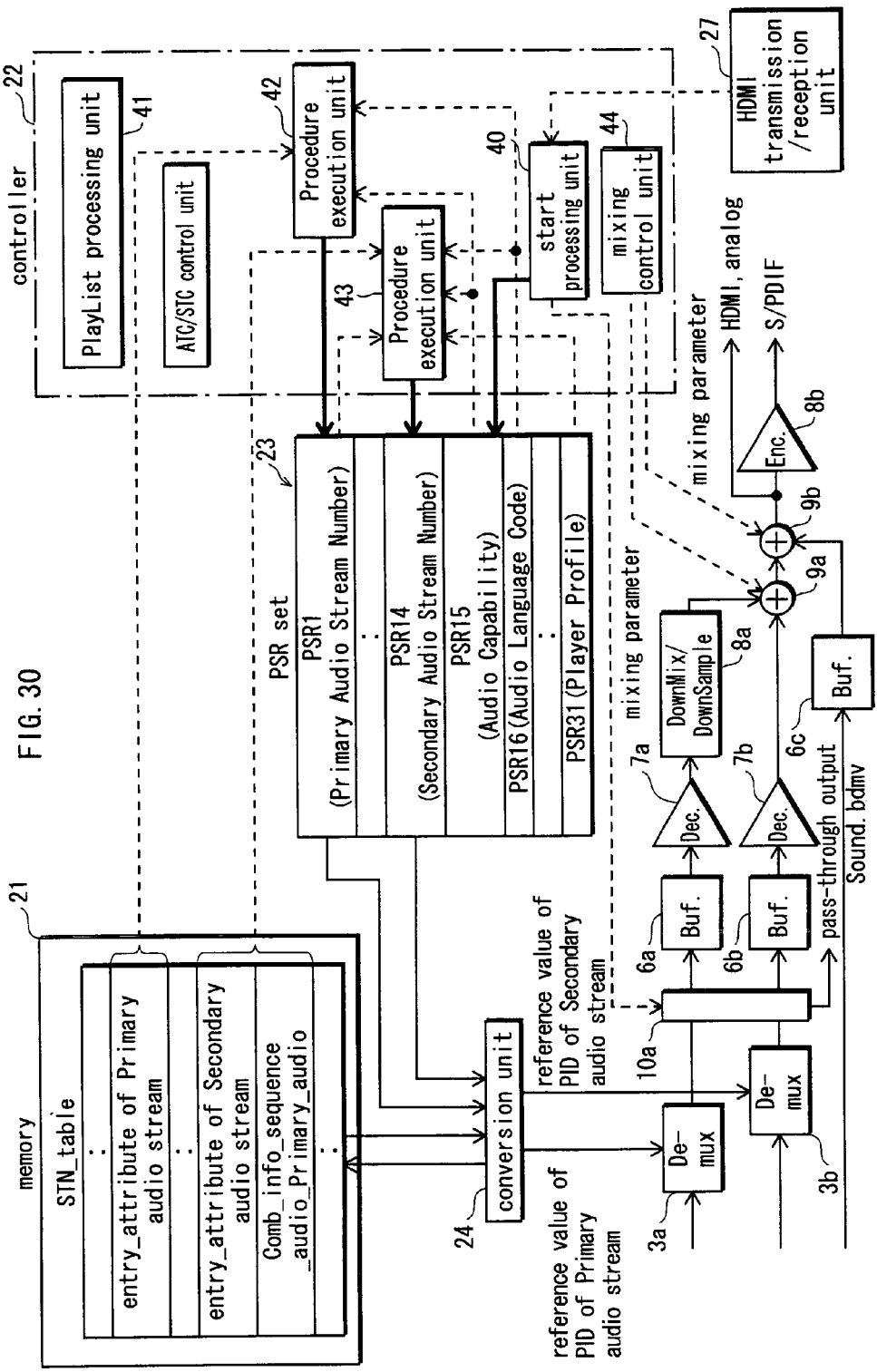

FIG. 32

PSR15: Player Capability for Audio

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | | | | DTS-HD decoder | | | |
| | | | | Extension Substream | | Core Substream | |

| b15 | b14 | b13 | b12 | b11 | b10 | b9 | b8 |
|---|---|---|---|---|---|---|---|
| DD/MLP | | | | DTS-HD capability | | | |
| MLP audio | | DD(AC-3) | | Extension Substream | | Core Substream | |

| b7 | b6 | b5 | b4 | b3 | b2 | b1 | b0 |
|---|---|---|---|---|---|---|---|
| DD/DD+ capability | | | | LPCM capability | | | |
| Dependent substream | | Independent substream | | | | | |

LPCM capability ··· 0001b: Stereo capable for 48/96kHz
0010b: Surround capable for 48/96kHz
0101b: Stereo capable for all sampling frequency
0110b: Surround capable for all sampling frequency Note: A second left bit specifies capability of decoding for 192kHz LPCM.

DD/DD+ capability
| Independent substream(AC-3) | ··· | 01b: Stereo capable |
|---|---|---|
| | | 10b: Surround capable |
| Dependent substream | | 00b: incapable |
| | | 01b: Stereo capable |
| | | 10b: Surround capable |

DTS-HD capability
| Core substream | ··· | 01b: Stereo capable |
|---|---|---|
| | | 10b: Surround capable |
| Extension substream | | 00b: incapable |
| | | 01b: Stereo capable |
| | | 10b: Surround capable |

DD/MLP capability
| DD(AC-3) | ··· | 01b: Stereo capable |
|---|---|---|
| | | 10b: Surround capable |
| MLP audio | | 00b: incapable |
| | | 01b: Stereo capable |
| | | 10b: Surround capable |

DTS-HD decoder
| Core substream | ··· | 00b: incapable |
|---|---|---|
| | | 01b: Player |
| | | 10b: Amp. |
| | | 11b: Player, Amp. |
| Extension substream | | 00b: incapable |
| | | 01b: Player |
| | | 10b: Amp. |
| | | 11b: Player, Amp. |

Status and Transition for PSR1

Status and Transition for PSR14 condition (A):
decoder is capable of
playing Secondary audio stream
specified by PSR14
condition (B):
check combination of
Primary audio stream and
Secondary audio stream by
comparison between
Primary_Audio_Stream_Number
and Secondary_Audio_Stream_Number

STREAM REPRODUCTION DEVICE AND STREAM SUPPLY DEVICE

TECHNICAL FIELD

The present invention relates to audio stream playback techniques.

BACKGROUND ART

AV equipment is required to deliver not only high-quality video but also high-quality audio. In view of this, a wide variety of audio coding methods are employed nowadays. For example, BD (Blue-ray Disc) realizes playback of audio that is suitable for performance capabilities and usable languages of each playback device, by recording a plurality of audio streams (32 at the maximum) of different coding methods and languages onto a recording medium.

In conventional viewing environments, audio stream selection is mainly performed whereby a player equipped with a decoder reads streams from a recording medium and selects an audio stream that suits the decoder.

Patent Document 1: Japanese Patent Application Publication No. H09-282848

DISCLOSURE OF THE INVENTION

Problems the Invention is Going to Solve

As enhancement of audio coding technology progresses, lossless compression which achieves a higher audio quality is increasingly being used in place of lossy compression.

Lossless compression includes a coding method, such as DTS-HD, that maintains compatibility with decoders which support less advanced lossy coding methods of lower audio qualities but is also capable of realizing lossless playback with latest decoders. This being so, when using a coding method such as DTS-HD, merely checking which coded audio stream is playable by the decoder is not enough to know a quality of actual audio playback beforehand.

In a viewing environment such as a home theatre system where a television and an audio amplifier are each equipped with a decoder and a supply device for reading digital streams from a recording medium supplies video and audio streams to playback devices such as the television and the audio amplifier without decoding the read digital streams, a user basically performs an operation on the supply device. This being the case, audio may not be played back with a quality desired by the user in view of a coding method of an audio stream output according to the operation on the supply device, thereby causing confusion on the part of the user.

The present invention was conceived to solve the above problem, and aims to provide a playback device and a supply device with which a quality of audio played back by the playback device can appropriately be recognized beforehand in a viewing environment where a digital stream is pass-through output from the supply device to the playback device.

Means of Solving the Problems

The stated aim can be achieved by a stream playback device for playing back an audio stream including audio frames which are each made up of base data and extension data, including: a decoder; and an interface unit operable to receive the audio stream supplied from a stream supply device, wherein the stream playback device has a function of notifying the stream supply device whether only the base data or both the base data and the extension data are usable in decoding of the audio stream by the decoder, through the interface unit.

Also, the stated aim can be achieved by a stream supply device for selecting any of a plurality of audio streams and supplying the selected audio stream to a playback device, including: an acquisition unit operable to acquire information indicating, in a case where a decoder in the playback device decodes an audio stream including audio frames which are each made up of base data and extension data, whether only the base data or both the base data and the extension data are usable in the decoding of the audio stream by the decoder, from the playback device; and a change unit operable to change a condition for selecting the audio stream, based on the acquired information.

EFFECTS OF THE INVENTION

In a viewing environment where an audio stream is pass-through output from a stream supply device to a stream playback device, the stream supply device is notified whether extension data can be used in audio decoding in the stream playback device, in the case of using an audio coding method, such as DTS-HD, that is compatible with decoders which support less advanced coding methods of lower audio qualities but is also capable of producing high-quality playback with latest decoders. This makes it possible, on the part of the stream supply device, to know a quality of actual audio playback beforehand.

BRIEF DESCRIPTION OF THE DRAWINGS

FIG. 13 shows a PID assignment map according to the BD-ROM standard.

FIG. 14A shows an internal structure of a secondary audio stream.

FIG. 14B shows one example of an audio frame.

FIG. 14C shows an internal structure of metadata.

FIG. 14D schematically shows one example of gain control information.

FIG. 20 shows an internal structure of an STN_table.

FIG. 21A shows a Stream_attribute corresponding to a video stream.

FIG. 21B shows a Stream_attribute corresponding to a Primary audio stream and a Secondary audio stream.

FIG. 21C shows a Stream_entry in a video stream.

FIG. 21D shows a Stream_entry in a Secondary audio stream.

FIG. 21E shows an internal structure of a Comb_info_Secondary_audio Primary_audio_corresponding to a combination of a Stream_entry and a Stream_attribute in a Secondary audio stream.

FIG. 26A schematically shows a data structure of a part of a DIB pertaining to audio playback performance capabilities.

FIG. 26B shows values that can be set in each field of the DIB.

FIG. 29 schematically shows a data structure of an Audio InfoFrame.

FIG. 30 functionally shows a controller 22.

FIG. 32 shows bit assignments for PSR15.

DESCRIPTION OF REFERENCE NUMERALS

Figure 1:
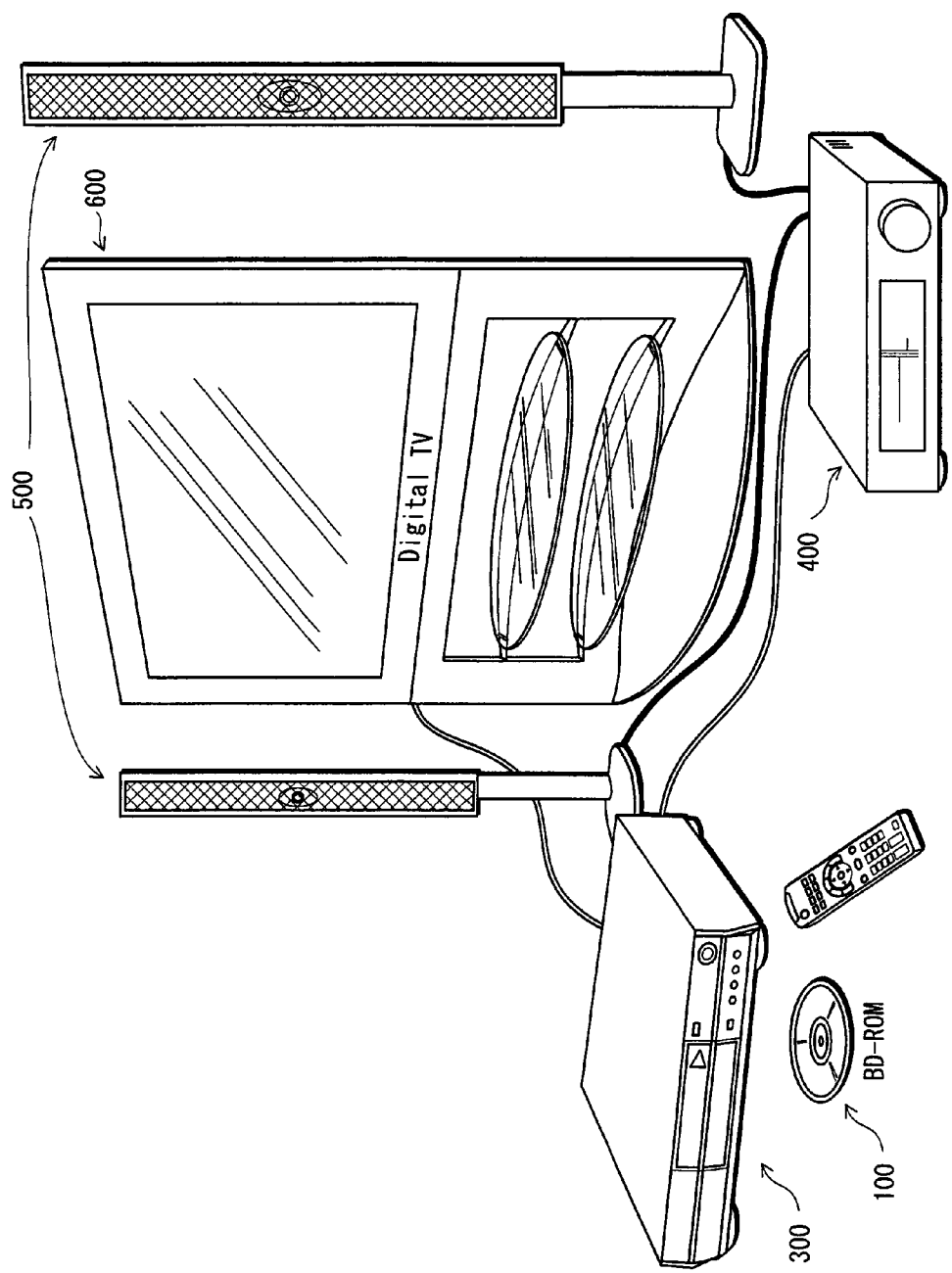
FIG. 1 shows an example of use of a recording medium according to the present invention.

100 . . . BD-ROM
200 . . . local storage
300 . . . stream supply device
400 . . . audio amplifier
500 . . . speaker
600 . . . television
1a . . . BD-ROM drive
1by . . . bus
2a, 2by . . . read buffer
3a, 3by . . . demultiplexer
4 . . . video decoder
5 . . . video plane
6a, 6by . . . buffer
7a, 7by . . . audio decoder
8 . . . DownMix/DownSample
9a . . . mixer
9by . . . mixer
10a . . . switch
10by . . . encoder
11 . . . Interactive Graphics decoder
12 . . . Interactive Graphics plane
13 . . . Presentation Graphics decoder
14 . . . Presentation Graphics plane
15 . . . JPEG decoder
16 . . . Still plane
17 . . . composition unit
18a, 18by . . . STC generation unit
19a, 19by . . . ATC generation unit
21 . . . memory
22 . . . controller
23 . . . PSR set
24 . . . PID conversion unit
25 . . . communication unit
26 . . . operation reception unit
27 . . . HDMI transmission/reception unit
31 . . . buffer
32 . . . audio decoder
33 . . . controller
34 . . . HDMI transmission/reception unit
35 . . . EEPROM
40 . . . start processing unit
41 . . . playlist processing unit
42 . . . Procedure execution unit
43 . . . Procedure execution unit
44 . . . mixing control unit

BEST MODE FOR CARRYING OUT THE INVENTION

The following describes an embodiment of a playback device according to the present invention. Firstly, an example of use out of acts of working of the playback device according to the present invention is described below. FIG. 1 shows an exemplary form of use of a stream playback device according to the present invention. In FIG. 1, the stream playback device according to the present invention is an audio amplifier 400. The audio amplifier 400 constitutes a home theater system together with a stream supply device 300, a speaker 500, and a television 600, and is submitted for use in playing back an audio stream supplied from the stream supply device.

The following describes a BD-ROM 100, the stream supply device 300, and the audio amplifier 400.

The BD-ROM 100 is a recording medium on which a movie work is recorded.

The stream supply device 300 is a networkable digital household appliance, and has a function of reading the movie work recorded on the BD-ROM 100 in accordance with a user operation using a remote control, and outputting video data and audio data respectively to the television 600 and the audio amplifier 400.

In this embodiment, the stream supply device 300 and the audio amplifier 400 are connected by an I/F in compliance with HDMI (High Definition Multimedia Interface). The stream supply device 300 outputs an audio stream read from the BD-ROM 100 to the audio amplifier 400 without decoding it. Hereafter, outputting an elementary audio stream to another device without decoding TS packets that constitute the audio stream is referred to as "pass-through output".

The stream supply device 300 includes a local storage 200 which is a hard disk used for storing content delivered from a server of a movie distributor, and is capable of extending/updating content recorded on the BD-ROM 100 by combining the content on the BD-ROM 100 with content downloaded via a network from the server of the movie distributor. A technique of combining the recording contents of the BD-ROM 100 with the recording contents of the local storage 200 so as to treat the data not recorded on the BD-ROM 100 as if it exists on the BD-ROM 100 is called a "virtual package".

The audio amplifier 400 includes an audio decoder. The audio amplifier 400 decodes the audio stream supplied from the stream supply device 300 and outputs LPCM audio data obtained as a result of the decoding to the speaker 500.

An exemplary form of use of the playback device according to the present invention is as described above.

A recording medium according to the present invention is described in detail next.

<Overview of the BD-ROM>

Figure 2:
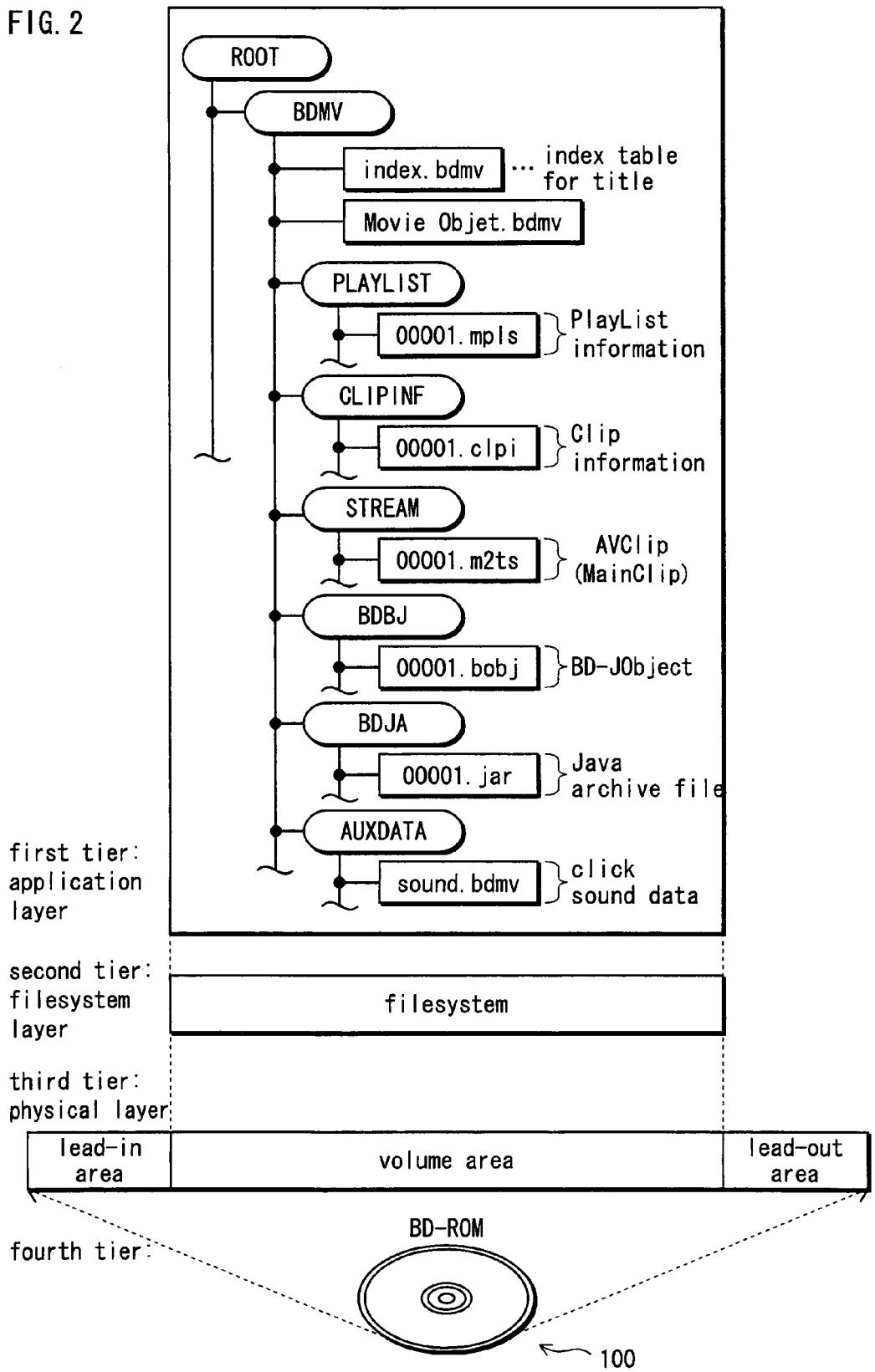
FIG. 2 shows an internal structure of a BD-ROM.

FIG. 2 shows an internal structure of the BD-ROM. The BD-ROM is shown at the fourth tier in the drawing, while a track on the BD-ROM is shown at the third tier. The track depicted here results from a track spiraling from an inner circumference to an outer circumference of the BD-ROM having been drawn out to the sides. This track is made up of a lead-in area, a volume area, and a lead-out area. The volume area in FIG. 2 has a layered structure made up of a physical layer, a filesystem layer, and an application layer. Expressing a format of the application layer (application format) of the BD-ROM using a directory structure gives the first tier in the drawing. A BDMV directory is placed under a ROOT directory in the BD-ROM, as shown at the first tier.

The BDMV directory stores files to which an extension bdmv is assigned (index.bdmv, MovieObject.bdmv). Also, under the BDMV directory exist six subdirectories known as a PLAYLIST directory, a CLIPINF directory, a STREAM directory, a BDBJ directory, a BDJA directory, and an AUXDATA directory.

The PLAYLIST directory stores a file (00001.mpls) with an extension mpls.

The CLIPINF directory stores a file (00001.clpi) with an extension clpi.

The STREAM directory stores a file (00001.m2ts) with an extension m2ts.

The BDBJ directory stores a file (00001.bobj) with an extension bobj.

The BDJA directory stores a file (00001.jar) with an extension jar.

The AUXDATA directory stores a file sound.bdmv.

This directory structure indicates that a plurality of files of different types are arranged on the BD-ROM.

<BD-ROM Structure, Part 1: AVClip>

Figure 3:
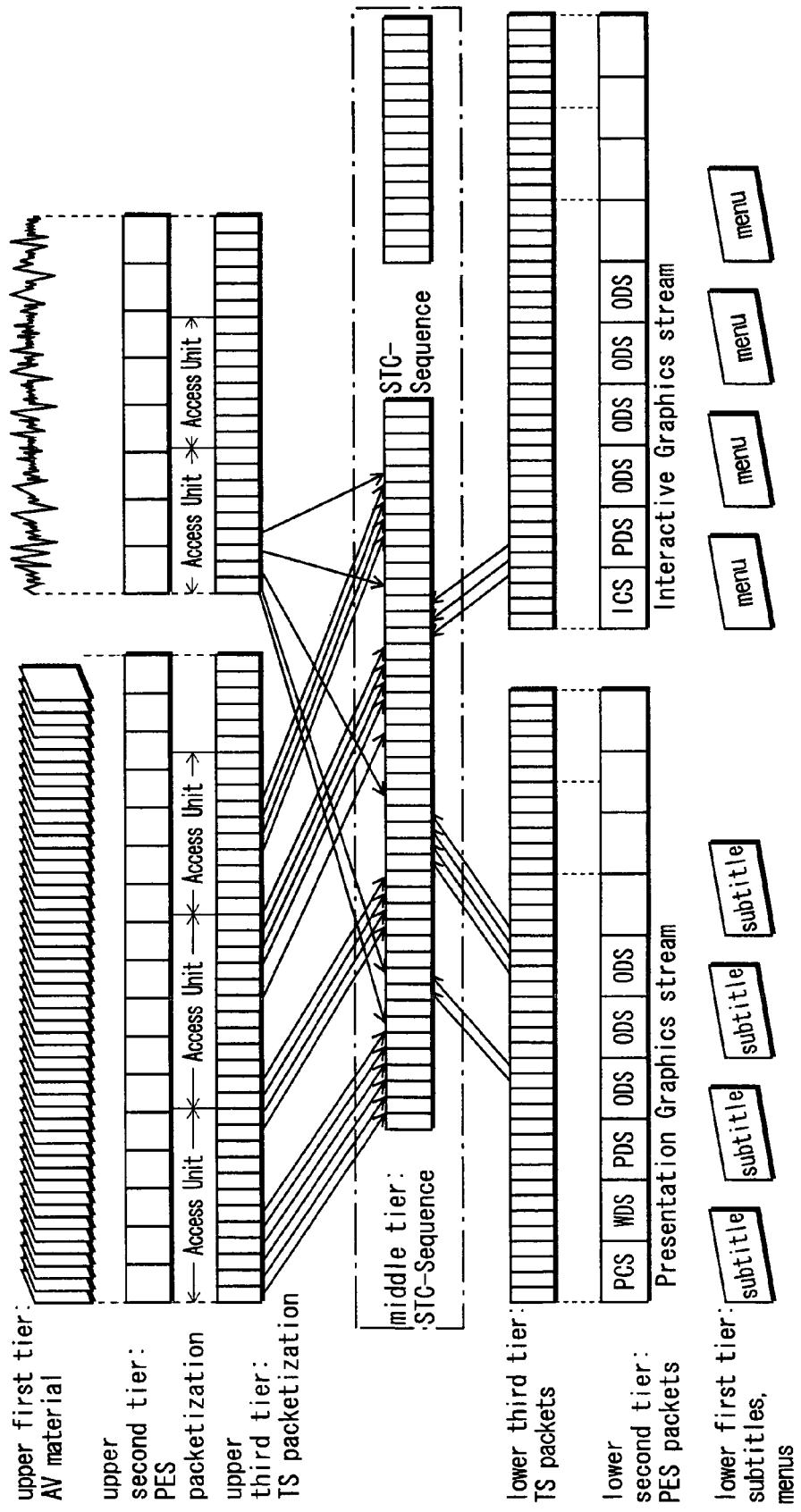
FIG. 3 schematically shows a structure of a file with an extension .m2ts.

Firstly, the file with the extension .m2ts is described below. FIG. 3 schematically shows how the file with the extension .m2ts is structured. The file with the extension .m2ts (00001.m2ts) stores an AVClip. The AVClip is a digital stream in compliance with the MPEG2-Transport Stream format. This digital stream is constituted by multiplexing TS packets resulting from the conversion of digitized video and audio (upper first tier) firstly to elementary streams made up of PES packets (upper second tier) and then to TS packets (upper third tier) and the conversion of a subtitle Presentation Graphics (PG) stream and an Interactive Graphics (IG) stream (lower first and second tiers) to TS packets (lower third tier) in the same manner.

The PG stream is a graphics stream which constitutes subtitles of a corresponding language. There exist streams corresponding to multiple languages such as English, Japanese, and French. The PG stream is composed of a set of functional segments including a PCS (Presentation Control Segment), a PDS (Pallet Define Segment), a WDS (Window Define Segment), an ODS (Object Define Segment), and an END (END of Display Set Segment). The ODS (Object Define Segment) is a functional segment defining a graphics object that is a subtitle.

The WDS (Window Define Segment) is a functional segment defining a rendering area of a graphics object on a screen. The PDS (Pallet Define Segment) is a functional segment defining a color in rendering a graphics object. The PCS (Presentation Control Segment) is a functional segment defining a page control in displaying a subtitle. Such a page control includes Cut-In/Out, Fade-In/Out, Color Change, Scroll, and Wipe-In/Out. With the provision of the page control by the PCS, a display effect in which one subtitle is fading out while the next subtitle is appearing can be achieved.

The IG stream is a graphics stream for realizing an interactive control. The interactive control defined by the IG stream is compatible with an interactive control on a DVD playback device. The IG stream is made up of functional segments including an ICS (Interactive Composition Segment), a PDS (Palette Definition Segment), an ODS (Object Definition Segment), and an END (END of Display Set Segment). The ODS (Object Definition. Segment) is a functional segment defining a graphics object. A button on an interactive screen can be rendered by a collection of a plurality of graphics objects. The PDS (Palette Definition Segment) is a functional segment defining a color in rendering a graphics object. The ICS (Interactive Composition Segment) is a functional segment for realizing a status transition of changing a status of a button in accordance with a user operation. The ICS includes a button command that is executed when the selection of the button is confirmed.

The AVClip is composed of one or more "STC_Sequences". A "STC_Sequence" is a section that has no discontinuity point (system time-base discontinuity) of a STC (System Time Clock) which provides a system reference time for AV streams. The discontinuity point of the STC is a point at which discontinuity information (discontinuity_indicator) of PCR packets carrying a PCR (Program Clock Reference), which is referenced by a decoder to obtain the STC, is ON.

Figure 4:
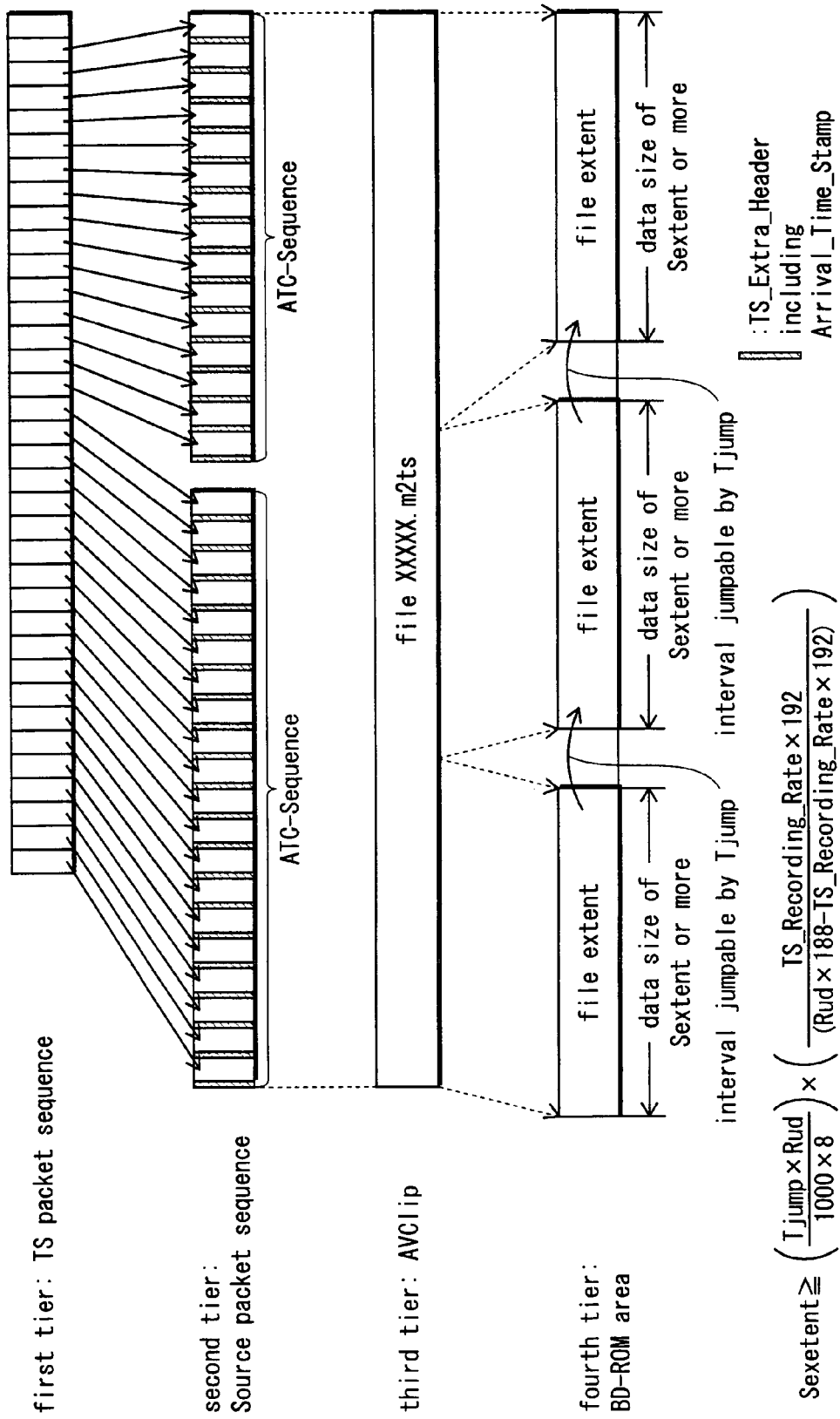
FIG. 4 shows a process of writing TS packets constituting an AVClip onto a BD-ROM.

The following describes how the AVClip having the above structure is written onto the BD-ROM. FIG. 4 shows a process of writing TS packets which constitute the AVClip onto the BD-ROM. The TS packets which constitute the AVClip are shown at the first tier of the drawing.

The 188-byte TS packets constituting the AVClip are each changed to 192-byte Source packets as a result of adding a 4-byte TS_extra_header (the hatched area in the drawing), as shown at the second tier. The TS_extra_header contains an Arrival_Time_Stamp showing decoder input time information for the TS packet.

The Source packets constituting the AVClip form one or more "ATC_Sequences" at the third tier. An "ATC_Sequence" is a sequence of Source packets that includes no discontinuity point (no arrival time-base discontinuity) of an Arrival_Time_Clock referenced by their Arrival_Time_Stamps. In other words, the "ATC_Sequence" is a sequence of Source packets in which the Arrival_Time_Clock referenced by their Arrival_Time_Stamps has continuity.

The AVClip is formed by such an ATC Sequence and recorded on the BD-ROM by a filename xxxxx.m2ts.

Here, the AVClip is divided into one or more file extents and recorded in an area of the BD-ROM, in the same way as general computer files. The fourth tier schematically shows how the AVClip is recorded on the BD-ROM. Each file extent constituting a file at the fourth tier has a data length no less than a predetermined length called Sextent.

Sextent is a minimum data length of one extent, in the case where an AVClip is recorded having been divided into a plurality of extents.

A time required for an optical pickup to jump on the BD-ROM is $$Tjump = Taccess + Toverhead$$

Taccess is a time determined according to a jump distance (distance to a jump-destination physical address).

TS packets read from the BD-ROM are stored in a buffer called a read buffer and then output to a decoder. When the input to the read buffer is performed at a bit rate Rud and a number of sectors in an ECC block is Secc, Toverhead is calculated by $$Toverhead \leq (2 \times Secc \times 8)/Rud = 20 \text{ msec}$$

TS packets read from the BD-ROM are stored in the read buffer in the state of Source packets, and then supplied to the decoder at a transfer rate TS_Recording_rate.

To maintain the supply of TS packets to the decoder at the transfer rate TS_Recording_rate, it is necessary to continuously output TS packets from the read buffer to the decoder during the Tjump. Here, the output from the read buffer is made not in the state of TS packets but in the state of Source packets. Accordingly, when a size ratio between a TS packet and a Source packet is 192/188, Source packets need to be continuously output from the read buffer at a transfer rate of (192/188×TS_Recording_rate) during the Tjump.

Accordingly, buffer occupancy of the read buffer to prevent an underflow is $$Boccupied \geq (Tjump/1000 \times 8) \times ((192/188) \times TS\_Recording\_rate)$$

The input rate to the read buffer is Rud, and the output rate from the read buffer is TS_Recording rate×(192/188). Accordingly, a rate of storage of the read buffer is calculated by subtracting the output rate from the input rate, i.e. (Rud−TS_Recording_rate×(192/188)).

A time Tx required to obtain this "Boccupied" in the read buffer is $$Tx = Boccupied/(Rud - TS\_Recording\_rate \times (192/188))$$

When reading from the BD-ROM, it is necessary to continuously feed TS packets to the read buffer at the bit rate Rud for the time Tx. Accordingly, the minimum data length Sextent of one extent in the case where the AVClip is recorded having been divided into a plurality of extents is $$\begin{aligned} Sextent &= Rud \times Tx \\ &= Rud \times Boccupied/(Rud - TS\_Recording\_rate \times (192/188)) \\ &\geq Rud \times (Tjump/1000 \times 8) \times ((192/188) \times TS\_Recording\_rate)/ \\ &\quad (Rud - TS\_Recording\_rate \times (192/188)) \\ &\geq (Rud \times Tjump/1000 \times 8) \times TS\_Recording\_rate \times 192/ \\ &\quad (Rud \times 188 - TS\_Recording\_rate \times 192) \end{aligned}$$

Therefore, $$Sextent \geq (Tjump \times Rud/1000 \times 8) \times$$
$$(TS\_Recording\_rate \times 192/(Rud \times 188 - TS\_Recording\_rate \times 192))$$

Each file extent constituting the AVClip has a data length no less than Sextent that is calculated so as not to cause an underflow of the read buffer. Accordingly, even when each file extent of the AVClip is located discretely on the BD-ROM, TS packets are continuously read so as to be constantly supplied to the decoder.

Figure 5:
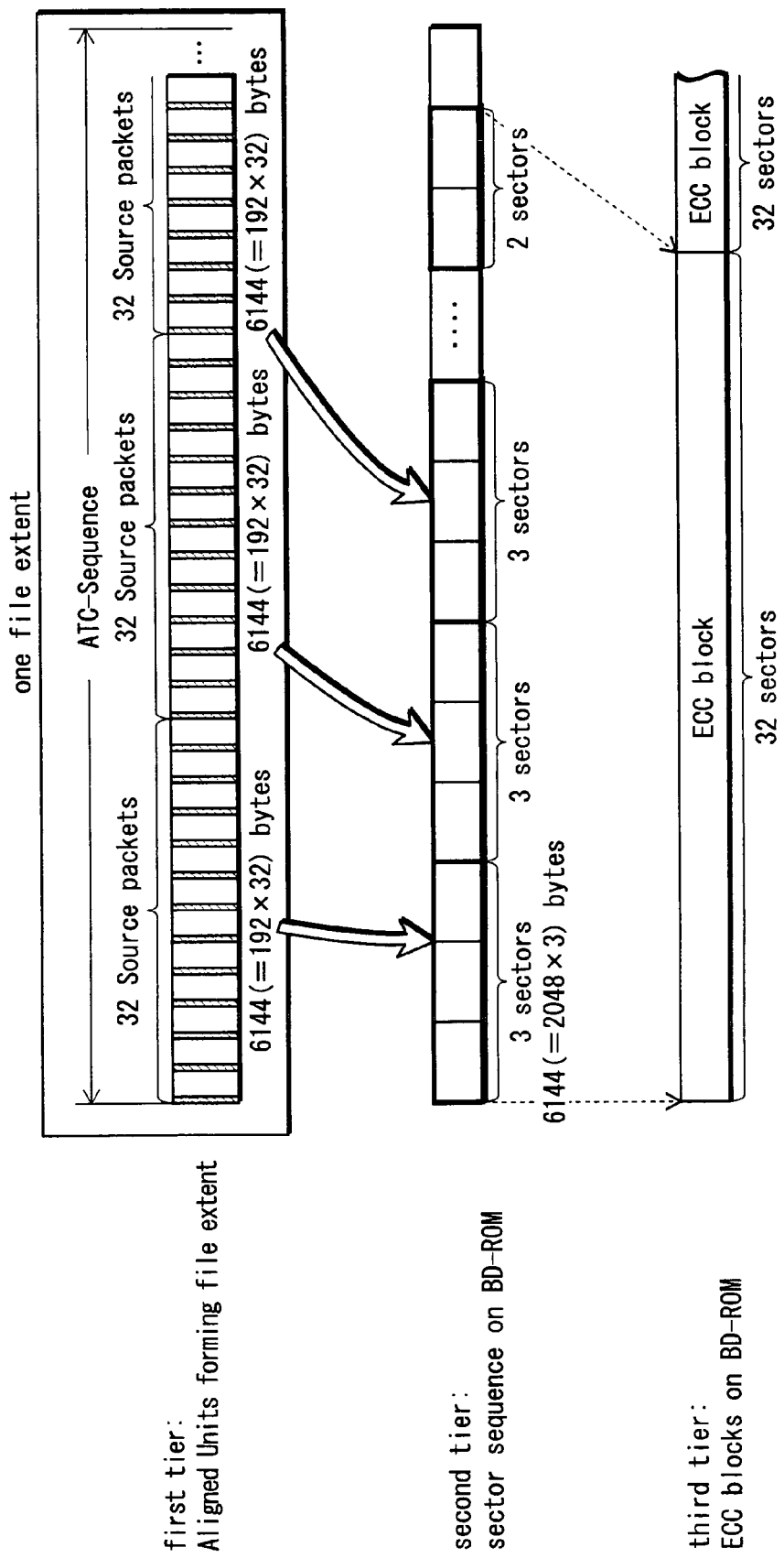
FIG. 5 shows a relationship between physical units of the BD-ROM and Source packets constituting one file extent.

FIG. 5 shows a relationship between physical units of the BD-ROM and Source packets which constitute one file extent. A plurality of sectors are formed on the BD-ROM as shown at the second tier. The Source packets constituting the file extent are grouped in units of 32 packets as shown at the first tier, and each group is written to three consecutive sectors. A group of 32 Source packets has 6144 bytes (=32×192), which is equivalent to a size of three sectors that is 6144 bytes (=2048×3). The 32 Source packets housed in the three sectors are called an "Aligned Unit". The writing to the BD-ROM is conducted in units of Aligned Units.

At the third tier, each group of 32 sectors is given an error correction code to form an ECC block. The stream supply device 300 can obtain 32 complete Source packets so long as it accesses the BD-ROM in units of Aligned Units. The process of writing the AVClip onto the BD-ROM is as described above.

<Types of Elementary Streams>

Figure 6:
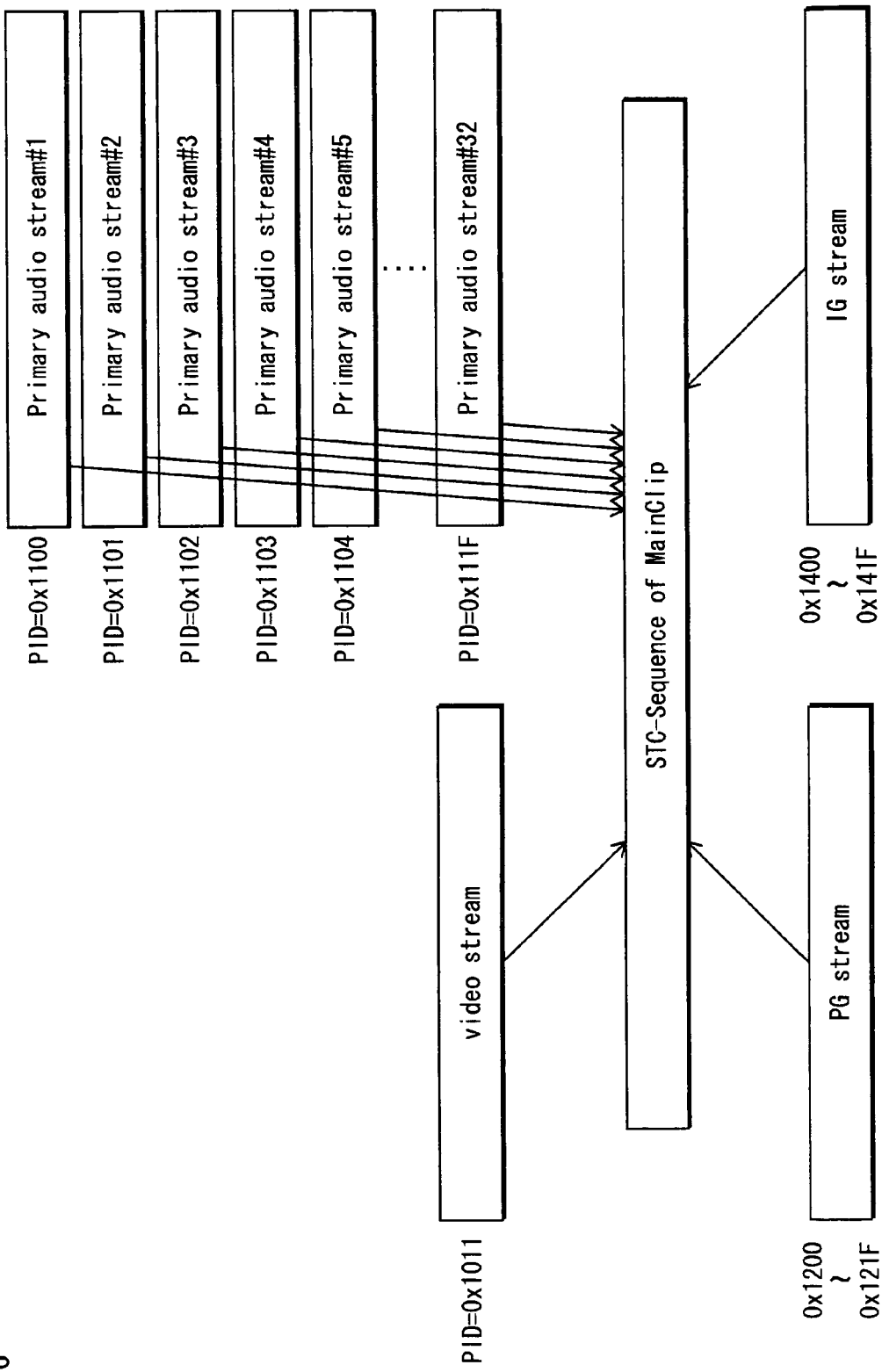
FIG. 6 shows elementary streams which are multiplexed to form an AVClip.

FIG. 6 shows elementary streams that are multiplexed to form the AVClip.

As shown in the drawing, the AVClip is formed by multiplexing a high-quality video stream having a PID 0x1011, Primary audio streams having PIDs 0x1100 to 0x111F, PG streams having PIDs 0x1200 to 0x121F, and IG streams having PIDs 0x1400 to 0x141F. Each packet included in these elementary streams is given a PID of a corresponding elementary stream. Demultiplexing is performed using these PIDs. Hereafter, such an AVClip that contains a high-quality video stream in multiplexed form is called a MainClip, whereas an AVClip which is played back simultaneously with the MainClip is called a SubClip.

<BD-ROM Structure, Part 2: Clip Information>

Figure 7:
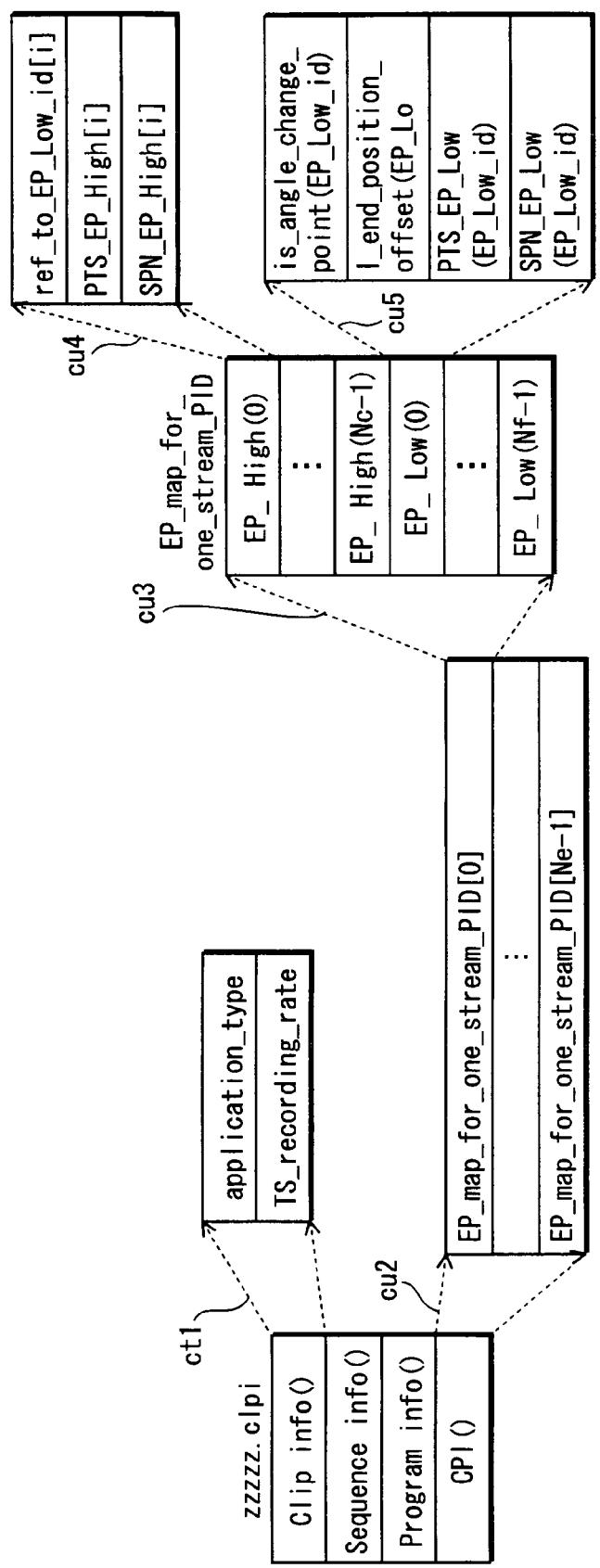
FIG. 7 shows an internal structure of Clip information.

The file with the extension clpi is explained next. The file with the extension clpi (00001.clpi) stores Clip information. The Clip information is management information corresponding to each individual AVClip. FIG. 7 shows an internal structure of the Clip information. As shown on the left side of the drawing, the Clip information is made up of i) "ClipInfo( )" storing information about the AVClip, ii) "Sequence Info( )" storing information about an ATC Sequence and an STC Sequence, iii) "Program Info( )" storing information about a Program Sequence, and iv) "Characteristic Point Info (CPI( ))".

The ClipInfo includes an application type of the AVClip referenced by this Clip information (application_type). The application type makes it possible to determine whether the AVClip is a MainClip or a SubClip and whether the AVClip contains a moving image or a still image (slide show). Meanwhile, a TS recording rate is system bit rate information of the AVClip.

The Sequence Info is information pertaining to one or more STC-Sequences and ATC-Sequences included in the AVClip. This information is provided to notify the stream supply device 300 of a discontinuity point of the STC and the ATC beforehand. If a discontinuity point exists, there is a possibility that PTSs of a same value may appear in the AVClip. This causes a problem when performing jump playback according to PTS designation. Thus, the Sequence Info is provided to show in which part of a transport stream the STC and the ATC are continuous.

The Program Info is information showing a section (ProgramSequence) where the contents of a Program are constant. The Program referred to here is a group of elementary streams that share a time axis for synchronous playback. The Program Sequence information is provided to notify the stream supply device 300 of a point of change in the Program contents beforehand. The point of change in the Program contents referred to here is, for example, a point where a video stream PID changes or a point where a video stream type changes from SDTV to HDTV.

The Characteristic Point Info is explained next. The arrows cu2 in the drawing show a close-up of a structure of the CPI. As shown by the arrows cu2, the CPI is made up of Ne number of EP_map_for_one_stream_PIDs (EP_map_for_one_stream_PID[0] to EP_map_for_one_stream_PID[Ne−1]). These EP_map_for_one_stream_PIDs are each an EP_map corresponding to an individual elementary stream which belongs to the AVClip. An EP_map is information that shows, on one elementary stream, a correspondence between a packet number (SPN_EP_start) of an entry position where an Access Unit exists and an entry time (PTS_EP_start). The arrows cu3 in the drawing show a close-up of an internal structure of an EP_map_for_one_stream_PID.

As illustrated, the EP_map_for_one_stream_PID is made up of Nc number of EP_Highs (EP_High(0) to EP_High(Nc−1) and Nf number of EP_Lows (EP_Low(0) to EP_Low(Nf−1)). An EP_High has a role of indicating a higher-order bit of an SPN_EP_start and PTS_EP_start of the Access Unit (Non-IDR I picture, IDR picture). An EP_Low has a role of indicating a lower-order bit of the SPN_EP_start and PTS_EP_start of the Access Unit (Non-IDR I picture, IDR picture).

The arrows cu4 in the drawing show a close-up of an internal structure of the EP_High. As shown by the arrows cu4, an EP_High(i) is composed of a "ref_to_EP_Low id[i]" that is a reference value to an EP_Low, a "PTS_EP_High[i]" that indicates a higher-order bit of a PTS of the Access Unit (Non-IDR I picture, IDR picture), and a "SPN_EP_High[i]" that indicates a higher-order bit of an SPN of the Access Unit (Non-IDR I picture, IDR picture). Here, i is an identifier that identifies a given EP_High.

The arrows cu5 in the drawing show a close-up of a structure of the EP_Low. As shown by the arrows cu5, the EP_Low is composed of a "is_angle_change_point (EP_Low_id)" that indicates whether or not the Access Unit is an IDR picture, an "I_end_position_offset (EP_Low_id)" that indicates a size of the Access Unit, a "PTS_EP_Low (EP_Low_id)" that indicates a lower-order bit of the PTS of the Access Unit (Non-IDR I picture, IDR picture), and a "SPN_EP_Low (EP_Low_id)" that indicates a lower-order bit of the SPN of the Access Unit (Non-IDR I picture, IDR picture). Here, the EP_Low_id is an identifier that identifies a given EP_Low.

<PlayList Information>

The PlayList information is explained next. The file with the extension "mpls" (00001.mpls) is a file storing PlayList (PL) information.

Figure 8:
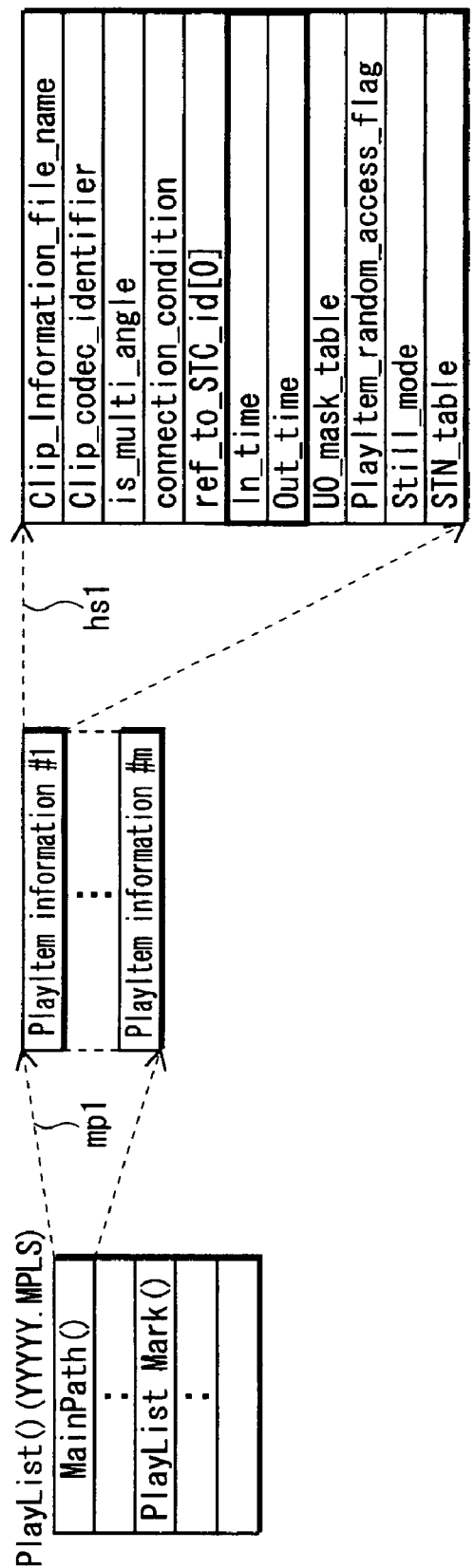
FIG. 8 shows a data structure of PlayList information.

FIG. 8 shows a data structure of the PlayList information. As shown by the arrows mp1 in the drawing, the PlayList information includes MainPath information (MainPath( )) defining a MainPath, and PlayListMark information (PlayListMark( )) defining a chapter.

<PlayList Information, Part 1: MainPath Information>

The MainPath is described firstly. The MainPath is a presentation path that is defined for a video stream and an audio stream as main video.

The MainPath is defined by a plurality of pieces of PlayItem information#1, . . . , #m, as shown by the arrows mp1. The PlayItem information defines one logical playback section constituting the MainPath. The arrows hs1 show a close-up of a structure of the PlayItem information. As shown by the arrows hs1, the PlayItem information includes a "Clip_Information_file_name" showing a filename of playback section information of an AVClip to which an IN point and an Out point of the playback section belong, a "Clip_codec_identifier" showing a coding method of the AVClip, a "is_multi_angle" showing whether the PlayItem forms a multi-angle, a "connection_condition" showing whether this PlayItem and an immediately preceding PlayItem are to be connected seamlessly, a "ref_to_STC_id[0]" uniquely showing an STC_Sequence targeted by this PlayItem, an "In_time" which is time information showing a start point of the playback section, an "Out_time" which is time information showing an endpoint of the playback section, an "UO_mask_table" showing which user operation is to be masked in this PlayItem, a "PlayItem_random_access_flag" showing whether random access to a midpoint of the PlayItem is permitted, a "Still_mode" showing whether still display of a last picture is to be continued after the playback of the PlayItem ends, and an "STN_table". Among these, a combination of the time information "In_time" showing the start point of the playback section and the time information "Out_time" showing the end point of the playback section constitutes the presentation path. Presentation path information is composed of this combination of "In_time" and "Out_time".

Figure 9:
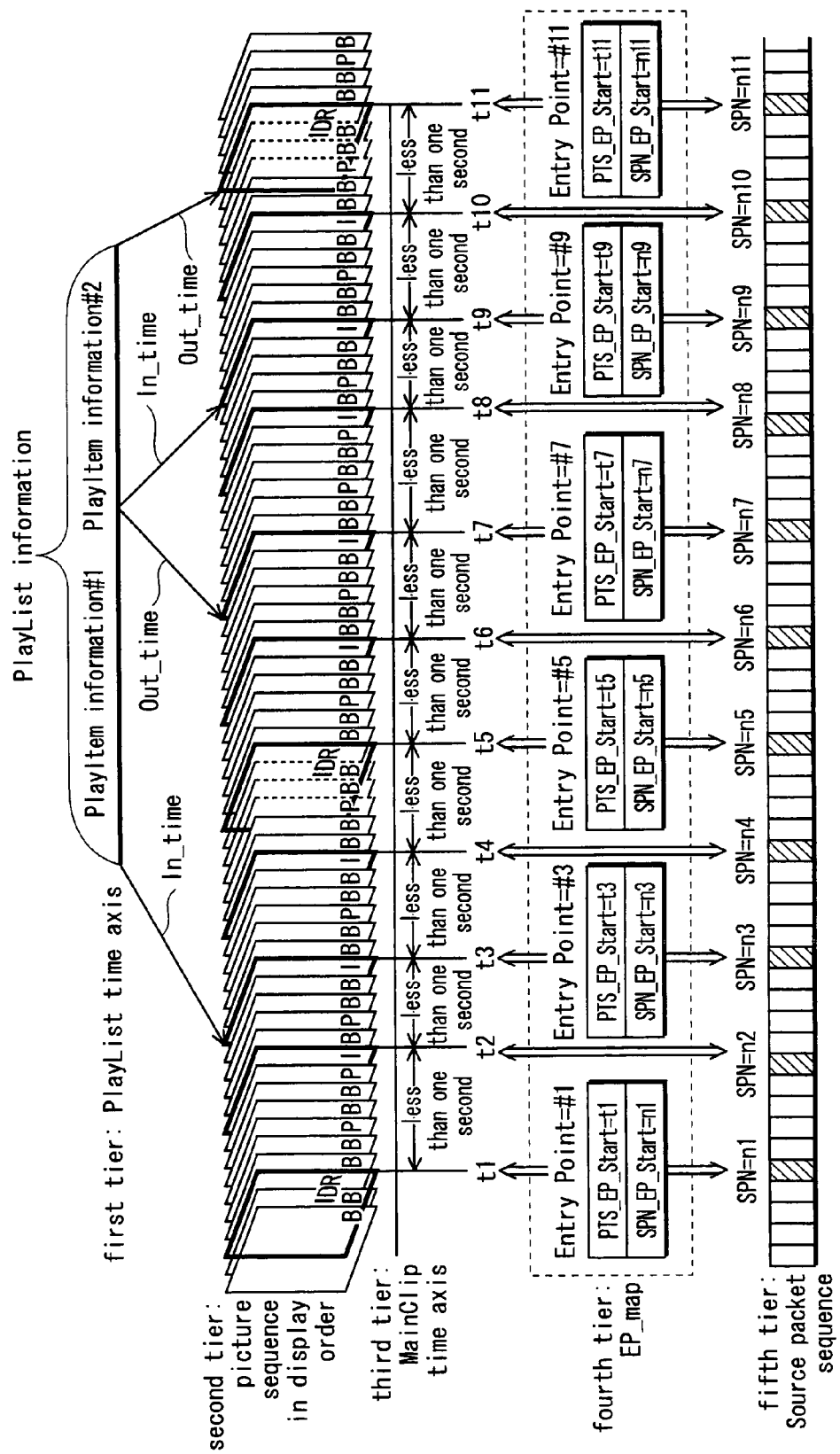
FIG. 9 shows a relationship between an AVClip and PlayList information.

FIG. 9 shows a relationship between an AVClip and PlayList information. The first tier shows a time axis of the PlayList information. The second to fifth tiers show a video stream referenced in an EP_map.

The PlayList information includes two pieces of PlayItem information#1 and #2, with two playback sections being defined by In times and Out_times of these two pieces of PlayItem information#1 and #2. A different time axis from the AVClip is defined when these playback sections are arranged in line. This is the PlayList time axis shown at the first tier. Defining a different presentation path from the AVClip is thus enabled by the definitions in the PlayItem information.

Clip information and PlayList information described above are classified as "static scenarios". This is because a PlayList which is a static unit of playback is defined by the above Clip information and PlayList information. This completes the description of the static scenarios.

The following describes "dynamic scenarios". A dynamic scenario is scenario data that dynamically specifies playback controls on AVClips. The word "dynamic" indicates that the contents of playback controls change due to user key events and status changes in devices which form the home theater system. BD-ROMs assume two modes as operation environments of such playback controls. One is an operation environment similar to an operation environment of DVD playback devices, and a command-based execution environment. The other is an operation environment of Java™ virtual machines. The former operation environment is called an HDMV mode, whereas the latter operation environment is called a BD-J mode. Since there are these two operation environments, dynamic scenarios are written while assuming either of the two operation environments. A dynamic scenario based on the HDMV mode is called a Movie Object, whilst a dynamic scenario based on the BD-J mode is called a BD-J Object.

A Movie Object is described firstly.

<Movie Object>

The Movie Object is stored in the file MovieObject.bdmv shown in FIG. 2, and contains a navigation command sequence.

The navigation command sequence is made up of commands such as a command for realizing a conditional branch, a command for setting a status register in the stream supply device 300, and a command for acquiring a set value of a status register. A command describable in the Movie Object is shown below.

PlayPL Command

Form: PlayPL (first argument, second argument), where the first argument can designate a PlayList to be played back using a PlayList number, and the second argument can designate a playback start position using a PlayItem included in the PlayList or an arbitrary time, Chapter, and Mark in the PlayList.

A PlayPL function designating a playback start position on a PL time axis by a PlayItem is called a PlayPLatPlayItem( ), a PlayPL function designating a playback start position on a PL time axis by a Chapter is called a PlayPLatChapter( ) and a PlayPL function designating a playback start position on a PL time axis by time information is called a PlayPLatSpecified Time( ).

The description of navigation commands in Movie Objects is similar to that of navigation commands in DVDs. Accordingly, an operation of moving content on a DVD to a BD-ROM can be carried out efficiently. For further details on Movie Objects, see the following International Publication which describes a conventional technique for Movie Objects.

International Publication: WO 2004/074976

This completes the description of Movie Objects. The following describes BD-J Objects.

<BD-J Object>

A BD-J Object is a dynamic scenario in the BD-J mode which is described in a Java programming environment, and is stored in a file 00001.bobj. The difference from a Movie Object lies in that a command is not directly written in the BD-J Object. In the Movie Object, a control procedure is directly written using navigation commands. In the BD-J Object, on the other hand, a control procedure is indirectly specified by writing designation to a Java application in an application management table. By such indirect specification, control procedure sharing, i.e., sharing a control procedure across a plurality of dynamic scenarios, can be efficiently conducted.

Also, the PlayList playback in the Movie Object is performed by writing a navigation command (PlayPl command) for instructing the PlayList playback, but the PlayList playback in the BD-J Object can be described by incorporating a PlayList management table showing a PlayList playback procedure into the BD-J Object.

A Java application in the BD-J mode is described below. Here, a Java platform envisioned by the BD-J mode fully implements Java2Micro_Edition (J2ME) Personal Basis Profile (PBP 1.0) and Globally Executable MHP specification (GEM1.0.2) for package media targets.

The Java application in the BD-J mode is controlled by an Application Manager through an xlet interface. The xlet interface has four statuses that are "loaded", "paused", "active", and "destroyed".

The aforementioned Java platform includes a standard Java library for displaying JFIF (JPEG), PNG, and other image data. Hence the Java application can achieve a GUI framework that differs from a GUI realized by an IG stream in the HDMV mode. The GUI framework in the Java application contains a HAVi framework defined by GEM 1.0.2, and includes a remote control navigation mechanism in GEM 1.0.2.

Thus, the Java application enables screen displays where button displays, text displays, and online displays (the contents of BBS) based on the HAVi framework are combined with video displays. This allows the user to perform operations on these screen displays using the remote control.

An actual Java application is a Java archive file (00001.jar) stored in the BDJA directory under the BDMV directory shown in FIG. 2.

For more details oh BD-J Objects, see the following international publications that describe conventional techniques for BD-J Objects.

International Publication: WO 2004/045840 A1
    WO 2005/036555 A1
    WO 2005/036546 A1

This completes the description of BD-J Objects.

<sound.bdmv>

The following describes the file sound.bdmv. The file sound.bdmv stores audio data to be output as a click sound when an operation is performed on a menu rendered by an IG stream or a GUI framework of a Java application (such audio data is called sound data).

Figure 10:
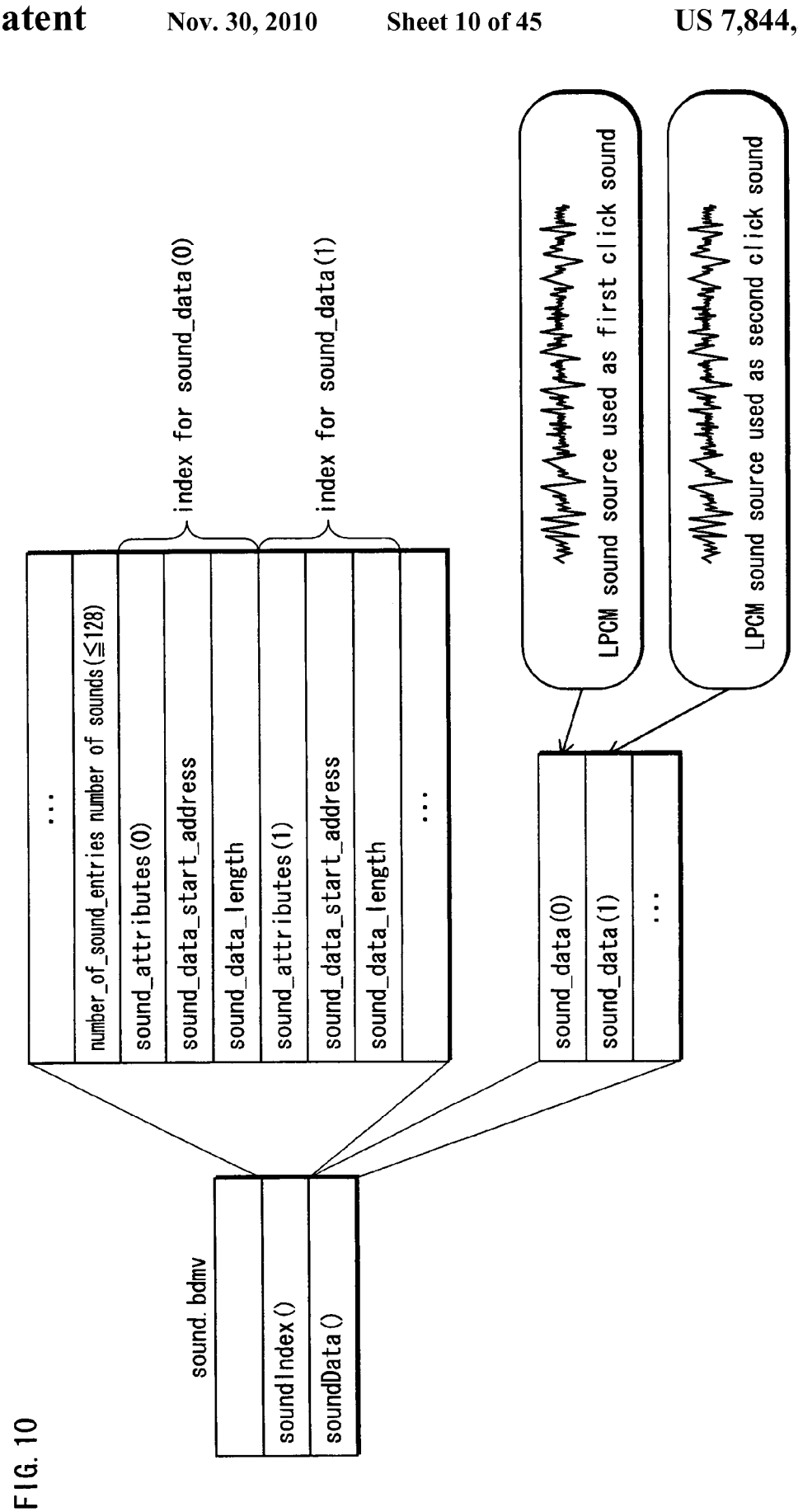
FIG. 10 shows a structure of a file sound.bdmv.

FIG. 10 shows a structure of the file sound.bdmv. The file sound.bdmv is made up of Sound Data( ) and Sound Index( ). The Sound Data( ) is composed of a plurality of pieces of sound data (sound_data(0), sound_data(1)). Sound_data(0) is a sound source which is output as a first click sound when an operation is performed on a menu. Sound_data(1) is a sound source which is output as a second click sound when an operation is performed on a menu. These pieces of sound data are designated by identifiers called sound_IDs.

The Sound Index( ) is composed of a number of sounds (number_of_sound_entries), an index for sound_data(0), an index for sound_data(1), and the like.

An index referred to here is made up of a sound attribute such as monaural/stereo (sound_attributes), an address of corresponding sound data (sound_data_start_address), and a continuous length of the corresponding sound data (sound_data_length).

As shown in FIGS. 2 to 6, a source of sound used in a movie is multiplexed in the AVClip as a Primary audio stream. This arrangement is made for the purpose of supplying the Primary audio stream, which provides sound/voice in the movie, simultaneously when the video stream is read. On the other hand, the file sound.bdmv, in which the click sound for a menu operation by the user is stored, is recorded on the BD-ROM separately from the AVClip. Since the file sound.bdmv is recorded as a separate file from the AVClip, to output the sound data while the AVClip is being read, the optical pickup performs a jump for reading the file sound.bdmv, which causes an interruption in the reading of the AVClip. When this occurs, the playback of the AVClip cannot be performed seamlessly.

To prevent such an interruption of the AVClip playback, it is necessary to preload the file sound.bdmv in a buffer when the AVClip is not being played back. That is, the sound data in the file sound.bdmv needs to be preloaded before the playback of the AVClip. This completes the description of the file sound.bdmv.

<Index.bdmv>

Index.bdmv is a table that indicates a Movie Object or a BD-J Object constituting a title.

Index.bdmv defines the Movie Object or the BD-J Object that is a component of a Title.

For more details on Index.bdmv, see the following International Publication:

International Publication WO 2004/025651 A1.

This completes the description of the BD-ROM 100.

<Local Storage 200>

Figure 11:
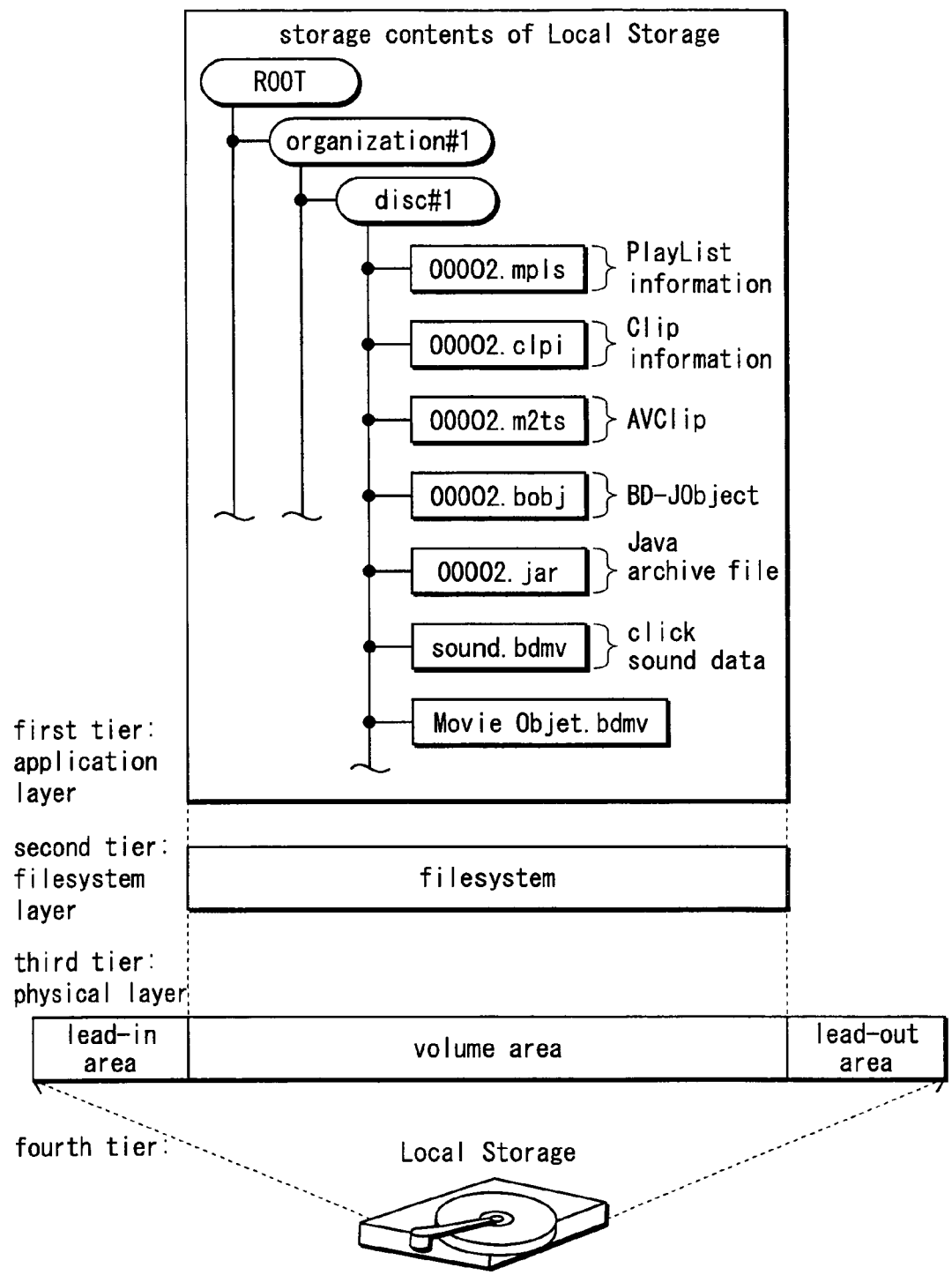
FIG. 11 shows an internal structure of a local storage 200.

The following describes the local storage 200. FIG. 11 shows an internal structure of the local storage 200. As illustrated, the recording medium according to the present invention can be produced by improving an application layer.

The local storage 200 is shown at the fourth tier, while a track on the local storage 200 is shown at the third tier. The track depicted here results from a track spiraling from an inner circumference to an outer circumference of the local storage 200 having been drawn out to the sides. This track is made up of a lead-in area, a volume area, and a lead-out area. The volume area in the drawing has a layered structure made up of a physical layer, a filesystem layer, and an application layer. Expressing a format of the application layer (application format) of the local storage 200 using a directory structure gives the first tier in the drawing.

In this directory structure, a subdirectory "organization#1" is located under a ROOT directory, and under this is a subdirectory "disc#1". "organization#1" is a directory assigned to a specific provider of a movie work. "disc#1" is a directory assigned to a different one of BD-ROMs provided by the provider.

Setting a directory corresponding to each BD-ROM in a directory corresponding to a specific provider allows downloaded data relating to each BD-ROM to be stored separately. Under this subdirectory are stored PlayList information (00002.mpls), Clip information (00002.clpi), an AVClip (00002.m2ts), a BD-J Object (00002.bobj), a Java archive file (00002.jar), click sound data (sound.bdmv), and Movie Object.bdmv similar to what are stored on the BD-ROM.

The following describes the PlayList information, the Clip information, and the AVClip that are the components in the local storage 200.

<Local Storage 200 Structure, Part 1: AVClip>

The AVClip (00002.m2ts) on the local storage 200 constitutes a SubClip. The SubClip is an AVClip that contains an elementary stream which is decoded and played back simultaneously with a MainClip. The SubClip has a plurality of types such as a "Primary audio stream", a "Secondary audio stream", a "Presentation Graphics (PG) stream", and an "Interactive Graphics (IG) stream" (hereafter the SubClip is also referred to as an Out-of-MUX stream).

In this embodiment, it is assumed that 00002.m2ts shown in FIG. 11 is a SubClip generated by multiplexing a Secondary audio stream, a PG stream, and an IG stream. The Secondary audio stream is explained in detail below.

<Out-of-MUX Stream, Part 1: Secondary Stream>

While a Primary audio stream is an audio stream that provides the so-called main sound, a Secondary audio stream is an audio stream that provides the so-called sub-sound. When playing back the SubClip, the audio playback of the Secondary audio stream is output having been mixed with the audio playback of the Primary audio stream. The sound treated as the Secondary audio stream includes, for example, a "commentary sound". When the main sound of the Primary audio stream is a sound of a movie work and the sub-sound of the Secondary audio stream is a commentary sound of a director of the movie work, the sound of the movie work is output having been mixed with the commentary sound.

The Secondary audio stream is recorded only on the local storage 200 and submitted for playback, and is not recorded on the BD-ROM. Meanwhile, the Primary audio stream may be located on any of the BD-ROM and the local storage 200. Also, a codec of the Primary audio stream may be different from that of the Secondary audio stream.

Figure 12:
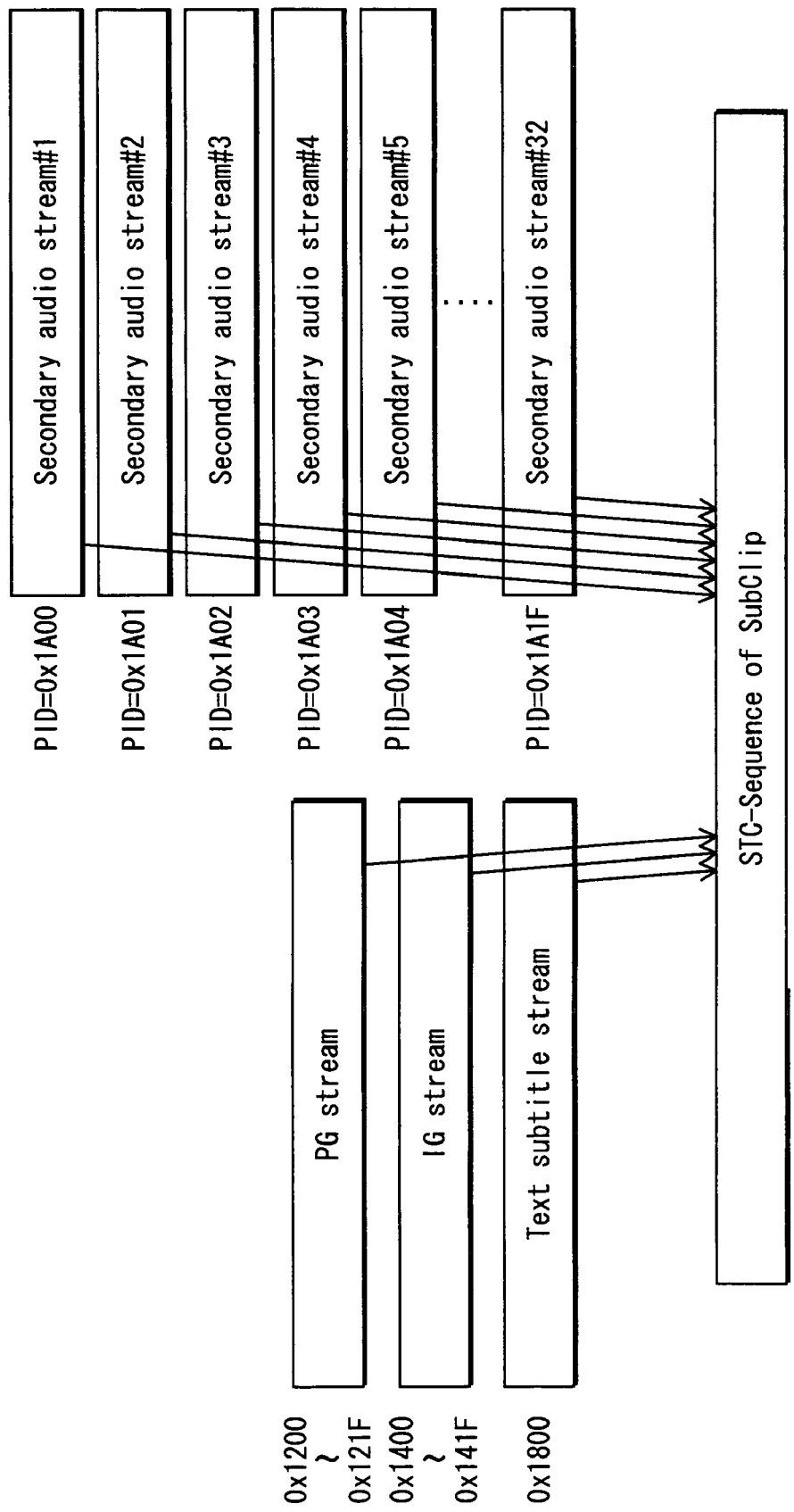
FIG. 12 shows elementary streams which are multiplexed to form a SubClip.

FIG. 12 shows elementary streams that are multiplexed to form the SubClip. Secondary audio streams having PIDs 0x1A00 to 0x1A1F are multiplexed to form the SubClip in addition to PG streams having PIDs 0x1200 to 0x121F and IG streams having PIDs 0x1400 to 0x141F. The PIDs of the PG streams and IG streams in the SubClip are the same as the PIDs of the PG streams and IG streams in the MainClip. Meanwhile, the PIDs of the 32 Secondary audio streams are all different from the PIDs of the 32 Primary audio streams, as they have different higher-order bytes.

FIG. 13 shows a PID assignment map in the BD-ROM standard. In the drawing, 0x0100 is assigned to a Program_map, 0x1001 is assigned to a PCR, 0x1011 is assigned to a video stream, a zone from 0x1100 to 0x111F is assigned to a Primary audio stream, a zone from 0x1200 to 0x121F is assigned to a PG stream, a zone from 0x1400 to 0x141F is assigned to an IG stream, and a zone from 0x1A00 to 0x1A1F is assigned to a Secondary audio stream. As is clear from this PID assignment map, the zone assigned to the Primary audio stream is different from the zone assigned to the Secondary audio stream.

FIG. 14A shows an internal structure of the Secondary audio stream.

As shown in the drawing, the Secondary audio stream is made up of a plurality of audio frames. FIG. 14B shows an example audio frame. The audio frame of the Secondary audio stream includes metadata.

FIG. 14C shows an internal structure of the metadata. As shown in the drawing, the metadata is composed of "downmixing information" and "gain control information".

The downmixing information is information for downmixing. Downmixing is a conversion that makes more coding channels fit into fewer playback channels for audio. The downmixing information defines a conversion coefficient matrix for downmixing, to have a device for playing back audio, such as the stream supply device 300 and the audio amplifier 400, perform downmixing. For example, downmixing enables an audio stream of 5.1 ch to be played back with 2 ch.

The gain control information is information for increasing/decreasing a gain of audio output of the Primary audio stream.

In this embodiment, the gain control information is only used to decrease the gain. FIG. 14D schematically shows an example of the gain control information As shown in the drawing, the metadata of the Secondary audio stream enables the output of the simultaneously played Primary audio stream to be decreased in real time. In the case where the Primary audio stream is superimposed with the Secondary audio stream, the pair of Primary and Secondary audio streams to be mixed with each other is known in advance. Accordingly, there is no need to control the gains of the two audio streams in real time, as it is sufficient to decrease only the gain of the Primary-audio stream and mix (superimpose) it with the Secondary audio stream without changing the gain of the Secondary audio stream.

Note here that only gain control information that is valid in a duration from a time specified by a mark_time stamp of a PlayListMark may be stored.

Figure 15:
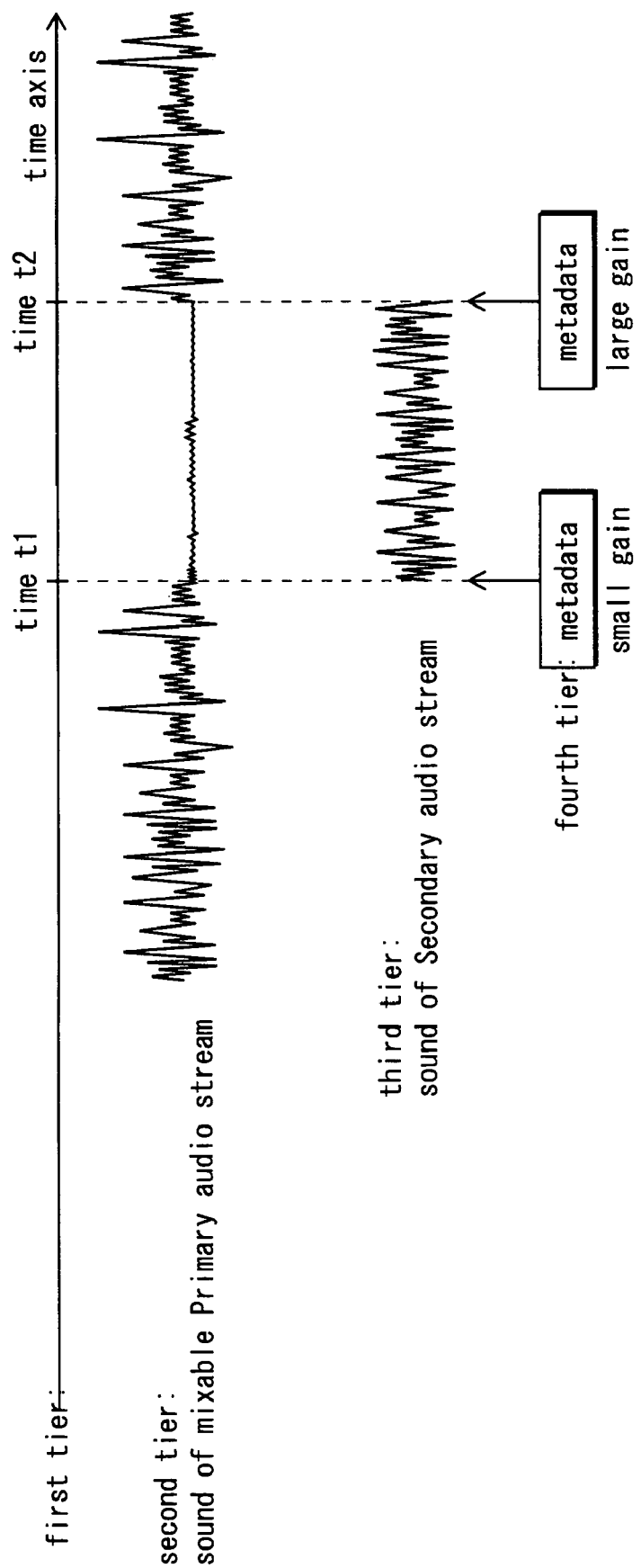
FIG. 15 shows how a sound level of a Primary audio stream is controlled by metadata in a Secondary audio stream.

FIG. 15 shows how a sound level of the Primary audio stream is controlled by the metadata included in the Secondary audio stream. The first tier in the drawing shows a time axis, while the second tier shows playback output of the mixable Primary audio stream. The third tier shows playback output of the Secondary audio stream, while the fourth tier shows the metadata multiplexed in the Secondary audio stream.

The metadata provided in an audio frame at playback time t1 is used to suppress the sound level of the playback output of the Primary audio stream on the whole. Meanwhile, the metadata provided in an audio frame at playback time t2 is used to recover the sound level of the playback output of the Primary audio stream. By providing such metadata at playback times t1 and t2, damage to the speaker as a result of the sound level of the playback output of the Primary audio stream and the sound level of the playback output of the Secondary audio stream being added together can be avoided.

To perform gain adjustment for mixing in real time using the gain control information of the Secondary audio stream, it is sufficient for the gain control information stored in each audio frame of the Secondary audio stream from t1 to t2 to designate a predetermined gain decrease of the Primary audiostream. This method that enables adequate gain controls at any time is suitable especially in the case of special playback such as jumping into the period from t1 to t2 and performing mixed playback.

<Local Storage 200 Structure, Part 2: PlayList Information>

Figure 16:
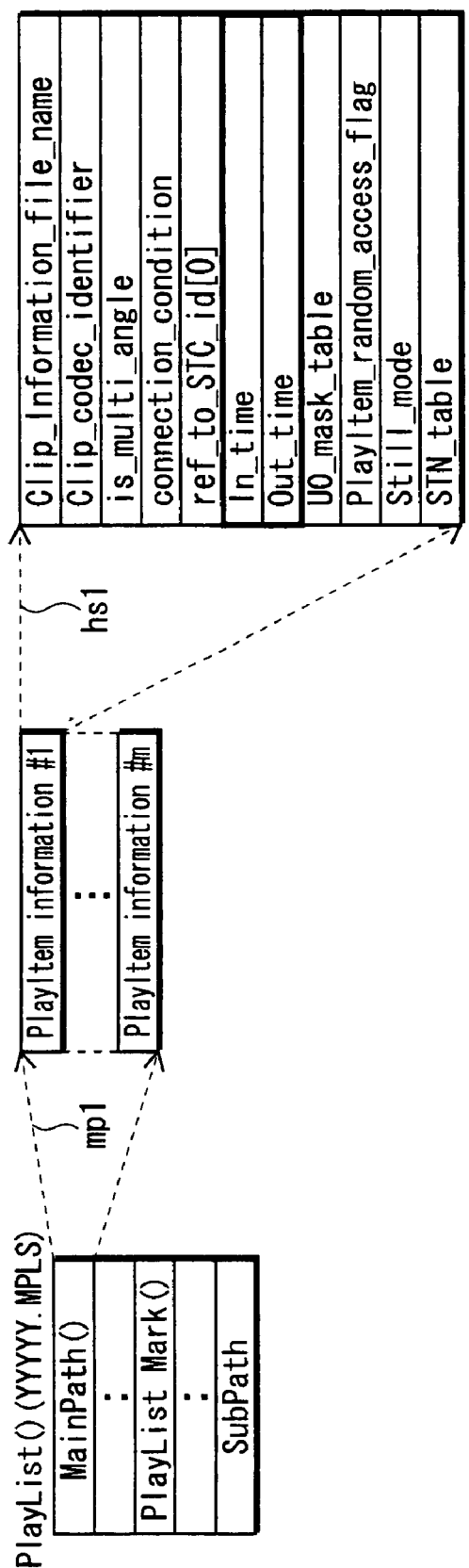
FIG. 16 shows a data structure of PlayList information.

The following describes the PlayList information on the local storage 200. The file with the extension "mpls" (00002.mpls) is information that defines a combination of two types of presentation paths called a MainPath and a Subpath as a PlayList (PL). FIG. 16 shows a data structure of the PlayList information. As illustrated, the PlayList information includes Mainpath information (MainPath( )) for defining a Mainpath, PlayListMark information (PlayListMark( )) for defining a chapter, and Subpath information (Subpath( )) for defining a Subpath. The internal structure of the PlayList information and the internal structure of the PlayItem information are the same as those in the BD-ROM, and so their explanation has been omitted here.

<PlayList Information, Part 1: Subpath Information>

While a MainPath is a presentation path defined on a Main-Clip which serves as main video, a subpath is a presentation path defined on a SubClip to be synchronized with the Main-Path.

Figure 17:
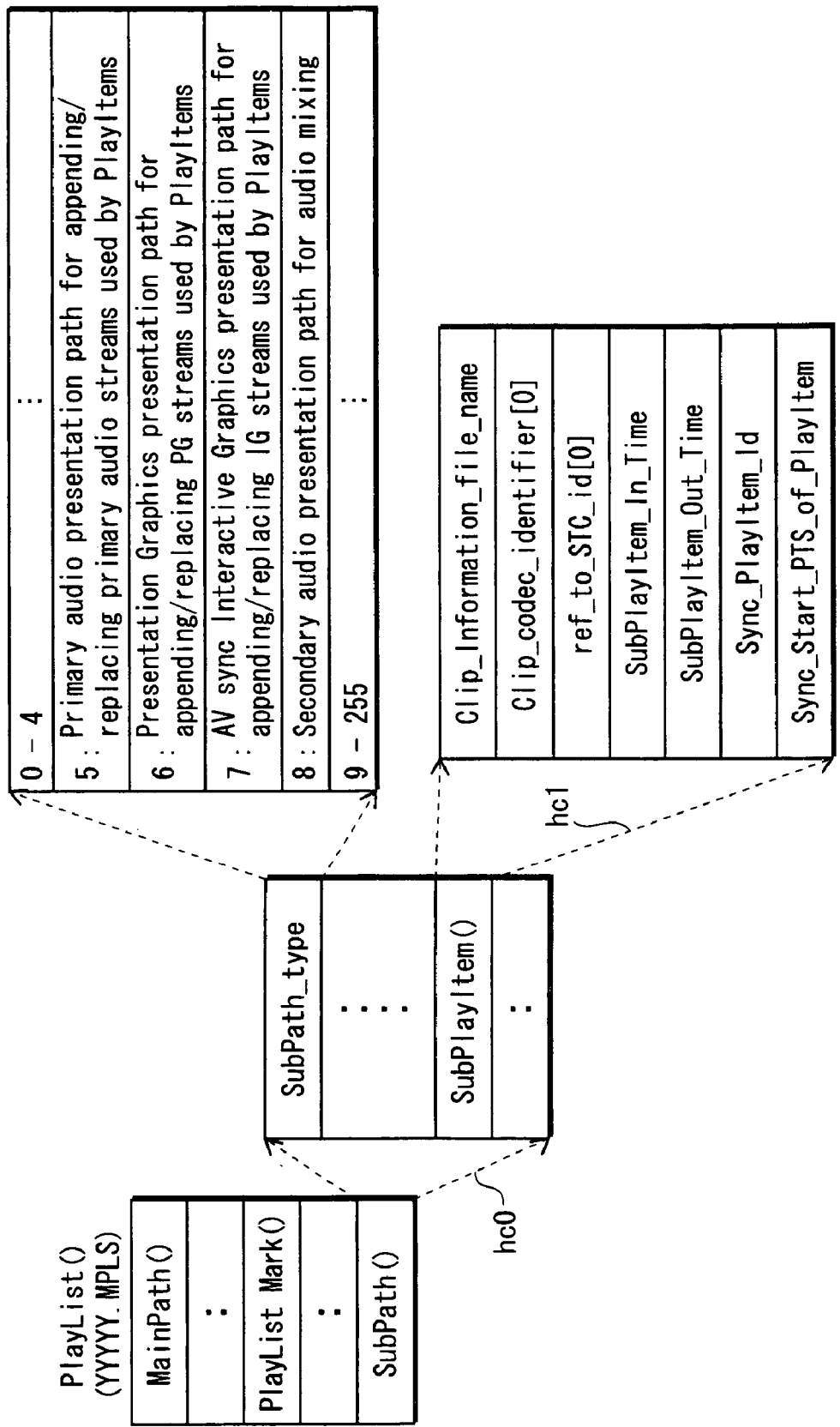
FIG. 17 shows a close-up of an internal structure of Subpath information.

FIG. 17 shows a close-up of an internal structure of the Subpath information. Each Subpath includes a SubPath_type showing a type of a SubClip and one or more pieces of SubPlayItem information ( . . . SubPlayItem( ) . . . ), as shown by the arrows hc0 in the drawing.

The arrows hc1 show a close-up of a structure of the Sub-PlayItem information. As shown by the arrows hc1, the Sub-PlayItem information is made up of a Clip_information_file_name, a Clip_code_identifier, a ref_to_STC_id[0], a SubPlayItem_In_time, a SubPlayItem_Out_time, a sync_PlayItem_id, and a sync_start_PTS_of_PlayItem.

The Clip_information_file_name is information that uniquely identifies a SubClip corresponding to the SubPlayItem, by showing a filename of Clip information.

The Clip_codec_identifier shows a coding method of the AVClip.

The ref_to_STC_id[0] uniquely identifies an STC_Sequence targeted by this PlayItem.

The SubPlayItem_In_time is information showing a start point of the SubPlayItem on a playback time-axis of the SubClip.

The SubPlayItem_Out_time is information showing an end point of the SubPlayItem on the playback time axis of the SubClip.

The sync_PlayItem_id is information for uniquely identifying a PlayItem to be synchronized with this SubPlayItem, among the PlayItems constituting the MainPath. The Sub-PlayItem_In_time exists on a playback time axis of the Play-Item specified by this sync_PlayItem_id.

The sync_start_PTS_of_PlayItem shows the start point of the SubPlayItem shown by the SubPlayItem_In_time, on the playback time axis of the PlayItem identified by the sync_PlayItem_id.

<Subpath Information, Part 1: SubPath_Type>

The SubPath information is as described above. The following describes the SubPath_type. The SubPath_type indicates what kind of presentation path the SubPath defined by the SubPath information is, as a result of having been set to a value from 0 to 255.

When the SubPath_type is set to 5, the SubPath defined by the SubPath information is a Primary audio presentation path. The Primary audio presentation path is used when an audio stream to be played back instead of a Primary audio stream referenced by the MainPath (PlayItem) is included in the SubPath (SubPlayItem).

When the SubPath_type is set to 6, the SubPath defined by the SubPath information is a Presentation Graphics presentation path for appendence/replacement. In detail, the SubPath is a PG stream that can be appended to or replace a PG stream played back by the PlayItem information.

When the SubPath_type is set to 7, the SubPath defined by the SubPath information is an Interactive Graphics presentation path for appendence/replacement. In detail, the SubPath is an IG stream that can be appended to or replace an IG stream played back by the PlayItem information.

When the SubPath_type is set to 8, the SubPath defined by the SubPath information is a Secondary audio presentation path. The Secondary audio presentation path is defined for appendence. In detail, the Secondary audio presentation path is a Secondary audio stream that is to be mixed with playback sound of a Primary audio stream played back by the PlayItem information.

For example, to perform mixed playback of a Primary audio stream and a Secondary audio stream, it is necessary to operate two audio decoders and a mixer. This requires a player to know a playback type beforehand, unlike an ordinary case of playing back only a Primary audio stream. The SubPath_type or the PID of the STN_table enables the existence of the Secondary audio stream which is to be played back synchronously, to be notified to the player before playback.

The SubPath_type is as described above.

<SubPath Information, Part 2: Relationship of Three Elements>

The three elements mentioned here are a SubClip on the local storage 200, PlayList information on the local storage 200, and a MainClip on the BD-ROM.

Figure 18:
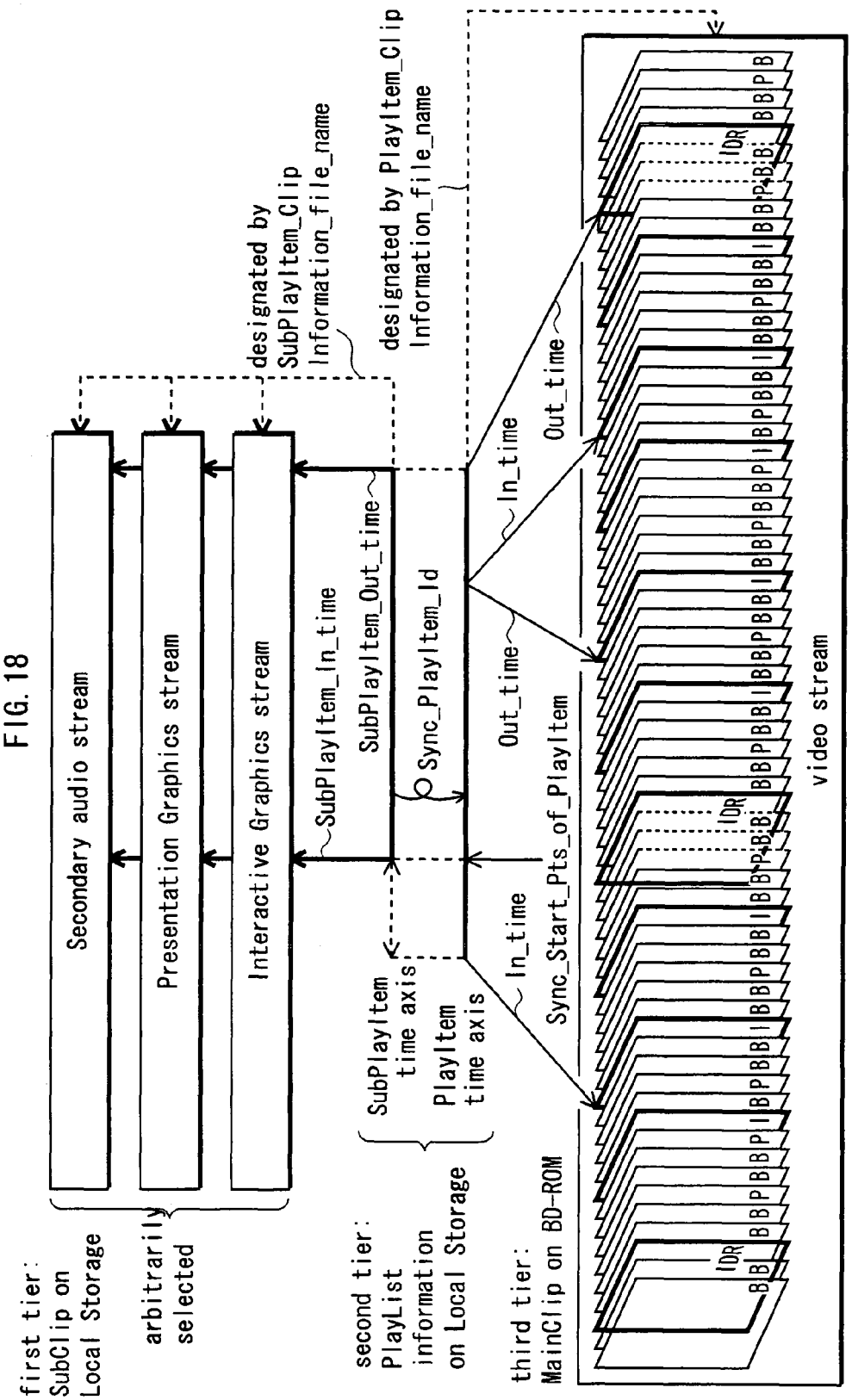
FIG. 18 shows a relationship between a SubClip on the local storage 200, PlayList information on the local storage 200, and a MainClip on the BD-ROM.

FIG. 18 shows the relationship of the SubClip on the local storage 200, the PlayList information on the local storage 200, and the MainClip on the BD-ROM. The first tier in the drawing shows the SubClip existing on the local storage 200. As shown at the first tier, the SubClip on the local storage 200 includes types such as a Secondary audio stream, a PG stream, and an IG stream. Any of these streams is submitted for synchronous playback as a SubPath.

The second tier shows two time axes defined by the PlayList information. The lower time axis at the second tier shows a PlayItem time axis defined by PlayItem information, while the upper time axis shows a SubPlayItemtime axis defined by a SubPlayItem.

As illustrated, a SubPlayItem_Clip_information_file_name in the SubPlayItem information has a SubClip selection function of selecting one of the .m2ts files stored in the STREAM directory as a playback section designation target.

Meanwhile, a SubPlayItem.IN_time and a SubPlayItem.Out_time have a function of defining a start point and an end point of a playback section on the SubClip.

The arrow Sync_PlayItem_Id has a synchronization designation function of designating a PlayItem to be synchronized with. Also, the arrow sync_start_PTS_of_PlayItem has a function of locating the SubPlayItem_In_time on the PlayItem time axis.

Figure 19:
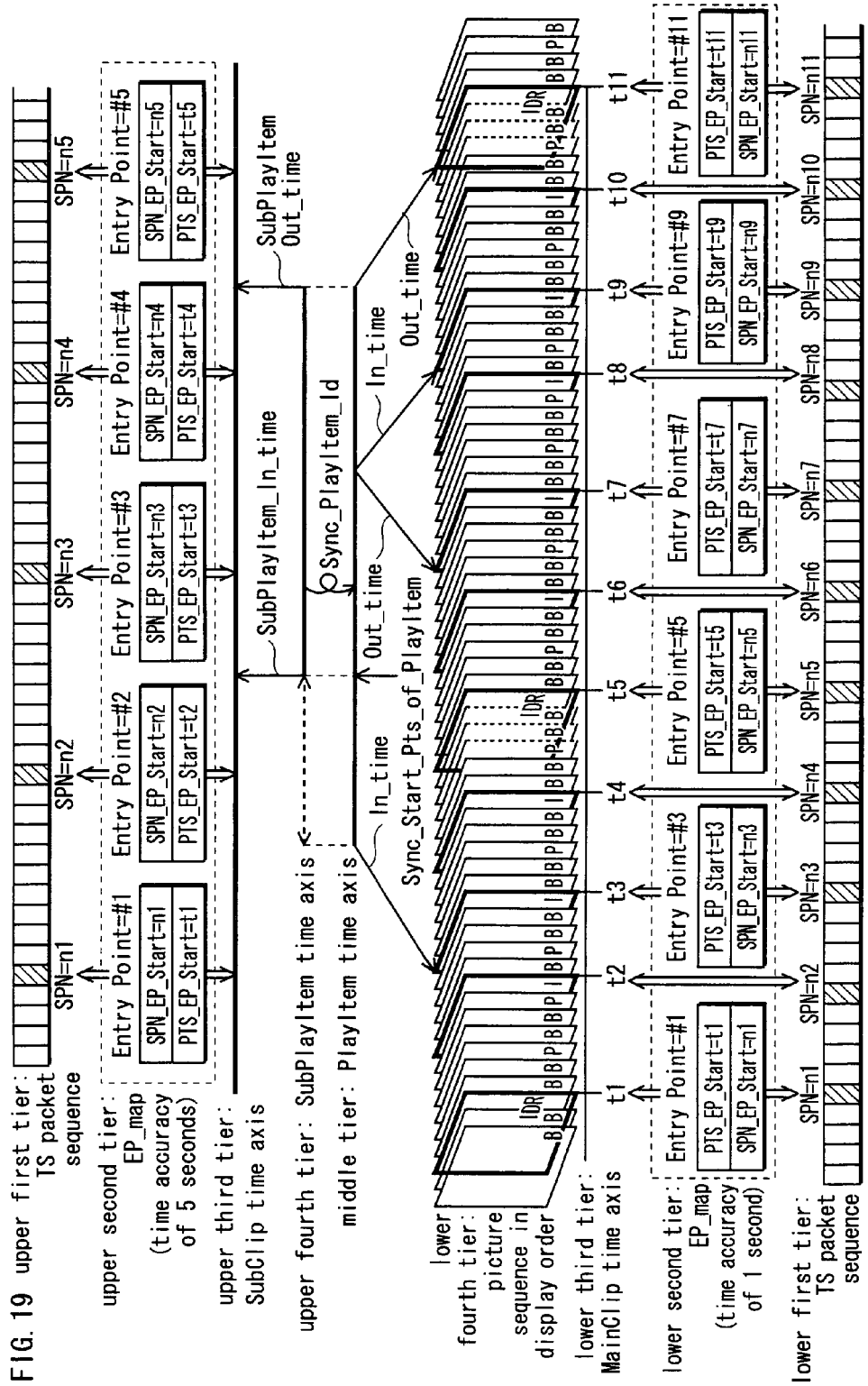
FIG. 19 shows an EP_map and a PlayItem time axis defined for a MainClip and an EP_map and a SubPlayItem time axis defined for a SubClip which is a Primary audio stream or a Secondary audio stream.

FIG. 19 shows an EP_map and a PlayItem time axis set for a MainClip and an EP_map and a SubPlayItem time axis set for a SubClip.

The middle tier and the lower fourth to first tiers in the drawing show the PlayItem time axis, the picture sequence, the MainClip time axis, the EP_map, and the TS packet sequence shown in FIG. 9.

The upper first to third tiers show a TS packet sequence, an EP_map, and a SubClip time axis. Also, the upper fourth tier shows a SubPlayItem time axis.

This completes the description of the SubPath information.

<STN_Table>

A characteristic feature of the PlayList information on the local storage 200 is an STN_Table. The following describes the PlayList information on the local storage 200.

The STN_table is a table showing playable streams which are available for presentation, among elementary streams multiplexed in the AVClip specified by the Clip_Information_file_name of the PlayItem information and Out_of_MUX streams specified by the Clip_Information_file_name of the SubPlayItem information. In detail, the STN_table is formed by associating a Stream_entry of each of the elementary streams multiplexed in the MainClip and the Out_of_MUX streams multiplexed in the SubClip, with a Stream_attribute.

FIG. 20 shows an internal structure of the STN_table. As shown in the drawing, the STN_table includes a plurality of combinations of entries and attributes (entry-attribute), and shows numbers of entry-attribute combinations (number_of_video_stream_entries, number_of_audio_stream_entries, number_of_PG_stream_entries, number_of_IG_stream_entries).

The entry-attribute combinations correspond to a video stream stream, a Primary audio stream, a Secondary audio stream, a PG stream, and an IG stream that are playable in the PlayItem, as indicated by the parenthesis "{". It should be noted here that each combination of Stream_entry and Stream_attribute corresponding to a Secondary audio stream is associated with a Comb_info_Secondary_audio_Primary_audio.

The entry-attribute combinations are explained in detail below.

FIG. 21A shows a Stream_attribute corresponding to a video stream.

The Stream_attribute for a video stream includes a Video_format showing a display method of the video stream, a frame_rate showing a display frequency of the video stream, and the like.

FIG. 21B shows a Stream_attribute corresponding to a Primary audio stream and a Secondary audio stream.

The Stream_attribute for a Primary audio stream or a Secondary audio stream includes a stream_coding_type showing a coding type of the audio stream, a format_depending_coding_type showing an audio frame structure when the stream_coding_type shows DTS or DTS-HD, an audio_presentation_type showing a channel structure of the audio stream, a Sampling_frequency showing a sampling frequency of the audio stream, and an audio_language_code showing a language attribute of the audio stream.

Figure 22:
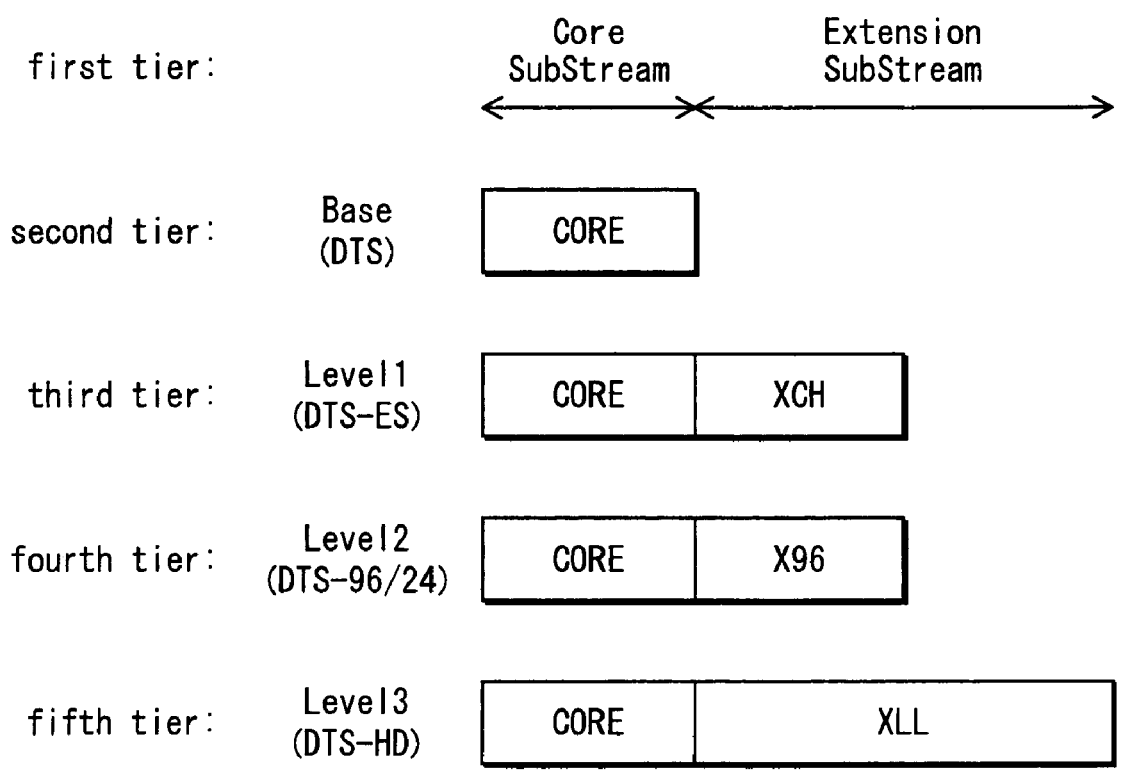
FIG. 22 shows a data structure assigned to each of Base, Level1, Level2, and Level3 in a format_depending_coding_type of a Stream_attribute in an audio frame of a DTS-HD Primary audio stream.

The format_depending_coding_type shows the audio frame structure using one of four parameters that are Base, Level1, Level2, and Level3. FIG. 22 shows a data structure to which each of Base, Level1, Level2, and Level3 in the format_depending_coding_type is assigned, in an audio frame of a DTS-HD Primary audio stream. The audio frame of the DTS-HD audio stream is composed of base data "Core Substream" and extension data "Extension Substream". The Core Substream is equivalent to a DTS audio stream, and can be transmitted in a band of 1.5 Mbps. Therefore, the Core Substream can be transmitted even with S/PIDF. On the other hand, the Extension Substream is extension data that does not exist in a DTS audio stream, and is unplayable without a decoder which supports DTS-HD.

CORE, i.e. the Core Substream of DTS-HD, contains audio data of 48 kHz/5.1 ch.

The Extension Substream is made up of any of XCH, X96, and XLL, as shown at the third to fifth tiers in the drawing.

XCH of DTS-ES can contain audio data which enables audio playback of 6.1 ch and 48 KHz with one channel having been added to 5.1 ch, when used together with the Core Substream. X96 of DTS-96/24 can contain audio data which enables audio playback of 5.1 ch and 96 KHz, when used together with the Core Substream. XLL of DTS-HD can contain audio data which enables multi-channel lossless audio payback of 192 KHz, when used together with the Core Substream.

When the format_depending_coding_type is set to Base, the audio frame is composed of only CORE which is the Core Substream. When the format_depending_coding_type is set to Level1, the audio frame is a DTS-ES audio frame composed of CORE which is the Core Substream and XCH which is the Extension Substream. When the format_depending_coding_type is set to Level2, the audio frame is a DTS-96/24 audio frame composed of CORE which is the Core Substream and X96 which is the Extension Substream. When the format_depending_coding_type is set to Level3, the audio frame is a DTS-HD audio frame composed of CORE which is the Core Substream and XLL which is the Extension Substream.

Though the above describes the case where only CORE of the DTS audio stream is contained in the Core Substream, the format_depending_coding_type may show which extension data out of DTS (CORE), DTS-ES (XCH), DTS-96/24 (X96), and DTS-HD (XLL) is contained, without distinguishing the Core Substream and the Extension Substream.

FIG. 21C shows a Stream_entry corresponding to a video stream. As shown in the drawing, the Stream_entry for a video stream includes a ref_to_Stream_PID_of_Main_Clip showing a PID used for demultiplexing the video stream.

A Stream_entry of a Primary audio stream, an IG stream, and a PG stream multiplexed in a MainClip has a form shown in FIG. 21C.

FIG. 21D shows a Stream_entry corresponding to a stream multiplexed in a SubClip (hereafter a Secondary audio stream is used as an example). The Stream_entry for a Secondary audio stream includes a ref_to_Sub_Path_id showing SubPath information referencing the Secondary audio stream, a ref_to_Sub_Clip_entry_id showing a SubClip in which the Secondary audio stream is multiplexed, and a ref_to_stream_PID_of_Sub_Clip showing a PID used for demultiplexing the Secondary audio stream.

FIG. 21E shows an internal structure of a Comb_info_Secondary_audio_Primary_audio associated with a combination of Stream_entry and Stream_attribute for a Secondary audio stream. The Comb_info_Secondary_audio_Primary_audio includes a number_of_primary_audio_stream_ref_entries showing a total number of Primary audio streams combinable with the Secondary audio stream, and Primary_audio_stream_id_ref[0] to [n] each showing a stream number of a Primary audio stream combinable at the time of playback.

Figure 23:
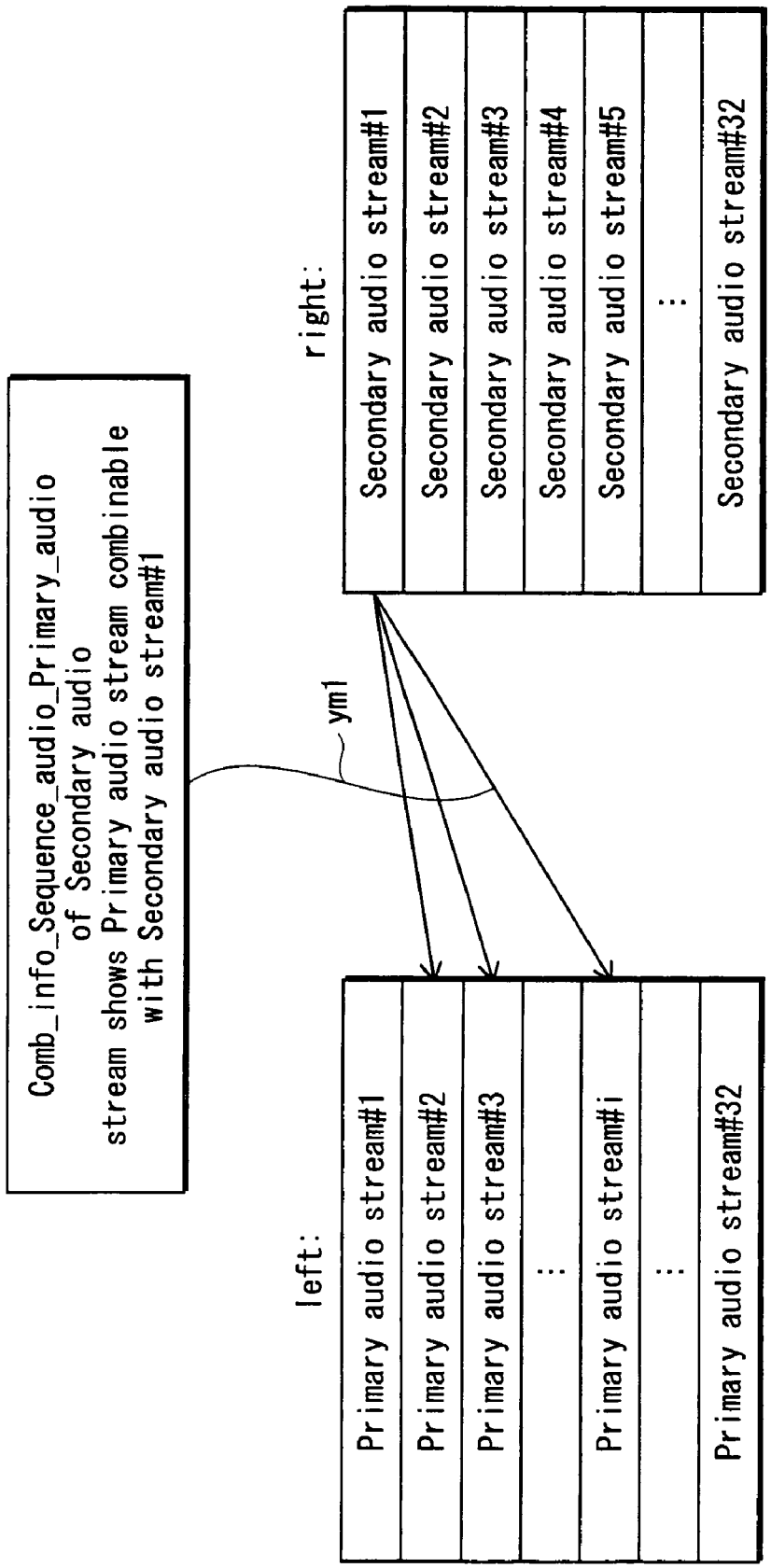
FIG. 23 shows designation of Primary audio streams by a Comb_info_Secondary_audio_Primary_audio.

FIG. 23 shows designation of Primary audio streams by the Comb_info_Secondary_audio. Primary_audio. The right side of the drawing shows 32 Secondary audio streams, whilst the left side shows 32 Primary audio streams. The arrows ym1 show designation by the Comb_info_Secondary_audio_Primary_audio of Secondary audio stream#1. Thus, the Comb_info_Secondary_audio_Primary_audio set for each Secondary audio stream designates one or more Primary audio streams that can be mixed with playback output of the Secondary audio stream. In this way, the mixability can be determined according to the audio attribute at the time of authoring, such that the Secondary audio stream is mixed not when playing back a Primary audio stream having a predetermined attribute but only when playing back a Primary audio stream having an attribute other than the predetermined attribute.

The PlayList information on the local storage 200 is as described above. This completes the description of the local storage 200.

<Virtual Package>

Figure 24:
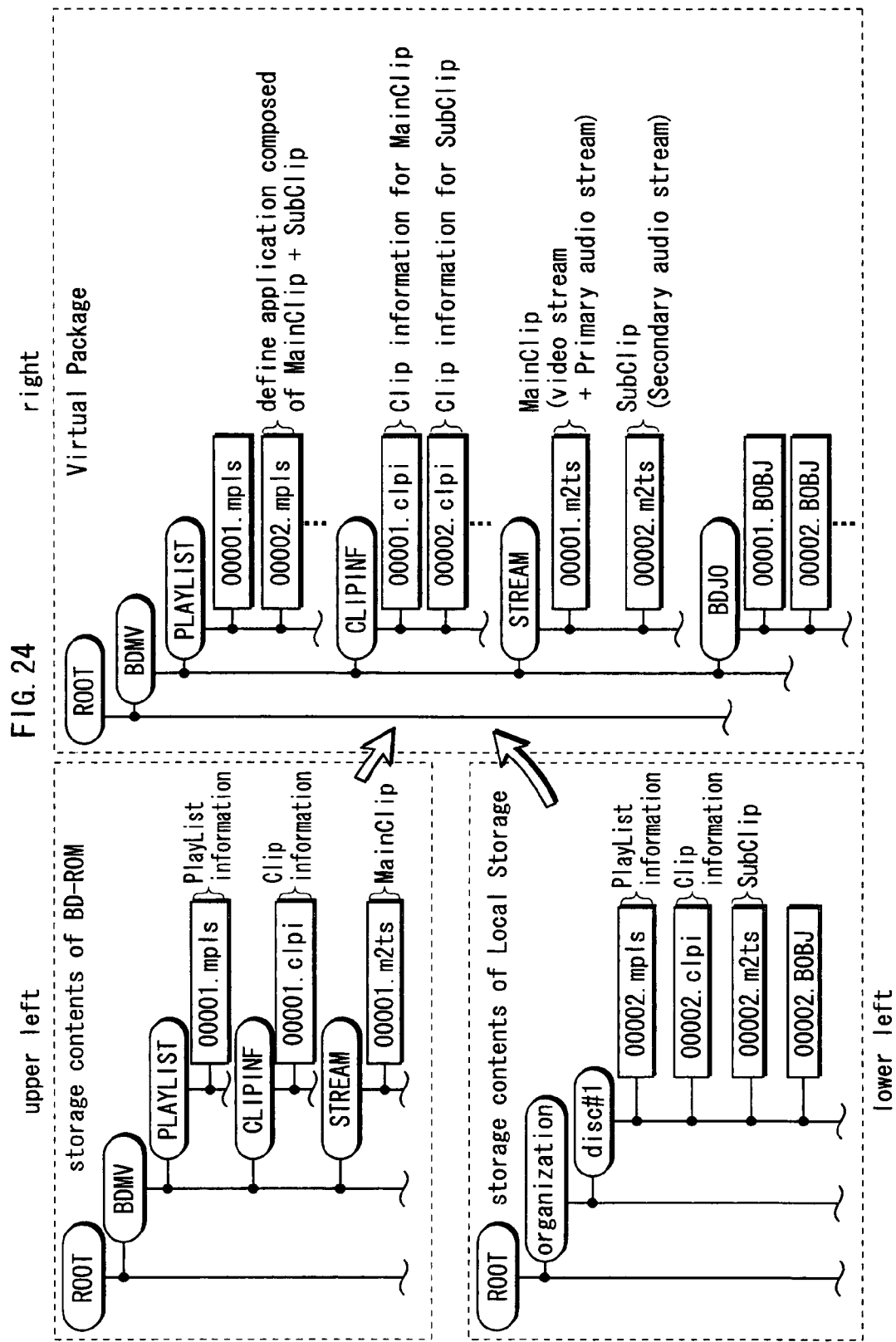
FIG. 24 shows a virtual filesystem generated by a stream supply device 300.

The following describes a virtual package. FIG. 24 shows a virtual package generated by the stream supply device 300. The storage contents of the BD-ROM are shown at the upper left of the drawing, while the storage contents of the local storage 200 are shown at the lower left of the drawing. Also, a structure of the virtual package is shown on the right side of the drawing.

The stream supply device 300 obtains one virtual BD-ROM disc image (virtual package), by combining an AVClip, Clip information, and PlayList information on the BD-ROM with an AVClip, Clip information, and PlayList information on the local storage 200.

This combination can be made by i) virtually adding the PlayList (00002.mpls) on the Local Storage to the MPLS directory on the BD-ROM, ii) virtually adding Clip information#2 (00002.clpi) on the Local Storage to the CLPI directory on the BD-ROM, and iii) virtually adding AVClip#2 (00002.m2ts) on the Local Storage to the STREAM directory on the BD-ROM.

As a result, the virtual package shown on the right side of FIG. 24 is obtained.

This completes the description of the recording medium. The following describes the audio amplifier 400 according to the present invention.

Figure 25:
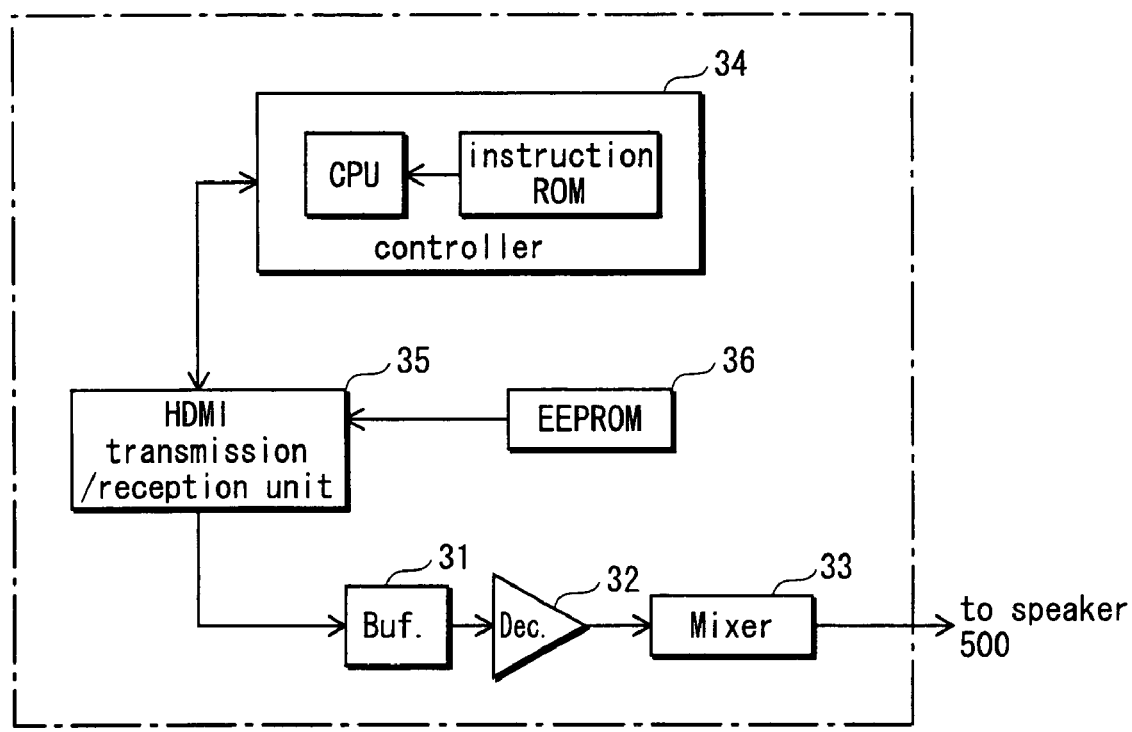
FIG. 25 shows an internal structure of an audio amplifier 400 according to the present invention.

FIG. 25 shows an internal structure of the audio amplifier 400. The audio amplifier 400 according to the present invention is manufactured based on this internal structure. The audio amplifier 400 according to the present invention can be manufactured by mainly mounting a system LSI on a cabinet and substrate of the device. The system LSI is an integrated circuit including various processing units for achieving the functions of the audio amplifier 400. The audio amplifier 400 manufactured in this way includes a buffer 31, an audio decoder 32, a Mixer 33, a controller 34, a HDMI transmission/reception unit 35, and an EEPROM 36.

The buffer 31 stores a Primary audio stream, among data received by the HDMI transmission/reception unit 35, on a first-in first-out basis and supplies the Primary audio stream to the audio decoder 32.

The audio decoder 32 decodes the Primary audio stream stored in the buffer 31 to obtain uncompressed LPCM audio data, and outputs it to the Mixer 33.

The Mixer 33 converts the digital audio output from the audio decoder 32 so as to fit the number of channels corresponding to the number of speakers 500 connected to the audio amplifier 400 and the allocation of the speakers 500 (hereafter referred to as "speaker structure"), and assigns and outputs the converted audio to each speaker. For instance, digital audio of 5.1 ch obtained as a result of decoding may be output having been reduced to fit the number of connected speakers (e.g. 2.1 ch), or digital audio of 2 ch obtained as a result of decoding may be output having been increased to fit the number of connected speakers (e.g. 5.1 ch).

The controller 34 controls the operation of the audio amplifier 400, by a CPU reading and executing a program stored on an instruction ROM.

The HDMI transmission/reception unit 35 transmits information showing a performance capability of the audio amplifier 400, to the stream supply device 300 to which the audio amplifier 400 is connected via HDMI. The HDMI transmission/reception unit 35 also receives audio data from the stream supply device 300 via HDMI.

The EEPROM 36 is a nonvolatile memory holding the information (hereafter DIB (Decoder Information block)) which shows the performance capability of the audio amplifier 400 and is notified from the HDMI transmission/reception unit 35 to the stream supply device 300. As one example, E-EDID (ENHANCED EXTENDED DISPLAY IDENTIFICATION DATA) prescribed by EIA/CEA-861B can be used as the DIB. FIG. 26A schematically shows a data structure of a part of the DIB that pertains to an audio playback performance capability.

As shown in the drawing, the DIB includes, as information pertaining to the audio playback performance capability, fields such as a CODING TYPE, a Format depending coding type, a Channel Count, a Channel/Speaker Allocation, and a Sample Frequency.

FIG. 26B shows a value that can be set in each field of the DIB.

The CODING TYPE shows which coding method out of DTS-HD, MLP, DD+, and the like can be used by the audio decoder 32.

The Format depending coding type shows, when the CODING TYPE indicates that the audio amplifier 400 is capable of DTS-HD decoding, up to which level of extension data of an audio stream of DTS-HD, i.e. the extension standard for DTS audio streams, is decodable. The extension data decodable level is specified using one of the four parameters Base, Level1, Level2, and Level3.

The Channel Count shows a number of decodable channels, such as 7.1 ch, 5.1 ch, and 2 ch.

The Channel/Speaker Allocation shows physical speaker allocation information such as "L/R/C/LS/RS/LFE which is a stereo allocation for 5.1 ch, "L/R/C/LS/RS/LR/RR/LFE" which is a stereo allocation for 7.1 ch, and "L/R" which is a stereo allocation for 2 ch.

The Sample Frequency shows a playable sampling frequency such as 48 KHz, 192 KHz, and 96 KHz.

The Format depending coding type is explained in detail below.

As shown in FIG. 22, Base, Level1, Level2, and Level3 in the Format depending coding type for DTS-HD are assigned respectively to DTS (CORE), DTS-ES (CORE+XCH), DTS-96/24 (CORE+X96), and DTS-HD (CORE+XLL). When the Format depending coding type is set to Base, the audio decoder 32 is capable of decoding only DTS (CORE) in decoding of a DTS-HD audio stream. When the Format depending coding type is set to Level1, the audio decoder 32 is capable of decoding up to DTS-ES (CORE+XCH) in decoding of a DTS-HD audio stream. When the Format depending coding type is set to Level2, the audio decoder 32 is capable of decoding up to DTS-96/24 (CORE+X96) in decoding of a DTS-HD audio stream. When the Format depending coding type is set to Level3, the audio decoder 32 is capable of decoding up to DTS-HD (CORE+XCH+X96+XLL) in decoding of a DTS-HD audio stream.

Figure 27:
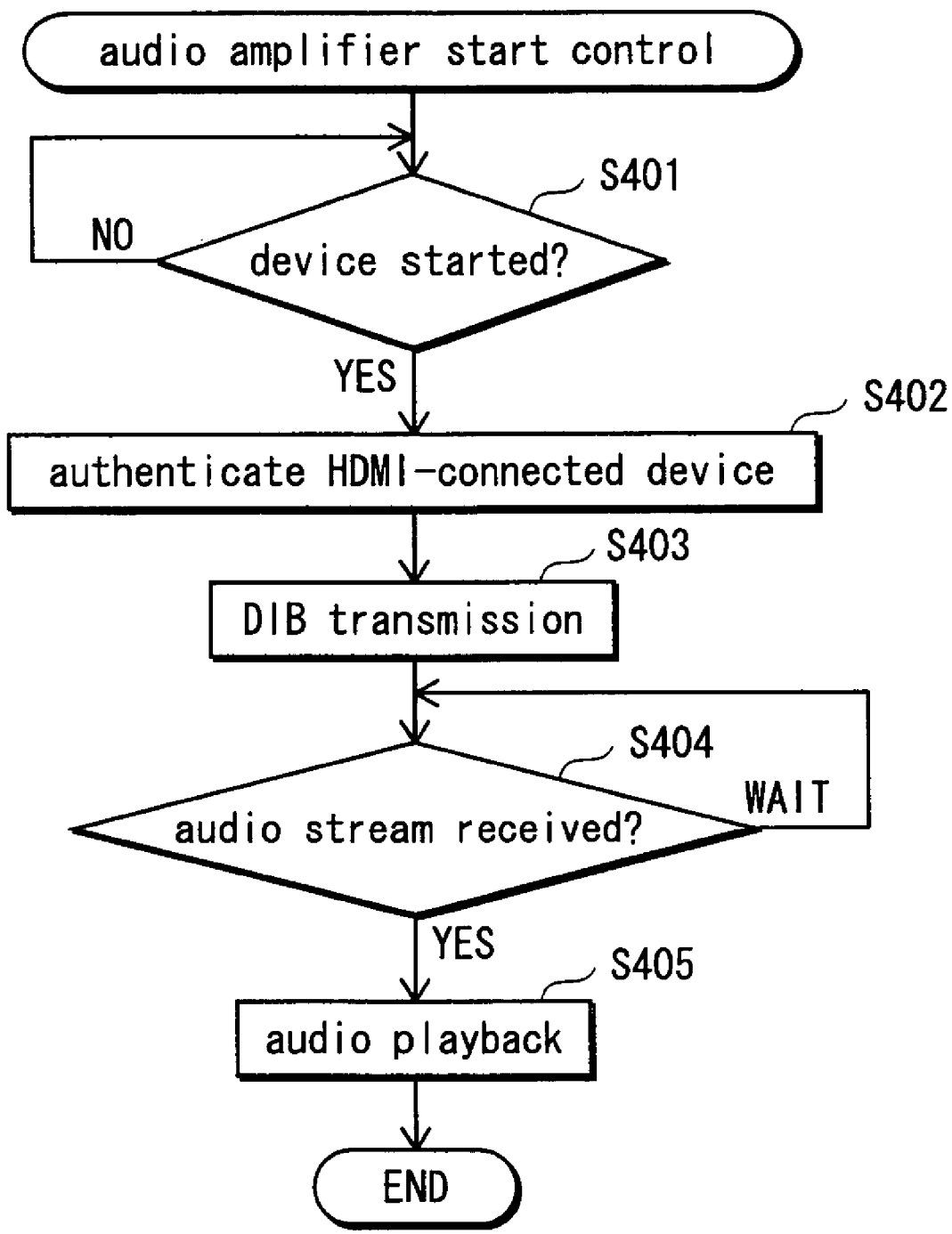
FIG. 27 shows processing by a controller 34.

The hardware structure of the audio amplifier 400 according to this embodiment is as described above. The following describes a software structure of the audio amplifier 400 according to this embodiment. By the CPU reading and executing the software stored on the instruction ROM, the controller 34 controls audio playback of the audio amplifier. FIG. 27 shows processing by the controller 34.

Step S401 is a start waiting judgment as to whether the audio amplifier 400 is started. If the audio amplifier 400 is started, authentication of a device connected via HDMI is performed (step S402). If the HDMI-connected device is judged as authorized as a result of the authentication, the controller 34 moves to step S403. After having the HDMI transmission/reception unit 35 transmit the DIB held in the EEPROM 36 to the stream supply device 300 in step S403, the controller 34 moves to step S404. Step S404 is an audio stream reception waiting loop. Upon receiving an audio stream (step S404: YES), audio playback is launched (step S405).

The audio amplifier 400 according to this embodiment is as described above. The following describes the stream supply device 300 according to the present invention.

Figure 28:
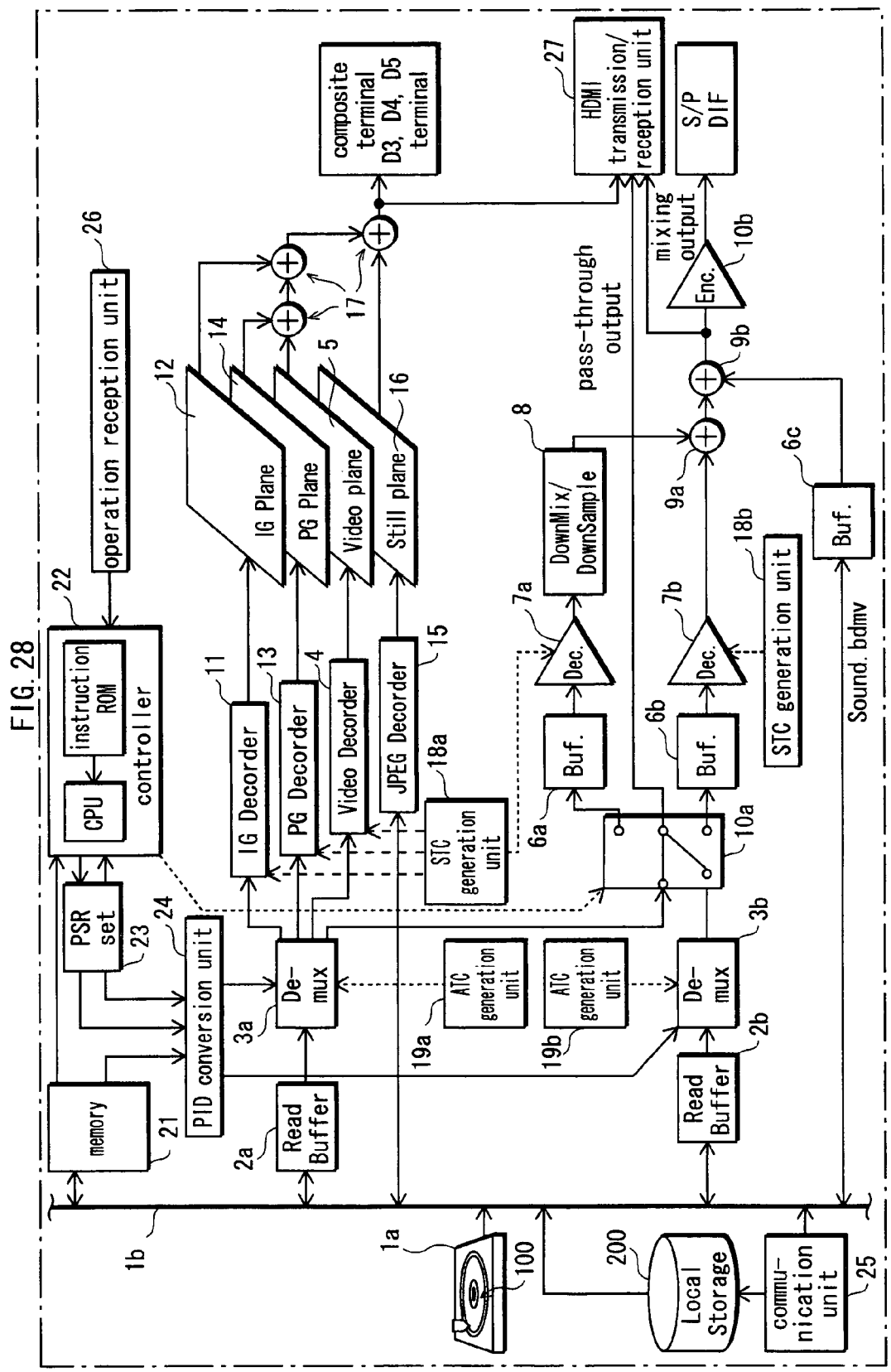
FIG. 28 shows an internal structure of the stream supply device 300 according to the present invention.

FIG. 28 shows an internal structure of the stream supply device 300 according to the present invention. The stream supply device 300 according to the present invention is manufactured based on this internal structure. The stream supply device 300 according to the present invention is roughly made up of two parts that are a system LSI and a drive device. The stream supply device 300 according to the present invention can be manufactured by mounting these parts on a cabinet and substrate of the device. The system LSI is an integrated circuit including various processing units for achieving the functions of the stream supply device 300. The stream supply device 300 manufactured in this way includes a BD-ROM drive 1a, a bus 1b, read buffers 2a and 2b, demultiplexers 3a and 3b, a video decoder 4, a video plane 5, buffers 6a and 6b, audio decoders 7a and 7b, a DownMix/DownSample 8, a mixer 9a, a mixer 9b, a switch 10a, an encoder 10b, an Interactive Graphics decoder 11, an Interactive Graphics plane 12, a Presentation Graphics decoder 13, a Presentation Graphics plane 14, a JPEG decoder 15, a Still plane 16, a composition unit 17, STC generation units 18a and 18b, ATC generation units 19a and 19b, a memory 21, a controller 22, a PSR set 23, a PID conversion unit 24, a communication unit 25, an operation reception unit 26, and an HDMI transmission/reception unit 27.

The BD-ROM drive 1a loads/ejects the BD-ROM, and accesses the BD-ROM.

The bus 1by is used to transfer TS packets read from the BD-ROM and TS packets read from the local storage 200.

The read buffer 2a is a FIFO memory in which TS packets read from the BD-ROM or the local storage 200 are stored on a first-in first-out basis.

The read buffer 2by is a FIFO memory in which TS packets read from the local storage 200 are stored on a first-in first-out basis.

The demultiplexer 3a outputs TS packets having PIDs notified by the PID conversion unit 24 out of TS packets which are transferred on the bus and have PIDs including 0x1011, 0x1100 to 0x111F, 0x1200 to 0x121F, and 0x1400 to 0x141F, to any of the video decoder 4, the switch 10a, the Interactive Graphics decoder 11, and the Presentation Graphics decoder 13.

The demultiplexer 3by demultiplexes TS packets having the PIDs 0x1A00 to 0x1A1F, i.e. TS packets constituting a Secondary audio stream, out of the TS packets transferred on the bus 1b. The demultiplexing of the Secondary audio stream by the demultiplexer 3by is conducted by comparing a PID of a TS packet transferred on the bus 1by with a PID reference value written in a stream_entry corresponding to a stream number stored in PSR14 among stream_entries for a Secondary audio stream in the STN_table, and outputting the TS packet to the switch 10a if the PIDs match. When there is only one playable Secondary audio stream, the above comparison can be performed just by comparing the higher-order byte "1A" of the PID reference value written in the stream_entry with the higher-order byte "1A" of the PID of the TS packet transferred on the bus 1b. Since there is no other Secondary audio stream, it is sufficient to reference the higher-order byte of the PID which indicates that the stream is a Secondary audio stream.

When there are a plurality of playable Secondary audio streams, the above comparison is performed by comparing the higher-order byte "1A" of the PID reference value written in the stream_entry with the higher-order byte "1A" of the PID of the TS packet transferred on the bus 1b, and also comparing the lower-order byte (a value from 0x00 to 0x1F) of the PID reference value written in the stream_entry with the lower-order byte (a value from 0x00 to 0x1F) of the PID of the TS packet transferred on the bus 1b. Since there are a plurality of Secondary audio streams, it is necessary to reference not only the higher-order byte but also the lower-order byte of the PID in order to identify the Secondary audio stream to be played back.

TS packets read from the BD-ROM and TS packets read from the local storage 200 are transferred on the bus 1b. This being so, the demultiplexers 3a and 3by can feed the TS packets read from the BD-ROM and the TS packets read from the local storage 200 to the buffer as one transport stream. PIDs assigned to TS packets constituting a Primary audio stream and TS packets constituting a Secondary audio stream belong to the different zones on the PID assignment map. Accordingly, the demultiplexers 3a and 3by can obtain these TS packets as one transport stream, and also output the Primary audio stream and the Secondary audio stream as separate elementary streams. Here, the demultiplexers 3a and 3by can provide the Primary audio stream and the Secondary audio stream to the decoder through the same process as demultiplexing a plurality of audio streams multiplexed in one transport stream. Hence the Primary audio stream and the Secondary audio stream can be provided to a corresponding decoder in a structure that is compatible with a demultiplexer which demultiplexes only TS packets having a predetermined PID from one transport stream.

Here, the demultiplexers may be implemented as one unit. The structure in which the PIDs of the Primary audio stream and the Secondary audio stream are different from each other is useful in this case, too.

The BD-ROM drive 1a, the bus 1by to the demultiplexer 3a and the demultiplexer 3by are as described above.

The video decoder 4 decodes a plurality of PES packets output from the demultiplexer 3a to obtain pictures in uncompressed format, and writes these pictures to the video plane 5.

The video plane 5 is for storing uncompressed pictures. A plane is a memory area in the stream supply device 300 for storing one screen worth of pixel data. The video plane 5 has a 1920×1080 resolution, with stored picture data being constituted from pixel data expressed by 16-bit YUV.

The buffer 6a stores, when TS packets output from the demultiplexer 3a are supplied via the switch 10a, TS packets having a PID of an audio stream to be played back, among the PIDs 0x100 to 0x111F, on a first-in first-out basis, and supplies the TS packets to the audio decoder 7a.

The buffer 6by stores, when TS packets output from the demultiplexer 3by are supplied via the switch 10a, only TS packets having a PID of an audio stream to be played back, among TS packets having the PIDs 0x1A00 to 0x1A1F, on a first-in first-out basis, and supplies the TS packets to the audio decoder 7b.

The buffer 6c is a memory for preloading the file sound.bdmv read from the BD-ROM or the local storage. The preloading to the buffer 6c is preferably performed at the time of BD-ROM loading or title switching. This is because reading the file sound.bdmv during playback of an AVClip causes a seek of the optical pickup for reading a file different from the AVClip to occur. The playback of the AVClip is rarely performed at the time of BD-ROM loading or title switching. Accordingly, by reading the file sound.bdmv with this timing, device responsiveness can be enhanced and an interruption in AVClip playback can be avoided.

The audio decoder 7a converts TS packets stored in the buffer 6a to PES packets, decodes the PES packets to obtain LPCM audio data in uncompressed format, and outputs the uncompressed audio data. As a result, a Primary audio stream is digitally output.

The audio decoder 7by converts TS packets stored in the buffer 6by to PES packets, decodes the PES packets to obtain LPCM audio data in uncompressed format, and outputs the uncompressed audio data. As a result, a Secondary audio stream is digitally output.

The DownMix/DownSample 8 performs, at the time of mixing, a conversion for making an audio attribute of digital audio output from the audio decoder 7a coincide with an audio attribute of digital audio output from the audio decoder 7b. An audio attribute referred to here is a sampling frequency and/or a number of channels, and the DownMix/DownSample 8 performs processing to match such an audio attribute. Also, the DownMix/DownSample 8 or the mixer 9a performs an operation of decreasing a gain of a Primary audio stream according to metadata multiplexed in a Secondary audio stream, by gain control information extracted by the audio decoder 7b.

The mixer 9a mixes the LPCM digital audio output from the audio decoder 7a with the LPCM digital audio output from the audio decoder 7b.

The mixer 9by mixes the LPCM digital audio output from the mixer 9a with sound data stored in the buffer 6c. This mixing by the sound mixer 9by is performed by the CPU 22 decoding a navigation command indicating output of a click sound or a byte code indicating output of a click sound.

The switch 10a switches, under control of the controller 22, between supplying TS packets constituting the Primary audio stream demultiplexed by the demultiplexer 3a and TS packets constituting the Secondary audio stream demultiplexed by the demultiplexer 3by to the audio decoders 7a and 7b, and pass-through outputting the elementary streams to another device without supplying the TS packets to the audio decoders 7a and 7b. In this embodiment, without supplying the TS packets of the Primary audio stream and the TS packets of the Secondary audio stream to the audio decoders 7a and 7by via the buffers 6a and 6b, the switch 10a supplies these elementary streams (or the Primary audio stream alone) to the HDMI transmission/reception unit 27. In this way, the stream supply device 300 operates to pass-through output audio data. A conversion unit which converts TS packets to elementary streams (by removing TS/PES headers) at the time of pass-through output is equipped in the switch 10a (not illustrated)

The encoder 10by compression-codes, when transmitting LPCM audio data obtained as a result of the decoding by the audio decoders 7a and 7by and the mixing by the mixers 9a and 9by on a digital interface such as S/PDIF as surround sound, the mixed LPCM audio data to Dolby Digital (DD) or Digital Theater System (DTS).

The Interactive Graphics (IG) decoder 11 decodes an IG stream read from the BD-ROM 100 or the local storage 200 and writes uncompressed graphics to the IG plane 12.

The Interactive Graphics (IG) plane 12 is written with uncompressed graphics resulting from the decoding by the IG decoder 11. Characters and graphics drawn by an application are written onto the Interactive Graphics plane 12 in the BD-J mode.

The Presentation Graphics (PG) decoder 13 decodes a PG stream read from the BD-ROM or the local storage 200 and writes uncompressed graphics to the Presentation Graphics plane 14. Subtitles appear on the screen as a result of the decoding by the PG decoder 13.

The Presentation Graphics (PG) plane 14, being a memory with room for one screen worth of data, is able to store one screen worth of uncompressed graphics.

The JPEG decoder 15 decodes JPEG data recorded on the BD-ROM or the local storage 200 and writes the decoded JPEG data to the Still plane 16.

The Still plane 16 is a plane for storing uncompressed graphics data obtained by expanding JPEG data. This graphics data is used as the so-called "wallpaper" of a GUI framework drawn by a Java application.

The composition unit 17 composites the storage contents of the Interactive Graphics plane 12, the storage contents of the Presentation Graphics plane 14, the storage contents of the video plane 5, and the storage contents of the Still plane 16 to obtain a composite image.

The STC generation units 18a and 18by generate a System Time Clock (STC) according to an instruction by the controller 22, and adjust operation timings of each decoder.

The ATC generation units 19a and 19by generate an Arrival Time Clock (ATC) according to an instruction by the controller 22, and adjust operation timings of each demultiplexer. The memory 21 is for storing current PL information and current Clip information. The current PL information is one of a plurality of pieces of PlayList information recorded on the BD-ROM that is currently targeted for processing. The current Clip information is one of a plurality of pieces of Clip information recorded on the BD-ROM or the local storage that is currently targeted for processing.

The controller 22 realizes playback controls for the BD-ROM, by decoding Movie Objects stored in the MovieObject.bdmv and Java applications referenced by BD-J Objects and executing PlayList playback (i.e. playback controls according to the current PlayList information) in accordance with the decoding result. The controller 22 also performs controls on the above ATS and STC. If it has been confirmed that the audio amplifier is connected and is capable of playback as a result of the HDMI-connected device authentication and the DIB reception, the controller 22 may exercise controls so as to delete audio data which is output from the HDMI transmission/reception unit 27 and the I/F unit such as S/PDIF to the television 600, or output silent audio data. This makes it possible to prevent sound from being played back from the speaker internal to the television 600 during viewing in a home theater system environment.

The PSR set 23 is a set of registers internal to the stream supply device 300, and is composed of 64 Player Setting/Status Registers (PSRs) and 4096 General Purpose Registers (GPRs). Of the 64 PSRs, PSR4 to PSR8 are used to express a current playback point.

The PID conversion unit 24 converts stream numbers of Primary and Secondary audio streams stored in the PSR set 23 to PIDs based on the STN_Table, and outputs the PIDs to the demultiplexer 3a and 3b.

The communication unit 25 realizes a communication function in the stream supply device. In the case of a Java application specifying an URL in the BD-J mode, the communication unit 25 establishes a TCP or FTP connection etc. with a website indicated by the URL. The Java application is made to download from the website as a result of such a connection being established.

The operation reception unit 26 receives an operation made on the remote control by the user, and notifies the controller 22 of User Operation information indicating the received operation.

The HDMI transmission/reception unit 27 receives, from another device connected via HDMI, information about the device and notifies the controller 22 of the received information. The HDMI transmission/reception unit 27 also controls data transmission to the HDMI-connected device based on the received information. In this embodiment, the stream supply device 300 is connected with the television 600 and the audio amplifier 400 with different HDMI cables. This being so, the HDMI transmission/reception unit 27 performs controls so as to transmit uncompressed digital video obtained as a result of the decoding by the video decoder 4 to the television 600, and LPCM or compressed audio data to the audio amplifier 400. When transmitting an audio stream, the HDMI transmission/reception unit 27 transmits an Audio InfoFrame showing details of the audio stream being transmitted. FIG. 29 schematically shows a data structure of the Audio InfoFrame.

As shown in the drawing, the Audio InfoFrame includes fields such as a CT showing a coding method of the audio stream being transmitted, a CC showing a number of channels, an SF showing a sampling frequency, an SS showing a sampling size, a Format depending coding type showing a hierarchical structure of an audio frame when the coding method shown by the CT is DTS, a CA showing channel allocation to each speaker, an LSV showing a level shift value used in downmixing, and a DM_INA showing whether downmixing is possible or not.

When the Format depending coding type is 00000001b, the audio frame is composed of only DTS (CORE). When the Format depending coding type is 00000011b, the audio frame is a DTS-ES audio frame composed of CORE+XCH. When the Format depending coding type is 00000101b, the audio frame is a DTS-96/24 audio frame composed of CORE+X96. When the Format depending coding type is 00001001b, the audio frame is a DTS-HD audio frame composed of CORE+XLL. Thus, the type of extension frame data (XCH, X96, XLL, etc.) included in the audio frame can be identified according to bit position.

As a result, when the audio stream is in the DTS format, the audio amplifier 400 can be specifically notified which extension data is contained in the audio stream.

This completes the description of the hardware structure of the stream supply device 300 according to this embodiment. The following describes a software structure of the stream supply device 300 according to this embodiment.

Functionally representing the controller 22 shown in FIG. 28 gives a structure shown in FIG. 30. FIG. 30 shows a functional representation of the controller 22. As illustrated, the controller 22 includes a start processing unit 40, a PlayList processing unit 41, a Procedure execution unit 42, a Procedure execution unit 43, a mixing control unit 44, and an ATC/STC control unit for having the ATC generation units 19a and 19by and the STC generation units 18a and 18by generate the ATC and the STC.

Processing by these construction elements is performed based on the PSR set 23. The following describes PSR1, PSR14, and PSR31.

<PSR1>

Figure 31A:
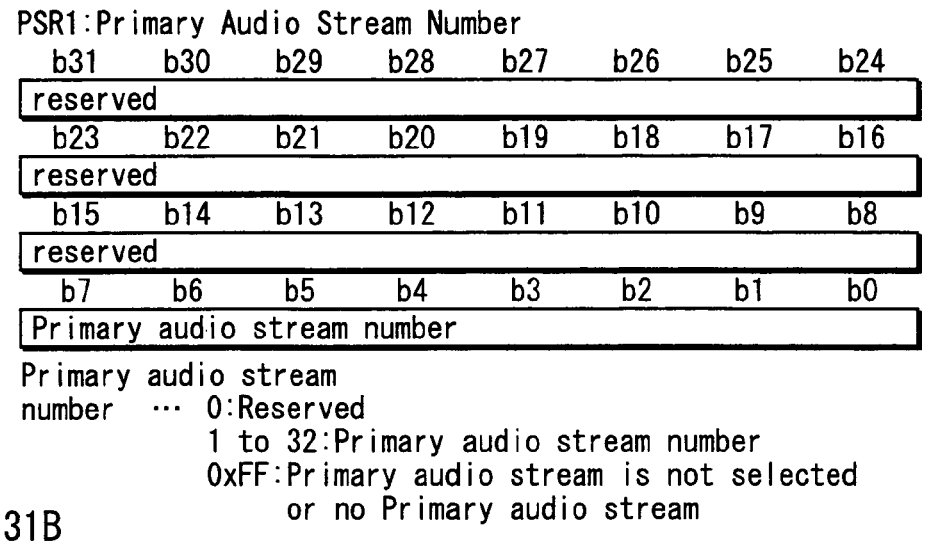
FIG. 31A shows bit assignments for PSR1.

FIG. 31A shows bit assignments of PSR1.

In the drawing, lower-order 8 bits (b0 to b7) of 32-bit PSR1 represent a stream number, and specify one of a plurality of Primary audio streams which are listed as entries in the STN_table of the current PlayItem. When PSR1 changes, the stream supply device 300 designates a Primary audio stream specified by the changed PSR1 as a playback target. PSR1 is initially set to 0xFF, and can be set to any of the values 1 to 32 by the stream supply device 300. The value 0xFF is an undefined value, indicating that no Primary audio stream is present or no Primary audio stream is selected. The values 1 to 32 are interpreted as Primary audio stream numbers.

<PSR14>

Figure 31B:
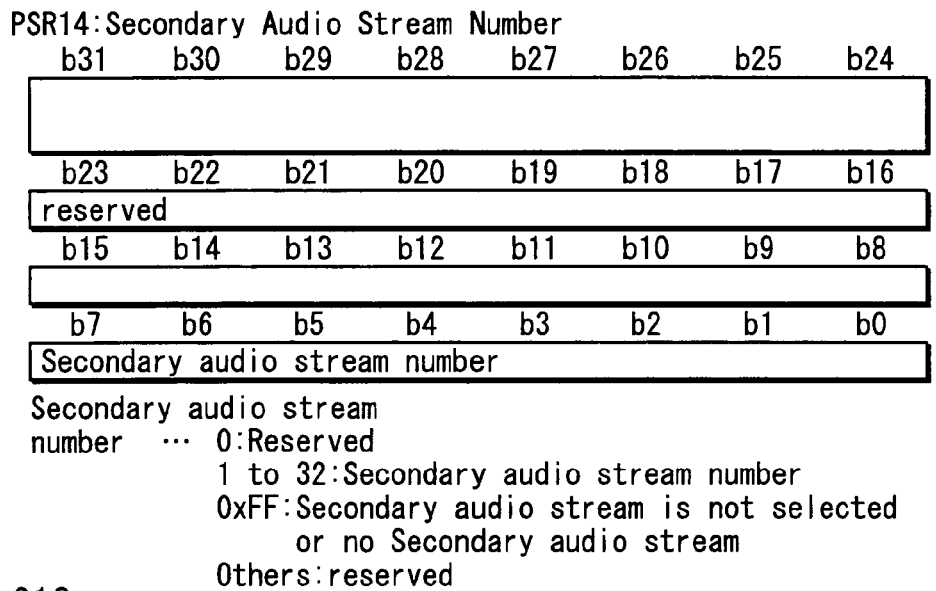
FIG. 31B shows bit assignments for PSR14.

FIG. 31B shows bit assignments of PSR14.

In the drawing, lower-order 8 bits (b0 to b7) of 32-bit PSR14 represent a stream number, and specify one of a plurality of Secondary audio streams which are listed as entries in the STN_table of the current PlayItem. When PSR14 changes, the stream supply device 300 designates a Secondary audio stream specified by the changed PSR14 as a playback target. PSR14 is initially set to 0xFF, and can be set to any of the values 1 to 32 by the stream supply device 300. The value 0xFF is an undefined value, indicating that no Secondary audio stream is present or no Secondary audio stream is selected. The values 1 to 32 are interpreted as Secondary audio stream numbers.

<PSR31>

Figure 31C:
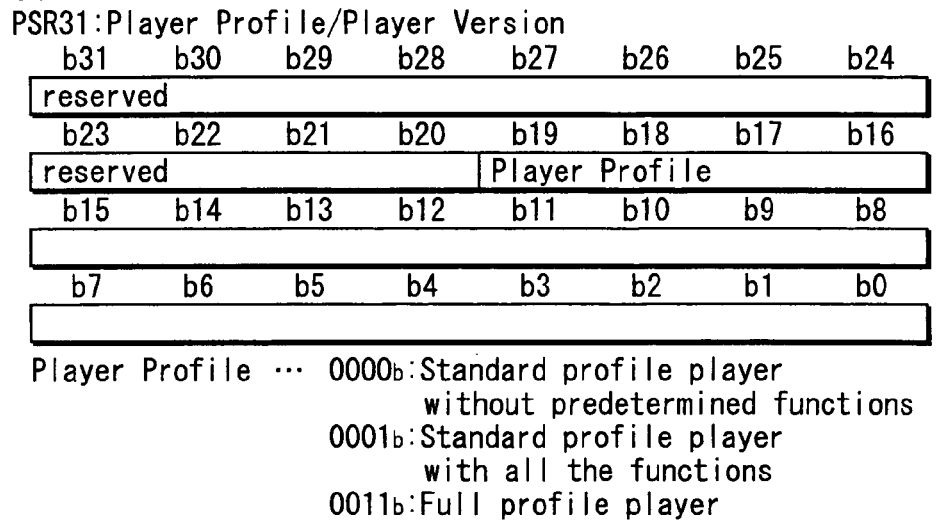
FIG. 31C shows bit assignments for PSR31.

FIG. 31C shows bit assignments of PSR31.

In the drawing, 16th to 19th bits (b16 to b19) of 32-bit PSR31 represent Player Profile information. When the 16th to 19th bits are 0000b, it indicates that the stream supply device was shipped within a grace period. The grace period referred to here has the following meaning. If a device is shipped within the grace period, implementation of a certain function can be omitted. The function that can be omitted because the device is shipped within the grace period includes a sound mixing function. Accordingly, if the Player Profile information in PSR31 is 0000b, it can be understood that implementation of various functions including mixing is omitted from the stream supply device.

When the Player Profile information is 0001b, it indicates that the stream supply device was shipped after the grace period. As a rule, a stream supply device shipped after the grace period is required to include all functions. Accordingly, if the Player Profile information is 0001b, it can be understood that a mixing function is implemented in the stream supply device.

When the Player Profile information is 0011b, it indicates that the stream supply device is provided with all functions. Such a stream supply device includes all functions irrespective of whether it was shipped within the grace period or not. Accordingly, if the Player Profile information is 0011b, it can be understood that the stream supply device has a sound mixing function.

Here, information showing a number of channels that can be mixed by the stream supply device may be provided in the PSR as information indicating the mixing function.

Alternatively, information showing a number of final audio output channels may be provided in the PSR. For example, LPCM sound of 5.1 ch as a mixing result can be output as it is, if an I/F such as HDMI is connected. In the case of an I/F such as S/PDIF, the sound cannot be output as 5.1 ch unless being compressed by an encoder, and can only be output with 2 ch (L/R). Therefore, when it is judged that the encoder is provided after the mixer and S/PDIF connection is present (e.g. not connected with HDMI), the number of final audio output channels can be set to 5.1 ch. If the encoder is not provided after the mixer, the number of final audio output channels can be set to 2 ch after mixing.

<PSR15>

FIG. 32 shows bit assignments of PSR15.

PSR15 has a 32-bit length.

Bits b0 to b3 of PSR15 show whether a playback environment (the player+the amplifier, etc.) has a capability of decoding and playing back an LPCM audio stream. When the 4 bits are 0001b, the playback environment is capable of playing back an LPCM audio stream of 48/96 Hz having a stereo attribute. When the 4 bits are 0010b, the playback environment is capable of playing back an LPCM audio stream of 48/96 Hz having a surround attribute. When the 4 bits are 010b, the playback environment is capable of playing back an LPCM audio stream of all frequencies having a stereo attribute. When the 4 bits are 0110b, the playback environment is capable of playing back an LPCM audio stream of all frequencies having a surround attribute.

Bits b4 to b7 of PSR15 show whether the playback environment (the player+the amplifier, etc.) has a capability of decoding and playing back a DD/DD+ audio stream. When the lower-order 2 bits of the 4 bits are 01b, the playback environment is, in the case where base data (independent substream) of the DD/DD+ audio stream has a stereo attribute, capable of playing back the base data. When the lower-order 2 bits of the 4 bits are 10b, the playback environment is, in the case where the base data (independent substream) of the DD/DD+ audio stream has a surround attribute, capable of playing back the base data.

When the higher-order 2 bits of the 4 bits are 01b, the playback environment is, in the case where extension data (Dependent substream) of the DD/DD+ audio stream has a stereo attribute, capable of playing back the extension data. When the higher-order 2 bits of the 4 bits are 10b, the playback environment is, in the case where the extension data (Dependent substream) of the DD/DD+ audio stream has a surround attribute, capable of playing back the extension data.

When the higher-order 2 bits are 00, the playback environment is incapable of playing back the extension data.

Bits b8 to b11 of PSR15 show whether the playback environment (the player+ the amplifier etc.) has a capability of decoding and playing back a DTS-HD audio stream. When the lower-order 2 bits of the 4 bits are 01b, the playback environment is capable of playing back base data (Core substream) of the DTS-HD audio stream up to 2 ch. When the lower-order 2 bits of the 4 bits are 10b, the playback environment is capable of playing back multi-channel of the base data (Core substream) of the DTS-HD audio stream.

When the higher-order 2 bits of the 4 bits are 01b, the playback environment is capable of playing back extension data (Extension substream) of the DTS-HD audio stream up to 2 ch. When the higher-order 2 bits of the 4 bits are 10b, the playback environment is capable of playing back multi-channel of the extension data (Extension substream) of the DTS-HD audio stream.

When the higher-order 2 bits are 00b, the playback environment is incapable of playing back the extension data (Extension substream) of the DTS-HD audio stream.

Bits b12 to b15 of PSR15 show whether the playback environment (the player+ the amplifier etc.) has a capability of decoding and playing back a DD/MLP audio stream. When the lower-order 2 bits of the 4 bits are 01b, the playback environment is, in the case where a DD audio stream has a stereo attribute, capable of playing back the DD audio stream. When the lower-order 2 bits of the 4 bits are 010b, the playback environment is, in the case where the DD audio stream has a surround attribute, capable of playing back the DD audio stream.

When the higher-order 2 bits of the 4 bits are 01b, the playback environment is, in the case where a MLP audio stream has a stereo attribute, capable of playing back the MLP audio stream. When the higher-order 2 bits of the 4 bits are 10b, the playback environment is, in the case where the MLP audio stream has a surround attribute, capable of playing back the MLP audio stream.

When the higher-order 2 bits are 00b, the playback environment is incapable of playing back the MLP audio stream.

Thus, PSR15 makes it possible to specify, for each coding method, whether each of base data and extension data can be processed.

Bits b16 to b19 of PSR15 show a device, in the playback environment, having a decoding capability based on which the DTS-HD Capability shown by bits b8 to b11 of PSR15 is set. When the lower-order 2 bits of the 4 bits are 01b, the Capability for the base data (Core substream) of the DTS-HD audio stream is set based on the decoding capability of the player which is the stream supply device itself. When the lower-order 2 bits of the 4 bits are 10b, the Capability for the base data (Core substream) of the DTS-HD audio stream is set based on the decoding capability of an external device such as the amplifier. When the lower-order 2 bits of the 4 bits are 11b, the player and the external device such as the amplifier have a same decoding capability, and the Capability for the base data (Core substream) of the DTS-HD audio stream is set based on the decoding capabilities of both the player and the external device. When the lower-order 2 bits of the 4 bits are 00b, no device in the playback environment has a decoding capability, and so the Capability for the base data (Core substream) of the DTS-HD audio stream is set to "incapable".

When the higher-order 2 bits of the 4 bits are 01b, the Capability for the extension data (Extension substream) of the DTS-HD audio stream is set based on the decoding capability of the player which is the stream supply device itself. When the higher-order 2 bits of the 4 bits are 10b, the Capability for the extension data (Extension substream) of the DTS-HD audio stream is set based on the decoding capability of an external device such as the amplifier. When the higher-order 2 bits of the 4 bits are 11b, the player and the external device such as the amplifier have a same decoding capability, and the Capability for the extension data (Extension substream) of the DTS-HD audio stream is set based on the decoding capabilities of both the player and the external device. When the higher-order 2 bits of the 4 bits are 00b, no device in the playback environment has a decoding capability, and so the Capability for the extension data (Extension substream) of the DTS-HD audio stream is set to "incapable".

In more detail, bit b16 indicates whether the Capability for the base data (Core substream) is set based on the decoding capability of the player which is the stream supply device itself, and bit b17 indicates whether the Capability for the base data (Core substream) is set based on the decoding capability of the external device such as the amplifier. Bit b18 indicates whether the Capability for the extension data (Extension substream) is set based on the decoding capability of the player which is the stream supply device itself, and bit b19 indicates whether the Capability for the extension data (Extension substream) is set based on the decoding capability of the external device such as the amplifier.

The PSR set 23 is as described above.

The following describes the start processing unit 40 to the mixing control unit 44.

<Functional Structure, Part 1: Start Processing Unit 40>

Figure 33:
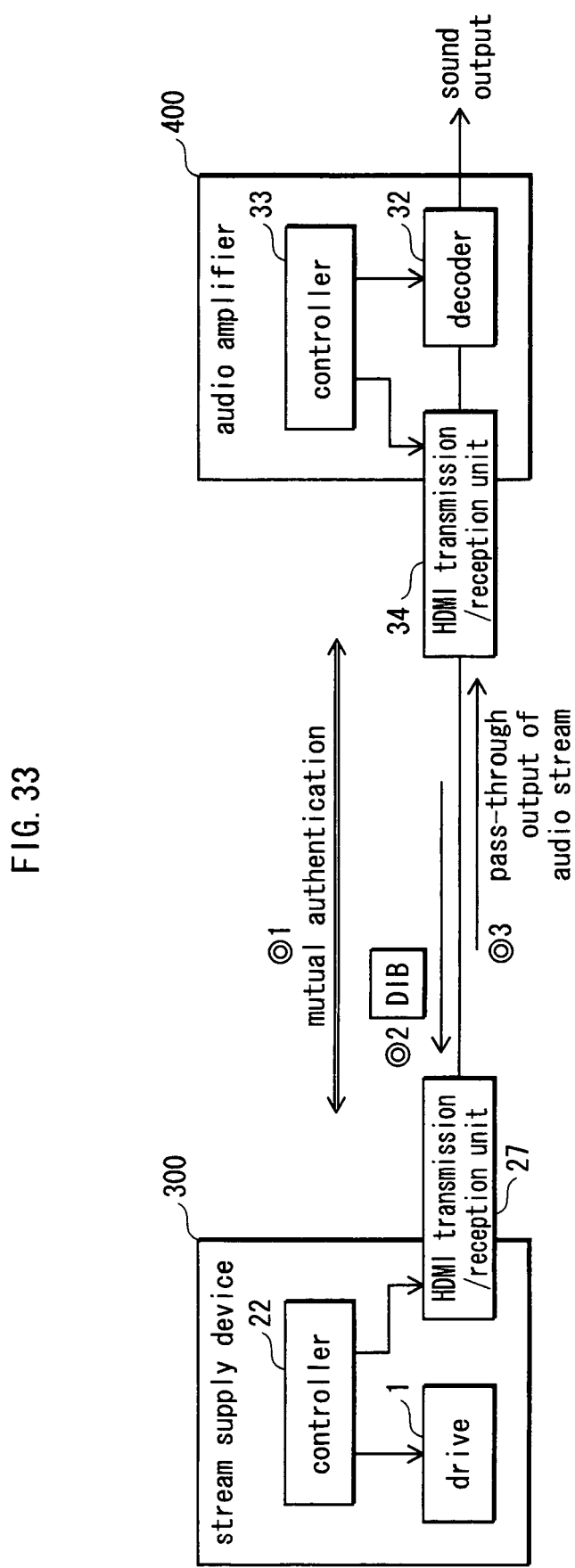
FIG. 33 shows a communication sequence between the stream supply device 300 and the audio amplifier 400 upon startup.

FIG. 33 shows a communication sequence between the stream supply device 300 and the audio amplifier 400.

When the stream supply device 300 is started or connected with the audio amplifier 400, the HDMI transmission/reception unit 27 in the stream supply device 300 performs mutual authentication as indicated by the double circle 1 in the drawing. After this, the HDMI transmission/reception unit 27 in the stream supply device 300 receives a DIB from the audio amplifier 400 which serves as a receiver, as indicated by the double circle 2. When the received DIB shows that the audio amplifier 400 is capable of decoding a Primary audio stream, the HDMI transmission/reception unit 27 pass-through outputs the Primary audio stream to the audio amplifier 400, as indicated by the double circle 3.

Here, the start processing unit 40 acquires the structure of the home theater system via the HDMI transmission/reception unit 27 and sets PSR15 according to the acquired structure, so that the Primary audio stream corresponding to the decoding capability of the audio amplifier 400 is pass-through output to the audio amplifier 400.

By setting PSR15, which is basic information for determining audio play ability, with reference to not only the decoder internal to the player but the entire playback environment of the user including the amplifier, audio selection can be widened and play ability can be judged more appropriately.

Figure 34:
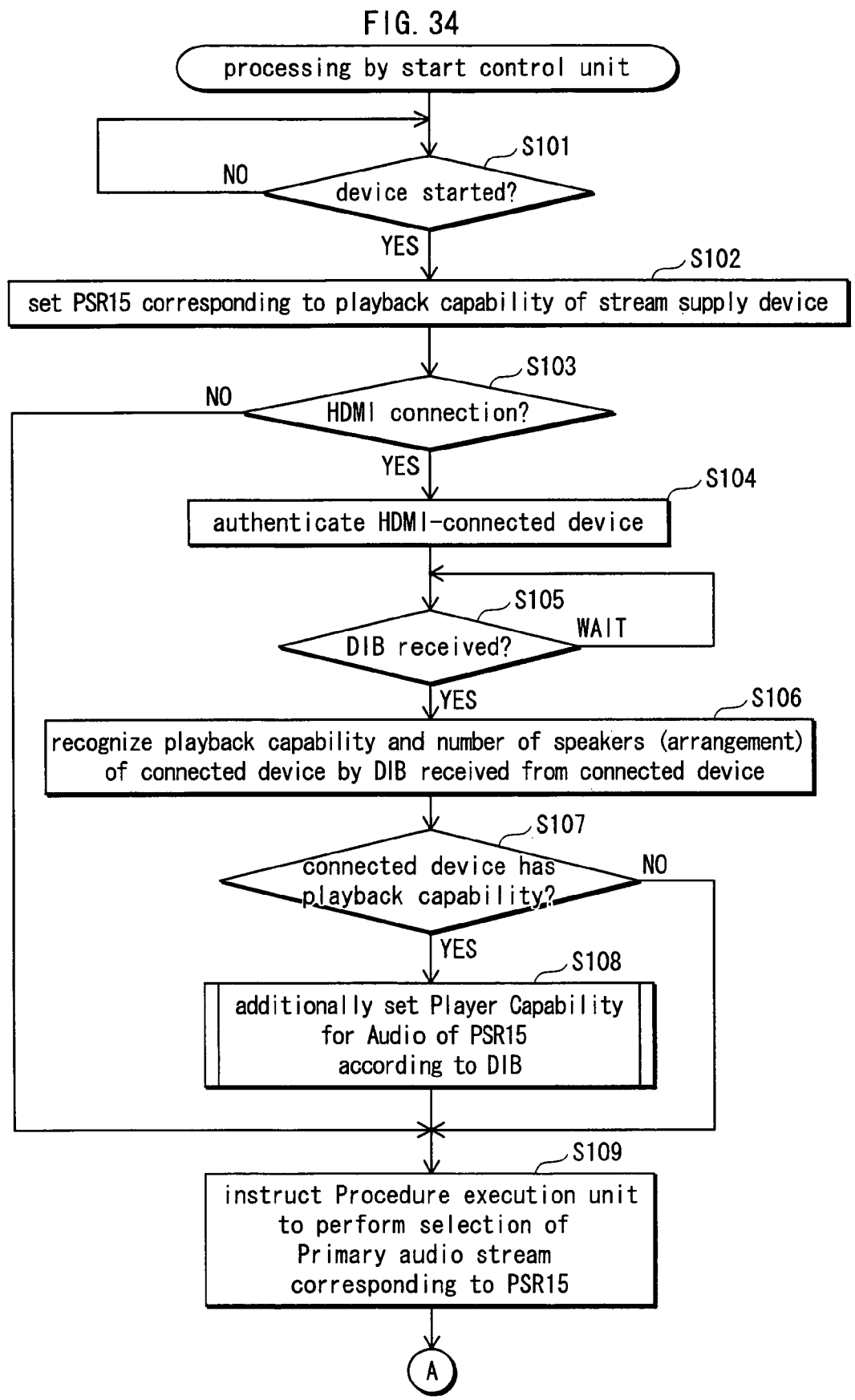
FIG. 34 is a flowchart showing processing by a start processing unit 40.
Figure 35:
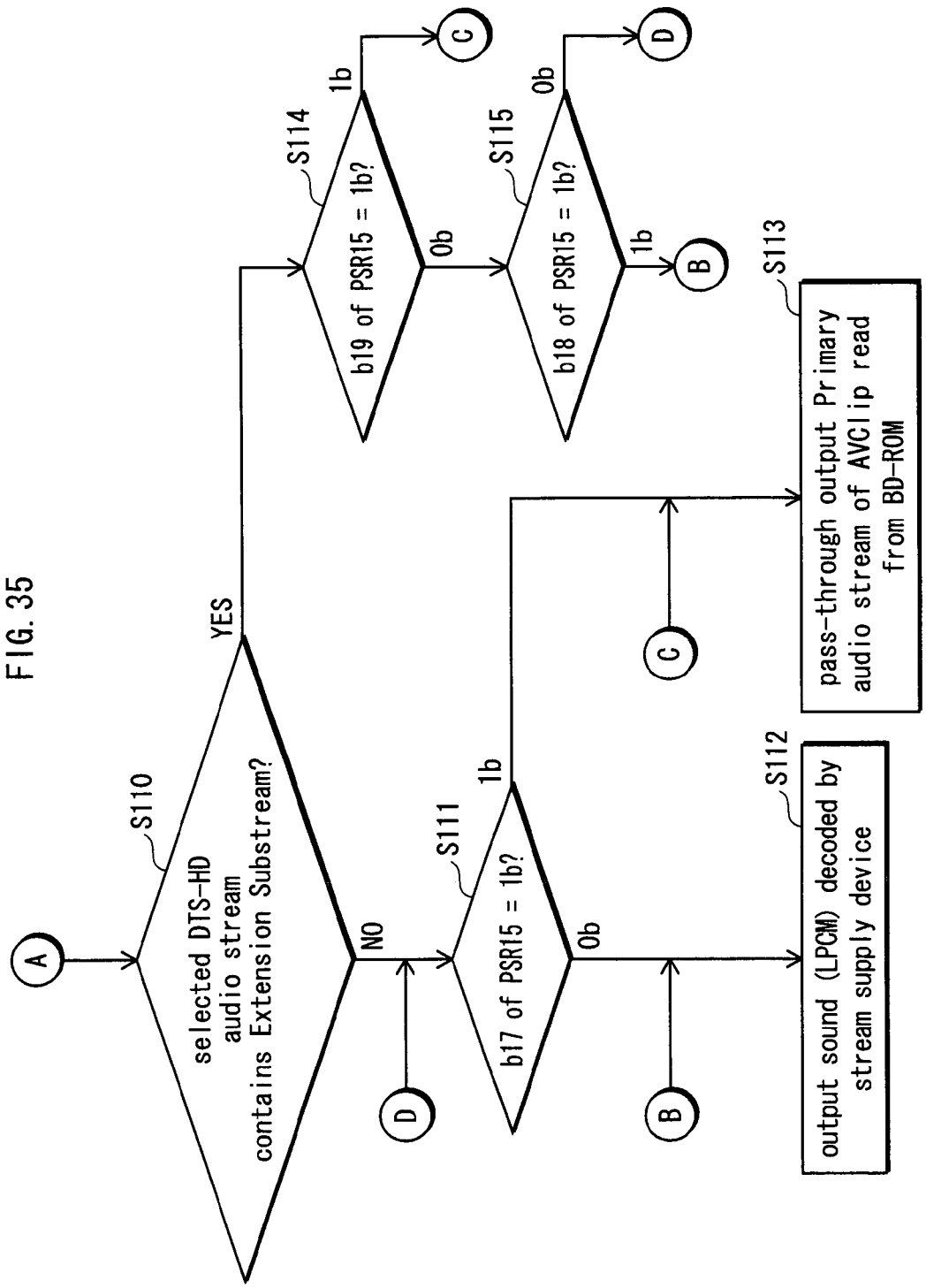
FIG. 35 is a flowchart showing the processing by the start processing unit 40.

FIGS. 34 and 35 are flowcharts showing processing by the start processing-unit 40.

Step S101 in FIG. 34 is a start waiting judgment as to whether the stream supply device is started or not. Upon startup, PSR15 is set according to the decoding capability of the stream supply device itself (step S102). After this, a judgment is made as to whether another device is connected via HDMI (step S103). If no device is connected via HDMI (step S103: NO), the start processing unit 40 has the Procedure execution unit 42 execute a procedure of selecting a Primary audio stream according to the decoding capability shown by PSR15 (step S108). If another device is connected via HDMI (step S103: YES), authentication is performed on the HDMI-connected device (step S104). Once mutual authentication has been established, the start processing unit 40 moves to step S105. Step S105 is a reception waiting loop of whether a DIB is received or not. Upon receiving the DIB (step S105: YES), the start processing unit 40 recognizes a capability and a speaker allocation of the connected device based on the received DIB (step S106). Step S107 is a judgment as to whether the connected device has a playback capability. If the connected device has a playback capability, the start processing unit 40 additionally sets the Player capability for Audio in PSR15 according to the DIB (step S108). The start processing unit 40 then have the Procedure execution unit 42 execute a procedure of selecting a Primary audio stream according to the decoding capability shown by PSR15 (step S109).

The following explanation uses an example where the selected Primary audio stream is a DTS-HD audio stream.

Step S110 in FIG. 35 is a judgment as to whether the DTS-HD audio stream selected in step S109 has a frame structure that contains no Extension Substream. This judgment can be made based on the stream_coding_type of the Stream_attribute shown in FIG. 21B.

If the DTS-HD audio stream selected in step S109 has a frame structure that contains no Extension Substream (step S110: NO), a judgment is made as to whether the Capability for the Core substream of the DTS-HD audio stream is set based on the decoding capability of the HDMI-connected device, using the value of bit b17 of PSR15 (step S111). If bit b17 of PSR15 is 0b (step S111: 0b), the Capability for the Core substream is not set based on the decoding capability of the HDMI-connected device. Accordingly, the start processing unit 40 controls the switch 10a so as to output a Primary audio stream of an AVClip read from the BD-ROM to the decoder 7a via the buffer 6a (step S112). If bit b17 of PSR15 is 1b (step S111: 1b), the Capability for the Core substream is set based on the decoding capability of the HDMI-connected device. Accordingly, the start processing unit 40 controls the switch 10a so as to pass-through output the Primary audio stream of the AVClip read from the BD-ROM (step S113) When performing pass-through output, a value indicating that the device is incapable of mixing is stored in the Player Profile information in PSR31. Otherwise, the Procedure execution unit 43 selects a Secondary audio stream and as a result not only the Primary audio stream but also the Secondary audio stream will end up being pass-through output.

When the DTS-HD audio stream selected in step S109 has a frame structure that contains an Extension Substream (step S110: YES), on the other hand, a judgment is made as to whether the Capability for the Extension substream of the DTS-HD audio stream is set based on the decoding capability of the HDMI-connected device, using the value of bit b19 of PSR15 (step S114).

When bit b19 of PSR15 is 1b (step S114: 1b), the start processing unit 40 controls the switch 10a so as to pass-through output the Primary audio stream of the AVClip read from the BD-ROM (step S113). When bit b19 of PSR15 is 0b (step S114: 0b), a judgment is made as to whether the Capability for the Extension substream of the DTS-HD audio stream is set based on the decoding capability of the stream supply device itself, using the value of bit b18 of PSR15 (step S115). When bit b18 of PSR15 is 1b (step S115: 1b), the Extension substream is playable with the decoding capability of the stream supply device itself. Accordingly, the start processing unit 40 controls the switch 10a so as to output the Primary audio stream of the AVClip read from the BD-ROM to the decoder 7a via the buffer 6a (step S112). When bit b18 of PSR15 is 0b (step S114: 0b), the Extension substream is unplayable with the decoding capability of the stream supply device itself. Accordingly, the start processing unit 40 sets the Core substream as a playback target, and judges whether the Capability for the Core substream is set based on the decoding capability of the HDMI-connected device, using the value of bit b17 of PSR15 (step S111). If the Capability for the Core substream is not set based on the decoding capability of the HDMI-connected device (step S111: 0b), the start processing unit 40 controls the switch 10a so as to output the Primary audio stream of the AVClip read from the BD-ROM to the decoder 7a via the buffer 6a (step S112). If the Capability for the Core substream is set based on the decoding capability of the HDMI-connected device (step S111: 1b), the start processing unit 40 controls the switch 10a so as to pass-through output the Primary audio stream of the AVClip read from the BD-ROM (step S113).

Thus, by prioritizing the direct decoding by the amplifier connected with the speaker over the decoding by the player and output of an LPCM audio stream to the amplifier, not only noise is suppressed and a transfer band is reduced, but also an audio signal is appropriately processed according to speaker characteristics. As a result, high-quality audio playback can be achieved.

Though the above description uses a DTS-HD audio stream having a hierarchical structure as an example, for other audio streams with no hierarchical structures (e.g. Dolby Digital (AC-3) or MPEG-1 Audio), PSR15 can be set in the same way as above. Also, the judgment as to whether the stream is to be decoded by the player or the external device (amplifier) based on PSR15 and the selection of pass-through output in the case where the stream is decodable by the external device can be performed in the same way as above.

Figure 36:
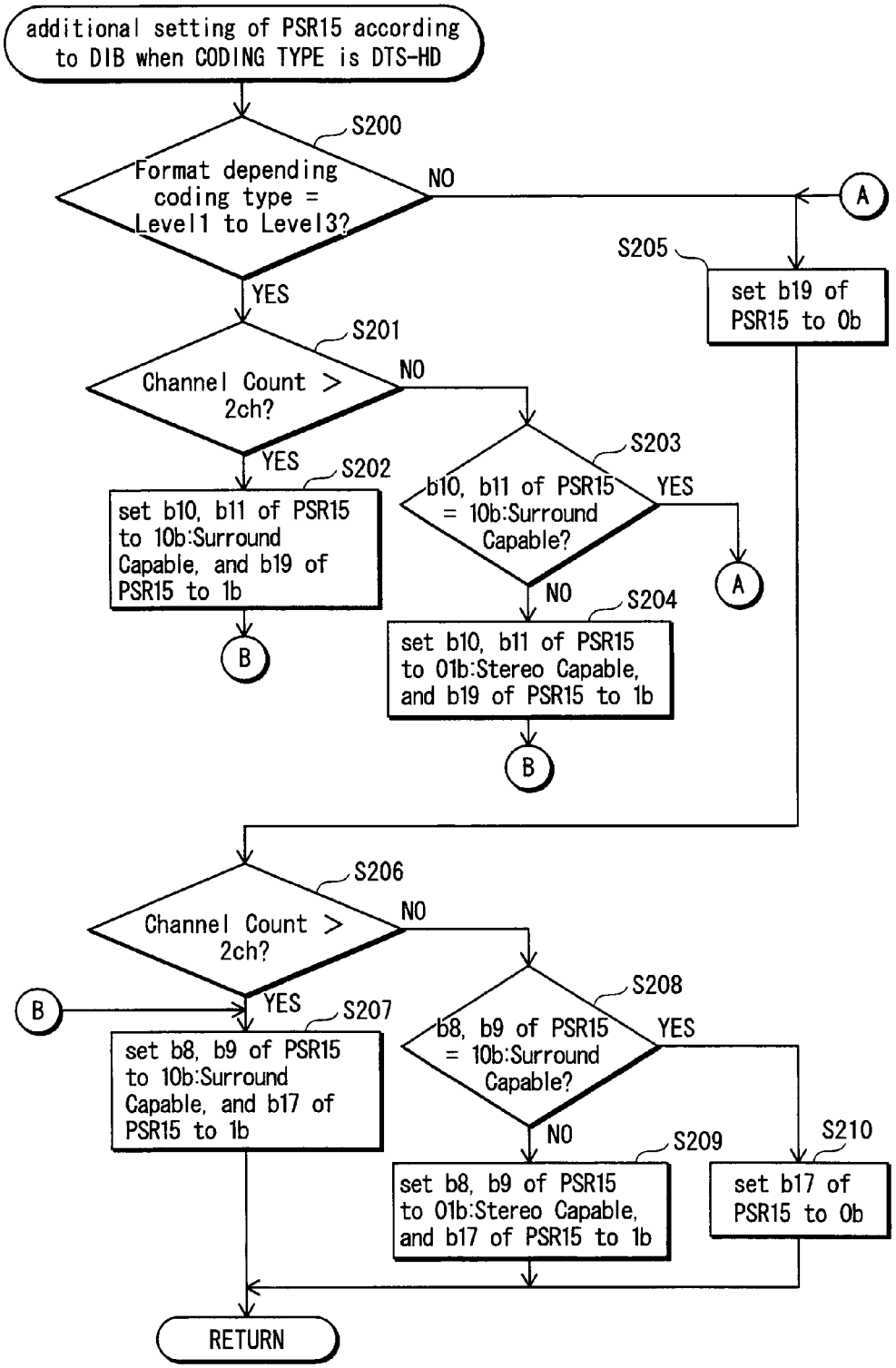
FIG. 36 is a flowchart showing processing of additionally setting a Player Capability for Audio in PSR15 according to the DIB, when CODING TYPE is DTS-HD.

FIG. 36 is a flowchart showing a procedure of additionally setting the Player capability for Audio in PSR15 according to the DIB, in the case where the CODING TYPE is DTS-HD. At the start of this procedure, a value corresponding to the decoding capability of the stream supply device itself is set in PSR15. The set value of PSR15 is updated for a coding method regarding which the decoding capability of the device whose performance capability is shown by the DIB is equal to or higher than that of the stream supply device itself, through the execution of this procedure.

In the flowchart of FIG. 36, step S200 is a judgment as to whether any of Level1-Level3 is written in the Format depending coding type of the DIB, and step S201 is a judgment as to whether a value larger than 2 is written in the Channel Count of the DIB.

If steps S200 and S201 both result in YES, step S202 is performed to set the capability for the Extension Substream to "10b: Surround Capable", and set bit b19 of PSR15, which indicates whether the Capability for the Extension substream is set based on the decoding capability of the HDMI-connected device, to 1b. Also, step S20.7 is performed to set the capability for the Core Substream to "10b: Surround capable", and set bit b17 of PSR15, which indicates whether the Capability for the Core substream is set based on the decoding capability of the HDMI-connected device, to 1b.

If step S200 results in YES but step S201 results in NO, the procedure moves to step S203. Step S203 is a judgment as to whether the capability for the Extension Substream is set to "10b: Surround Capable". If the capability for the Extension Substream is not set to "10b: Surround Capable" (step S203: NO), step S204 is performed to set the capability for the Extension Substream to "01b: Stereo Capable", and set bit b19 of PSR15, which indicates whether the Capability for the Extension substream is set based on the decoding capability of the HDMI-connected device, to 1b. Also, step S207 is performed to set the capability for the Core Substream to "10b: Surround Capable", and set bit b17 of PSR15, which indicates whether the Capability for the Core substream is set based on the decoding capability of the HDMI-connected device, to 1b.

If any of Level1-Level3 is not written in the Format depending coding type of the DIB (step S200: NO) or the capability for the Extension Substream is set to "10b: Surround Capable" in the judgment of step S203 (step S203: YES), bit b19 of PSR15 is set to 0b (step S205), and then a judgment of step S206 is performed. Step S206 is a judgment as to whether a value larger than 2 is written in the Channel Count of the DIB.

If step S206 results in YES, step S207 is performed to set the capability for the Core Substream to "10b: Surround Capable", and set bit b17 of PSR15, which indicates whether the Capability for the Core substream is set based on the decoding capability of the HDMI-connected device, to 1b.

If step S206 results in NO, the procedure moves to step S208. Step S208 is a judgment as to whether the capability for the Core Substream is set to "10b: Surround Capable". If the capability for the Core Substream is not set to "10b: Surround Capable" (step S208: NO), step S209 is performed to set the capability for the Core Substream to "01b: Stereo Capable", and set bit b17 of PSR15, which indicates whether the Capability for the Core substream is set based on the decoding capability of the HDMI-connected device, to 1b. If the capability for the Core Substream is set to "10b: Surround Capable" in the judgment of step S208 (step S208: YES), bit b17 of PSR15 is set to 0b (step S210).

Though the Channel Count of the DIB is used in the judgments of step S201 and S206 in FIG. 36, the judgments may be made using the Channel/Speaker Allocation.

Though the procedure of the start processing unit 40 is described using DTS-HD as an example, other formats such as DD/DD+ and DD/MLP can be treated in the same way.

For example, the Capability for DD/DD+, DD/MLP, or the like can be additionally set in PSR15 according to the DIB by providing information showing a device, in the playback environment, having a decoding capability based on which the Capability for DD/DD+, DD/MLP, or the like is set, in the register in the same fashion as the information of bits b16 to b19 of PSR15. If a DD/DD+ audio stream or a DD/MLP audio stream is selected as a Primary audio stream upon playback, a judgment as to whether pass-through output is to be performed can be made based on the information showing the device, in the playback environment, having the decoding capability based on which the Capability for DD/MLP or the like is set.

Note here that this information showing the device whose decoding capability is used as a basis for setting the Capability for each coding method may not necessarily be set in PSR15, and can be held in another register or a work memory.

<Functional Structure, Part 2: PlayList Processing Unit>

The PlayList processing unit 41 realizes PL playback. The PlayList processing unit 41 plays back a video stream and a Primary audio stream from a point corresponding to an In_time to a point corresponding to an Out_time of PlayItem information and, in sync with this, has the audio decoder 7*by* playback a Secondary audio stream from a point corresponding to a Sub_PlayItem_In_time to a point corresponding to a Sub_PlayItem_Out_time of SubPlayItem information.

Figure 37:
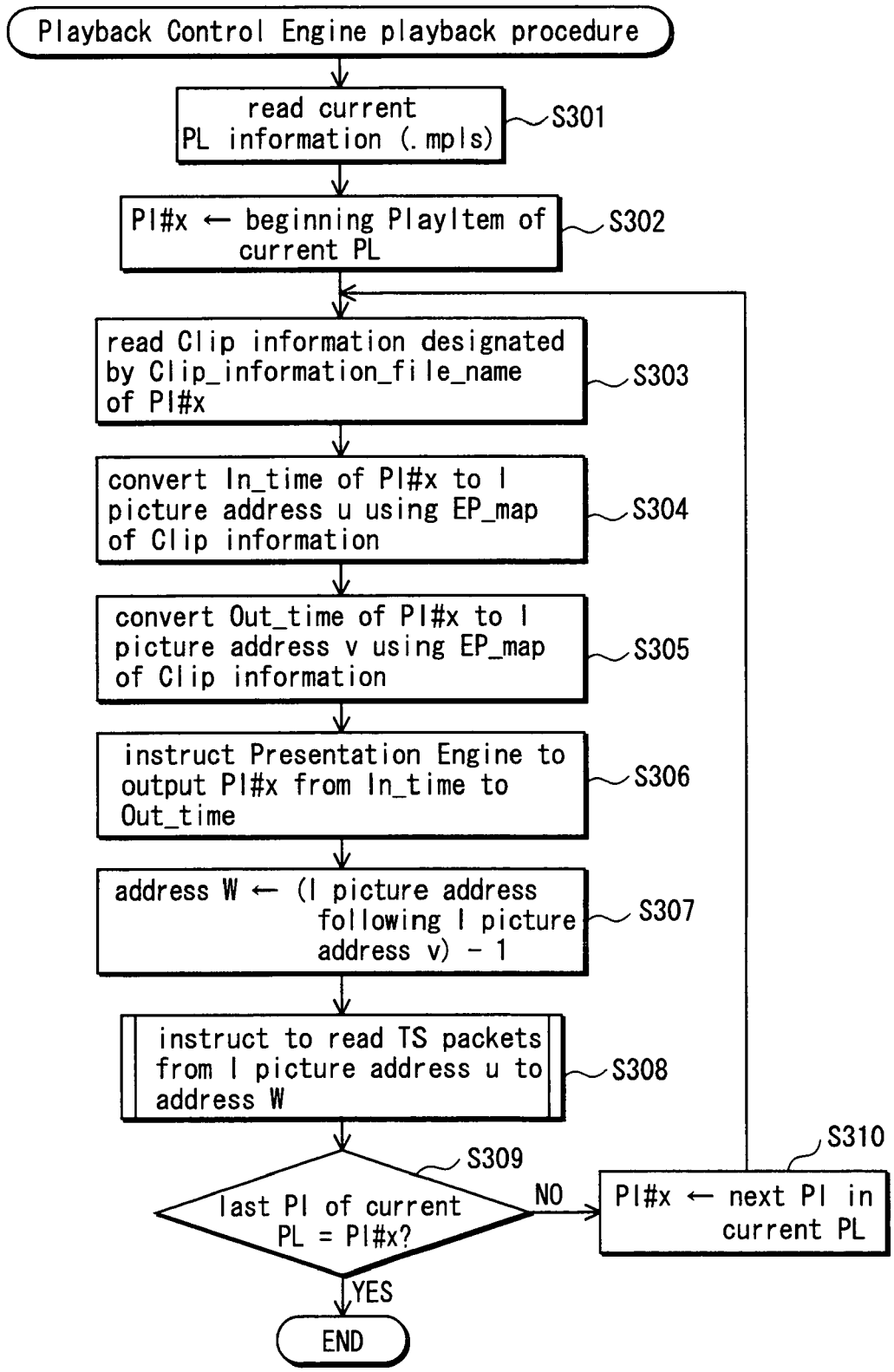
FIG. 37 is a flowchart showing playlist playback processing by a playlist processing unit.

FIG. 37 is a flowchart showing a PlayList playback procedure by the PlayList processing unit 41.

In this flowchart, the PlayList processing unit 41 reads the current PL information (.mpls) (step S301), and then executes steps S302 to S310. Step S302 to S310 form a loop of performing steps S303 to S310 for each piece of PI information constituting the current PL information, until step S309 results in YES. A PlayItem subjected to processing in this loop is called PlayItem#x (PI#x). PlayItem#x is initialized by being set to the beginning PlayItem of the current PlayList (step S302). A condition to end the loop is that PlayItem#x is the last PlayItem of the current PlayList (step S309). If PlayItem#x is not the last PlayItem, the next PlayItem in the current PlayList is set as PlayItem#x (step S310).

Steps S303 to S310 repeatedly performed in the loop are explained below. The PlayList processing unit 41 reads Clip information specified by a Clip_information_file_name of PlayItem#x to the memory (stepS303). The Play List processing unit 41 converts an In_time of PlayItem#x to I picture address u using an EP_map of the current Clip information (step S304), and also converts an Out_time of PlayItem#x to I picture address v using the EP_map of the current Clip information (step S305). The PlayList processing unit 41 calculates an I picture following address v obtained as a result of these conversions, and sets its immediately preceding address as address w (step S307). Using address w calculated in this way, the PlayList processing unit 41 instructs the BD-ROM drive 1 or the local storage 200 to read TS packets from I picture address u to address w (step S308).

Meanwhile, the PlayList processing unit 41 instructs the video decoder and the like to output from a mark_time_stamp of the current PLMark to the Out_time of PlayItem#x (step S306). As a result of steps S305 to S308, a part of the AVClip specified by PlayItem#x is played back.

After this, a judgment is made as to whether PlayItem#x is the last PI of the current PlayList (step S309).

If PlayItem#x is not the last PI of the current PlayList, the PlayList processing unit 41 sets the next PlayItem in the current PlayList as PlayItem#x (step S310), and returns to step S303. As a result of repeating steps S303 to S310, the PIs which constitute the PlayList are played back in sequence.

<Functional Structure, Part 3: Procedure Execution Unit 42>

The Procedure execution unit 42 executes a predetermined stream selection procedure and writes a new stream number to PSR1, when one piece of PlayItem information is switched to another piece of PlayItem information or the user performs an operation of switching a stream number. The stream supply device 300 specifies a Primary audio stream according to the stream number written in PSR1. Thus, the Primary audio stream is selected through the PSR1 settings.

A reason that the stream selection procedure is executed when switching one piece of PlayItem information to another is as follows. Since an STN_table exists for each piece of PlayItem information, there is a possibility that a Primary audio stream which is playable in one piece of PlayItem information may be unplayable in another piece of PlayItem information.

Figure 38A:
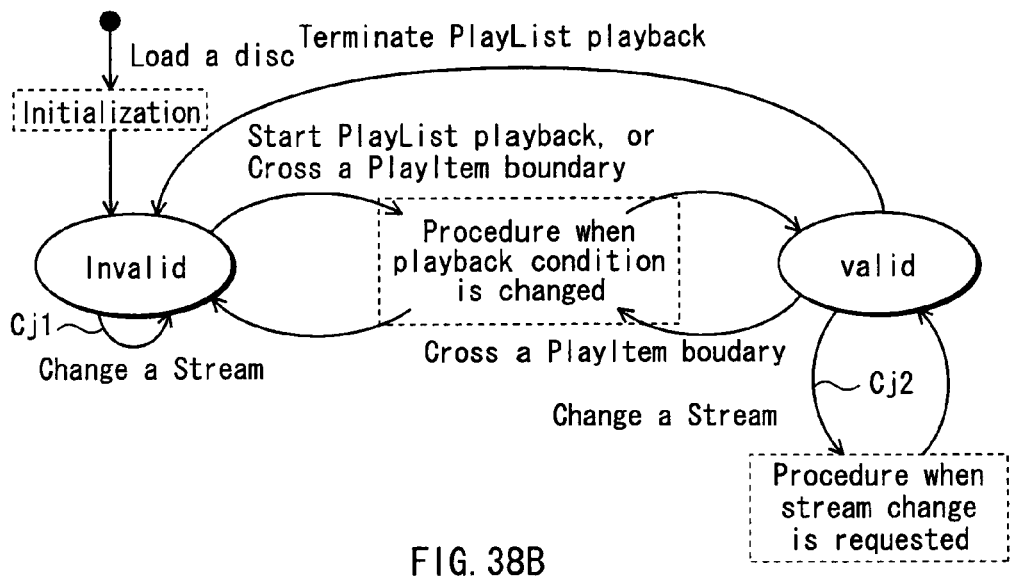
FIG. 38A shows status transitions that can be made by PSR1.

PSR1 undergoes status transitions shown in FIG. 38A by this Procedure execution unit 42.

FIG. 38A shows status transitions that can be made by PRS1. In the drawing, the term "Valid" denotes a state where PSR1 is no greater than the number of entries in the STN_table of the PlayItem and also the audio stream is decodable.

Meanwhile, the term "Invalid" denotes a state where PSR1 is 0 or greater than the number of entries in the STN_table of the PlayItem, or a state where even if the number of entries in the STN_table of the PlayItem is 1 to 32, the audio stream is not decodable.

Procedures for setting the PSR upon a status transition are schematically shown in dotted boxes in FIG. 38A. There are two types of PSR setting procedures, namely, "Procedure when playback condition is changed" and "Procedure when Stream change is requested".

"Procedure when playback condition is changed" is a procedure to run when the condition of the stream supply device changes due to the occurrence of some kind of event.

"Procedure when Stream Change is requested" is a procedure to run when the user requests some kind of change (stream change in the case of FIG. 38).

"Procedure when playback condition is changed" and "Procedure when Stream change is requested" shown in the dotted boxes are the stream selection procedures, and will be explained in detail later with reference to flowcharts.

Each arrow in FIG. 38A represents a status transition of the PSR.

Comment accompanying each arrow denotes an event which triggers a status transition. In detail, when any of "Load Disc", "Change a Stream", "Start PlayList playback", "Cross a PlayItem boundary", and "Terminate PlayList playback" occurs, PSR1 undergoes a status transition. In view of this notation, it can be understood from FIG. 38A that none of the above procedures is performed upon a status transition from Invalid to Invalid and a status transition from Valid to Invalid. On the other hand, each of a status transition from Invalid to Valid and a status transition from Valid to Valid passes one of the procedures. In other words, to set Valid PSR1, "Procedure when playback condition is changed" or "Procedure when Stream change is requested" is carried out.

The events which trigger status transitions are explained below.

"Load Disc" is an event of loading the BD-ROM to the stream supply device. Upon loading, PSR1 is initially set to an undefined value (0xFF).

"Start PlayList playback" is an event of starting playback based on a PL. When this event occurs, "Procedure when playback condition is changed" is performed, and PSR1 becomes Valid.

"Terminate PlayList playback" is an event of ending playback based on a PL. When this event occurs, "Procedure when playback condition is changed" is not performed, and PSR1 becomes Invalid.

"Change XXX" is an event of receiving a user request to switch XXX (Stream in the case of FIG. 38A). When this event occurs while PSR1 is Invalid (Cj1 in FIG. 38A), PSR1 is set to a value requested by the user. Even if this set value shows a valid stream number, PSR1 is treated as Invalid. Thus, a PSR which is Invalid never changes to Valid by "Change XXX".

When "Change a Stream" occurs while PSR1 is Valid (Cj2) on the other hand, "Procedure when Stream Change is requested" is performed and a new value is assigned to PSR1. The value assigned to PSR1 by "Procedure when Stream change is requested" here may not be the value requested by the user. This is because "Procedure when Stream change is requested" has a function of excluding an invalid value. PSR1 which is Valid never changes to Invalid by "Change stream", since "Procedure when Stream change is requested" ensures not to make PSR1 Invalid.

"Cross a PlayItem boundary" is an event where playback crosses over a PlayItem boundary. The PlayItem boundary refers to here is a point between an end of one PlayItem and a beginning of an immediately succeeding PlayItem. When this event occurs while PSR1 is Valid, "Procedure when playback condition is changed" is performed. After "Procedure when playback condition is changed", PSR1 either returns to Valid or moves to Invalid. Since an STN_table is provided for each PlayItem, playable elementary streams change when the current PlayItem changes. Accordingly, "Procedure when playback condition is changed" is performed for each PlayItem so as to set PSR1 to a value optimal for the PlayItem.

Figure 38B:
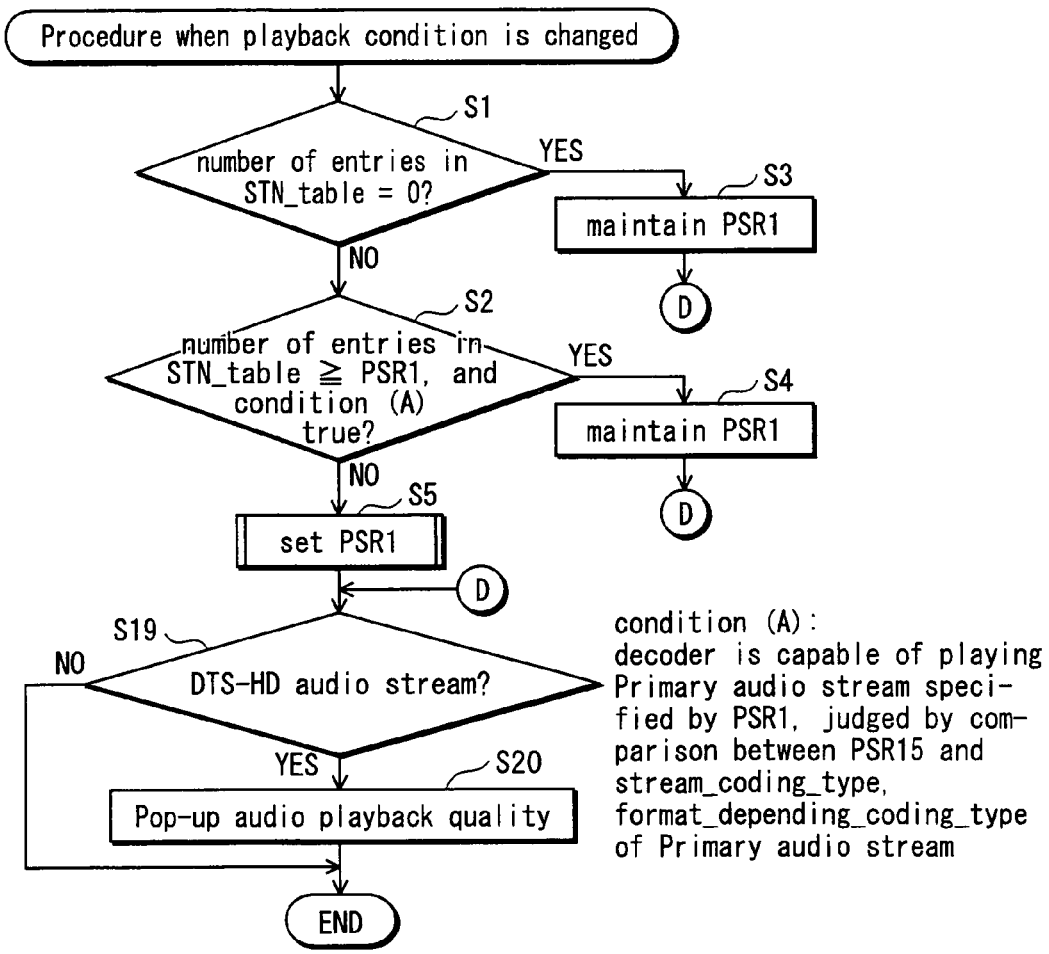
FIG. 38B shows a "Procedure when playback condition is changed" for PSR1.

In such status transitions, "Procedure when playback condition is changed" is performed as shown in FIG. 38B. FIG. 38B is a flowchart of "Procedure when playback condition is changed" for PSR1. This procedure sets PSR1 through a combination of two judgment steps S1 and S2.

Step S1 is a judgment as to whether the number of entries in the STN_table is 0. If the number of entries in the STN_table is 0, the value of PSR1 is maintained (step S3).

Step S2 is a judgment, made when the number of entries in the STN_table is not 0, as to whether the number of entries in the STN_table is no smaller than PSR1 and also condition (A) is true. Condition (A) is that the decoder has a capability of playing back a Primary audio stream specified by PSR1. If step S2 results in YES, the value of PSR1 is maintained (step S4). If PSR1 is greater than the number of entries in the STN_table or condition (A) is false, PSR1 is set to a new value (step S5). This embodiment employs a connection structure in which the stream supply device 300 supplies a selected audio stream to the audio amplifier 400 and the audio amplifier 400 decodes the audio stream. Accordingly, the decoder mentioned by condition (A) is the decoder internal to the audio amplifier 400.

After this, if the Primary audio stream specified by PSR1 is a DTS-HD audio stream (step S19: YES), step S20 is performed to display a menu showing a quality of audio actually played back by the audio amplifier 400.

Figure 39:
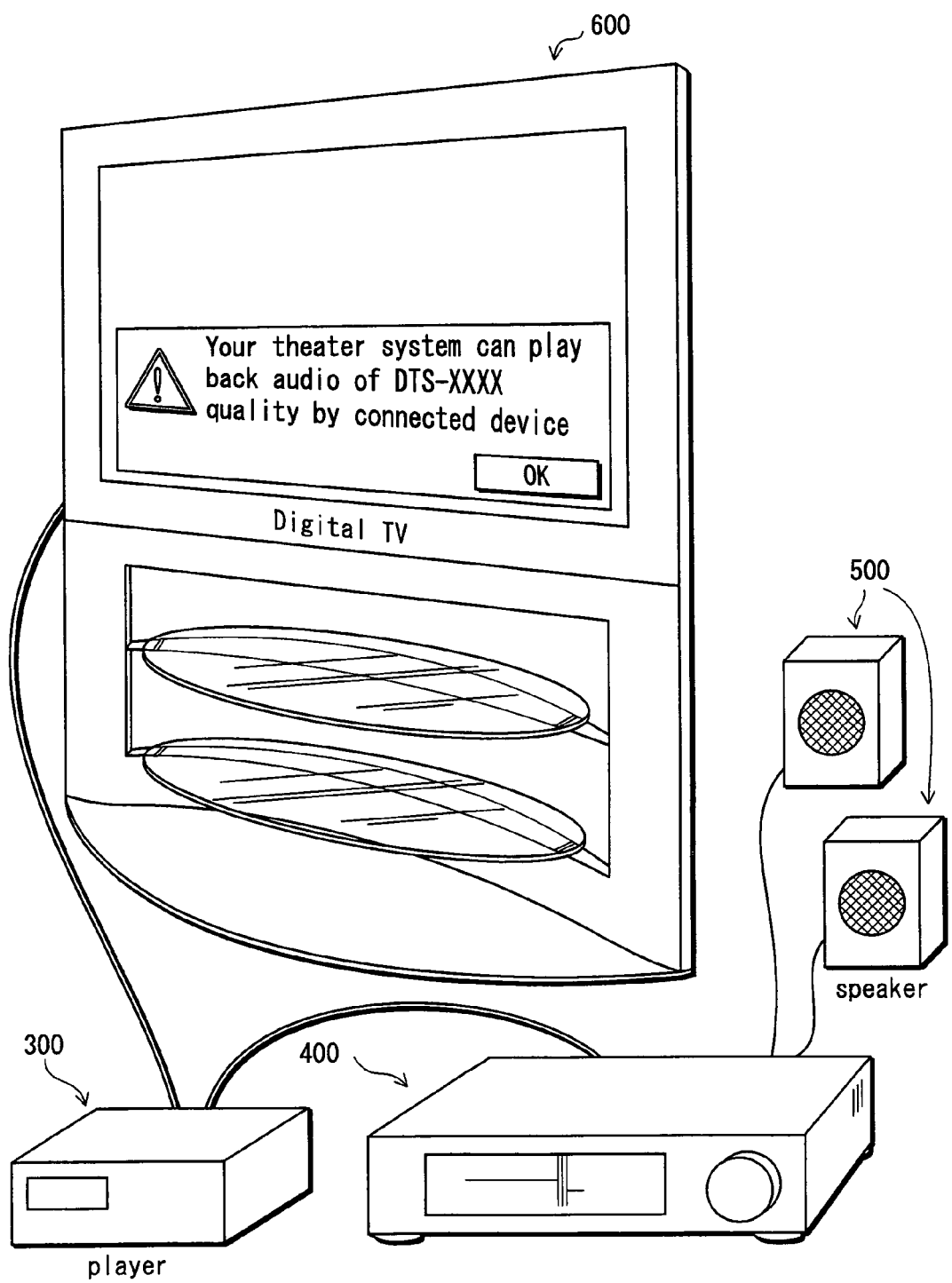
FIG. 39 shows one example of a menu showing a quality of actual audio playback.

FIG. 39 shows an example menu showing a quality of audio actually played back. In the drawing, the menu is made up of a message such as "Your theater system can play back audio of DTS-XXXX quality by connected device" and an OK button. The part "DTS-XXXX" can be any of DTS core, DTDS-ES, DTS-96/24, and DTS-HD(xLL) depending on the set value of the DTS-HD Extension capability in PSR15. This enables the user to know the actual playback audio quality in advance.

It should be noted here that, when displaying the audio quality to the user, there is no need to request confirmation from the user. In view of this, the message may be cleared from the screen after a predetermined time.

Also, the display of the actual playback audio quality may be made not with the timing of selecting an audio stream but with other timings. For example, the actual playback audio quality may be displayed when the connected device is judged as having a playback capability in step S107 of FIG. 34. When displaying the audio quality with this timing, a menu screen composed of a message such as "Your theater system can play back audio of DTS-XXXX quality by connected device. Will you decode by connected device?" and buttons "YES" and "NO" for receiving the user's selection of whether the decoding is performed by the connected device may be displayed to check whether the user wants pass-through output. In detail, when the YES button is selected on the menu, step S108 in FIG. 34 is performed to set PSR15 according to the DIB, and when the NO button is selected, step S109 is performed to select a Primary audio stream based on PSR15 corresponding to the decoding capability of the stream supply device itself.

Figure 40:
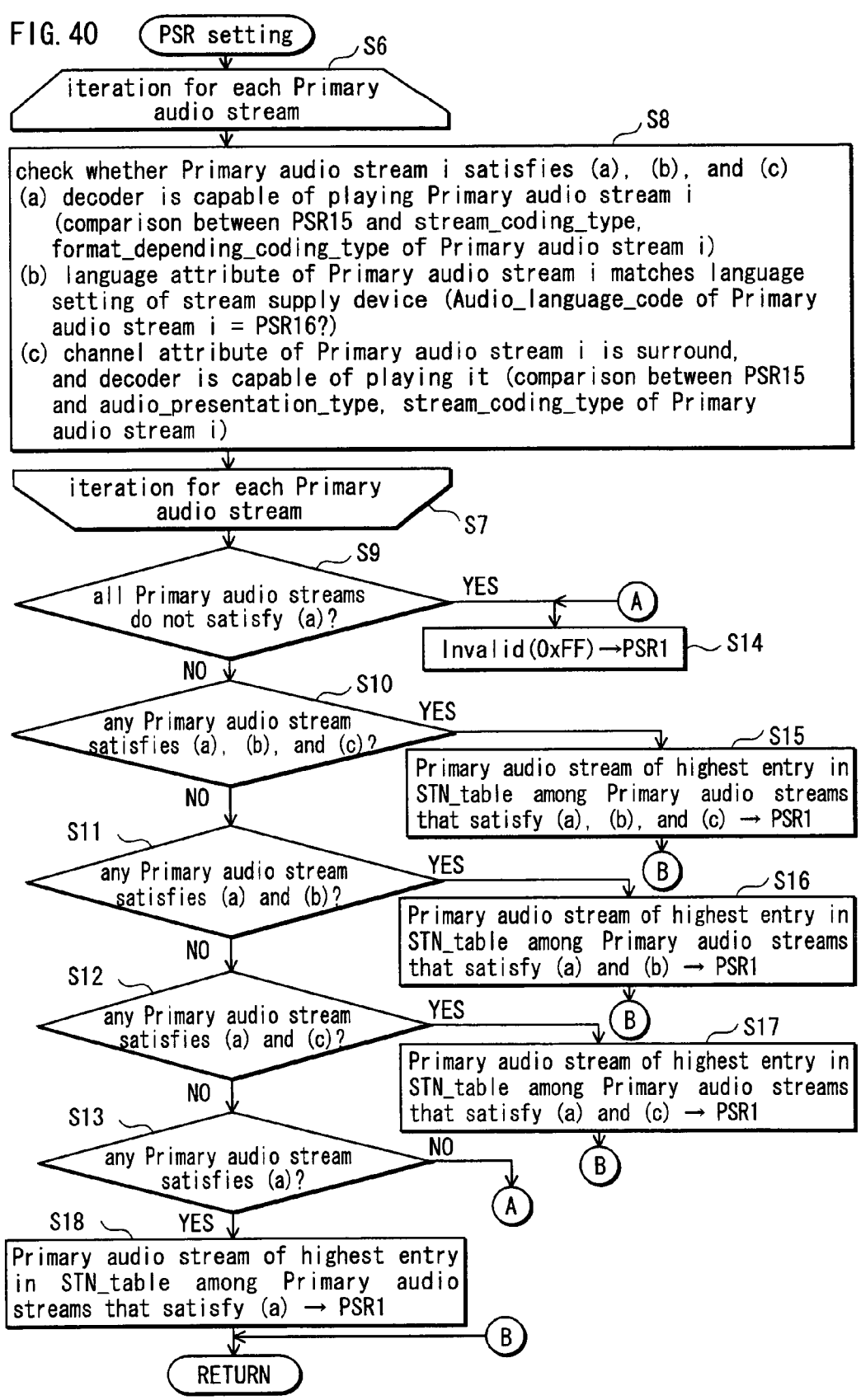
FIG. 40 is a flowchart showing detailed processing of step S5.

FIG. 40 is a flowchart of a detailed procedure of step S5.

Steps S6 and S7 form a loop in which step S8 is performed for each Primary audio stream listed in the STN_table. In this loop, a Primary audio stream subjected to processing is called Primary audio stream i. Step S8 is a judgment as to whether Primary audio stream i satisfies three conditions (a), (b), and (c).

Condition (a) is that the decoder has a capability of playing back Primary audio stream i. This judgment is made by comparing PSR15 and a stream_coding_type and a format_depending_coding_type of Primary audio stream i.

Condition (b) is that a language attribute of Primary audio stream i is same as a language setting of the stream supply device 300. This judgment is made by checking whether an Audio_language_code of Primary audio stream i shown in the STN_table matches a PSR.

Condition (c) is that a channel attribute of Primary audio stream i is surround and the decoder has a surround playback capability. This judgment is made by comparing PSR15 with an audio_presentation_type and the stream_coding_type of Primary audio stream i. In this embodiment, the decoder mentioned by conditions (a) and (c) is the decoder internal to the audio amplifier 400, as in condition (A).

Based on a pattern of conditions Primary audio stream i satisfies, that is, which conditions and how many conditions Primary audio stream i satisfies among the three conditions, a priority is given to Primary audio stream i.

After the loop is performed for each Primary audio stream, steps S9 to S13 are performed. Step S9 is a judgment as to whether no Primary audio stream satisfies condition (a). If there is no Primary audio stream which satisfies condition (a), PSR1 is set to the undefined value (0xFF) (step S14).

Step S10 is a judgment as to whether there is any Primary audio stream that satisfies all conditions (a), (b), and (c). If there is such a Primary audio stream, PSR1 is set to a stream number of that Primary audio stream (step S15).

Here, if there are two or more Primary audio streams that satisfy conditions (a), (b), and (c), these Primary audio streams are equal in priority. In such a case, one of the Primary audio streams is selected according to the order of entries in the STN_table in step S15. Which is to say, if there are two or more Primary audio streams that have a same combination of codec, language attribute, and channel attribute, one of the Primary audio streams which has a highest entry in the STN_table is selected as a highest-priority Primary audio stream.

Thus, by adjusting the order of audio stream entries in the STN_table, the author can exercise stream selection controls when authoring, i.e. the author can specify which audio stream has a higher priority in playback.

Step S11 is a judgment, made when there is no Primary audio stream that satisfies all conditions (a), (b), and (c), as to whether there is any Primary audio stream that satisfies conditions (a) and (b). If there is any Primary audio stream that satisfies conditions (a) and (b), PSR1 is set to a stream number of a Primary audio stream having a highest entry in the STN_table among the Primary audio streams satisfying conditions (a) and (b) (step S16).

Step S12 is a judgment, made when there is no Primary audio stream that satisfies all conditions (a), (b), and (c) and no Primary audio stream that satisfies conditions (a) and (b), as to whether there is any Primary audio stream that satisfies conditions (a) and (c). If there is any Primary audio stream that satisfies conditions (a) and (c), PSR1 is set to a stream number of a Primary audio stream having a highest entry in the STN_table among the Primary audio streams satisfying conditions (a) and (c) (step S17).

Step S13 is a judgment, made when there is no Primary audio stream that satisfies all conditions (a), (b), and (c), no Primary audio stream that satisfies conditions (a) and (b), and no Primary audio stream that satisfies conditions (a) and (c), as to whether there is any Primary audio stream that satisfies condition (a). If there is any Primary audio stream that satisfies condition (a), PSR1 is set to a stream number of a Primary audio stream having a highest entry in the STN_table among the Primary audio streams satisfying condition (a) (step S18).

Figure 41:
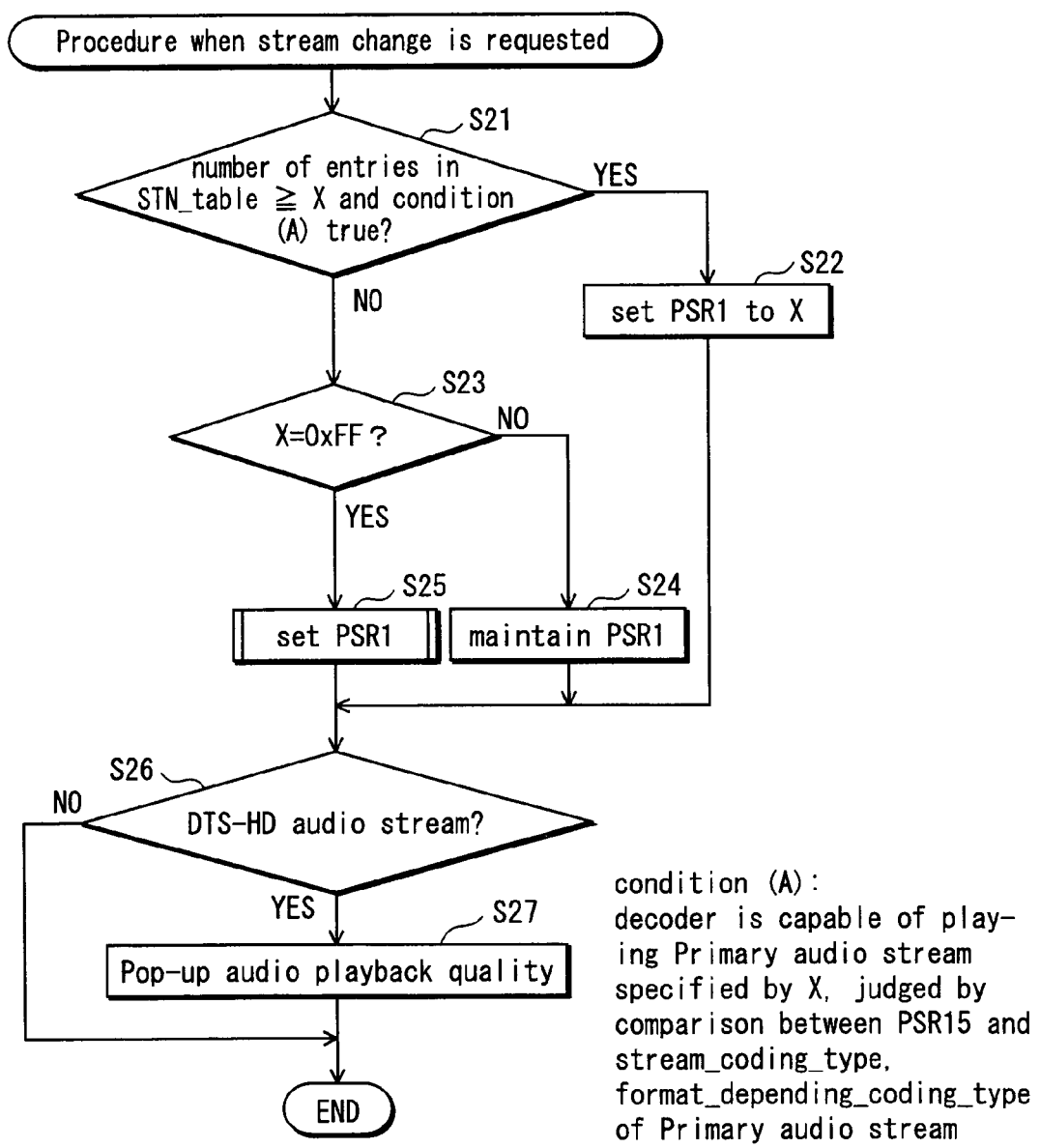
FIG. 41 is a flowchart showing a procedure of setting PSR1 upon a stream change.

This completes "Procedure when playback condition is changed". The following describes "Procedure when Stream change is requested". FIG. 41 is a flowchart of a procedure of setting PSR1 at the time of stream change. The difference between this flowchart and the flowchart of FIG. 38B lies in that PSR1 in FIG. 38B has been replaced with X. The value X is based on User Operation information output from the operation reception unit 26 or a button command output from the IG decoder 13.

In this flowchart, step S21 is a judgment as to whether the number of entries in the STN_table is no smaller than X and also condition (A) is true. Condition (A) is that the playback device is capable of playing back a Primary audio stream specified by PSR1. This judgment is made by comparing PSR15 and a Stream_coding_type and a format_depending_coding_type of the Primary audio stream. The playback device mentioned by condition (A) indicates a device which decodes the audio stream, and is the audio amplifier 400 in this embodiment. If the judgment in step S21 results in YES, PSR1 is set to X (step S22).

If X is greater than the number of entries in the STN_table or condition (A) is false, a judgment is made as to whether X is 0xFF (step S23). If X is not 0xFF, it means the Primary audio stream number requested by the user is invalid, so that the value of PSR1 is maintained with the user-designated value X being ignored (step S24).

If PSR1 is 0xFF, PSR1 is set to a new value (step S25). A procedure of step 25 is similar to the procedure shown in FIG. 40, except for the following. The judgment of step S9 is not needed in "Procedure when Stream change is requested", because "Procedure when Stream change is requested" maintains the value of PSR1 without setting PSR1 to the user-designated value X if there is no Primary audio stream that satisfies any of conditions (a), (b), and (c).

After this, if the Primary audio stream specified by PSR1 is a DTS-HD audio stream (step S26: YES), step S27 is performed to display the menu of FIG. 39 showing the actual playback audio quality of the audio amplifier 400.

<Functional Structure, Part 4: Procedure Execution Unit 43>

The Procedure execution unit 43 executes a predetermined procedure and writes a new stream number to PSR14, when one piece of PlayItem information is switched to another piece of PlayItem information or the user performs an operation of changing a stream number. The stream supply device 300 sets a Secondary audio stream corresponding to the stream number written in PSR14 as a playback target. Thus, the Secondary audio stream is selected through the PSR14 settings.

Figure 42A:
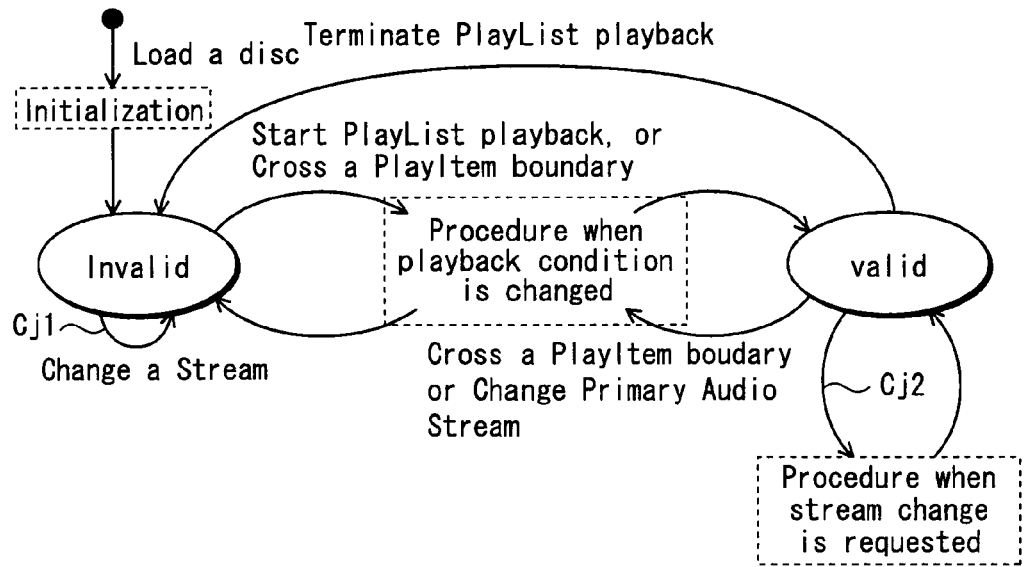
FIG. 42A shows status transitions that can be made by PSR14.

PSR14 undergoes status transitions shown in FIG. 42A by this Procedure execution unit 43.

FIG. 42A shows status transitions that can be made by PRS14. In the drawing, the term "Valid" denotes a state where PSR14 is no greater than the number of entries in the STN_table of the PlayItem and also the audio stream is decodable.

Meanwhile, the term "Invalid" denotes a state where PSR14 is 0 or greater than the number of entries in the STN_table of the PlayItem, or a state where even if the number of entries in the STN_table of the PlayItem is 1 to 32, the audio stream is not decodable.

Procedures for setting the PSR upon a status transition are schematically shown in dotted boxes in FIG. 42A. There are two types of PSR setting procedures, namely, "Procedure when playback condition is changed" and "Procedure when Stream change is requested".

"Procedure when playback condition is changed" is a procedure to run when the condition of the stream supply device changes due to the occurrence of some kind of event.

"Procedure when Stream Change is requested" is a procedure to run when the user requests some kind of change (stream change in the case of FIG. 42).

"Procedure when playback condition is changed" and "Procedure when Stream change is requested" shown in the dotted boxes are the stream selection procedures, and will be explained in detail later with reference to flowcharts.

Each arrow in FIG. 42A represents a status transition of the PSR.

A comment accompanying each arrow denotes an event which triggers a status transition. In detail, when any of "Load Disc", "Change a Stream", "Start PlayList playback", "Cross a PlayItem boundary or Change Primary Audio Stream", and "Terminate PlayList playback" occurs, PSR14 undergoes a status transition. In view of this notation, it can be understood from FIG. 42A that none of the above procedures is performed upon a status transition from Invalid to Invalid and a status transition from Valid to Invalid. On the other hand, each of a status transition from Invalid to Valid and a status transition from Valid to Valid passes one of the procedures. In other words, to set Valid PSR14, "Procedure when playback condition is changed" or "Procedure when Stream change is requested" is carried out.

The events which trigger status transitions are explained below.

"Load Disc" is an event of loading the BB-ROM to the stream supply device. Upon loading, PSR14 is initially set to an undefined value (0xFF).

"Start PlayList playback" is an event of starting playback based on a PL. When this event occurs, "Procedure when playback condition is changed" is performed, and PSR14 becomes Valid.

"Terminate PlayList playback" is an event of ending playback based on a PL. When this event occurs, "Procedure when playback condition is changed" is not performed, and PSR14 becomes Invalid.

"Change XXX" is an event of receiving a user request to switch XXX (Stream in the case of FIG. 42A). When this event occurs while PSR14 is Invalid (Cj1 in FIG. 42A), PSR14 is set to a value requested by the user. Even if this set value shows a valid audio stream number, PSR14 is treated as Invalid. Thus, a PSR which is Invalid never changes to Valid by "Change XXX".

When "Change a Stream" occurs while PSR14 is Valid (Cj2), on the other hand, "Procedure when Stream change is requested" is performed and a new value is assigned to PSR14. The value assigned to PSR14 by "Procedure when Stream change is requested" here may not be the value requested by the user. This is because "Procedure when Stream change is requested" has a function of excluding an invalid value. PSR14 which is Valid never changes to Invalid by "Change stream", since "Procedure when Stream change is requested" ensures not to make PSR14 Invalid.

"Cross a PlayItem boundary or Change Primary Audio Stream" is an event where playback crosses over a PlayItem boundary or a Primary audio stream is changed. When this event occurs while PSR14 is Valid, "Procedure when playback condition is changed" is performed. After "Procedure when playback condition is changed", PSR14 either returns to Valid or, if "Cross a PlayItem boundary or Change Primary Audio Stream" occurs, moves to Invalid. Thus, "Procedure when playback condition is changed" is performed each time playback of a PlayItem starts or a Primary audio stream is changed, so as to set PSR14 to a value optimal for the PlayItem.

Figure 42B:
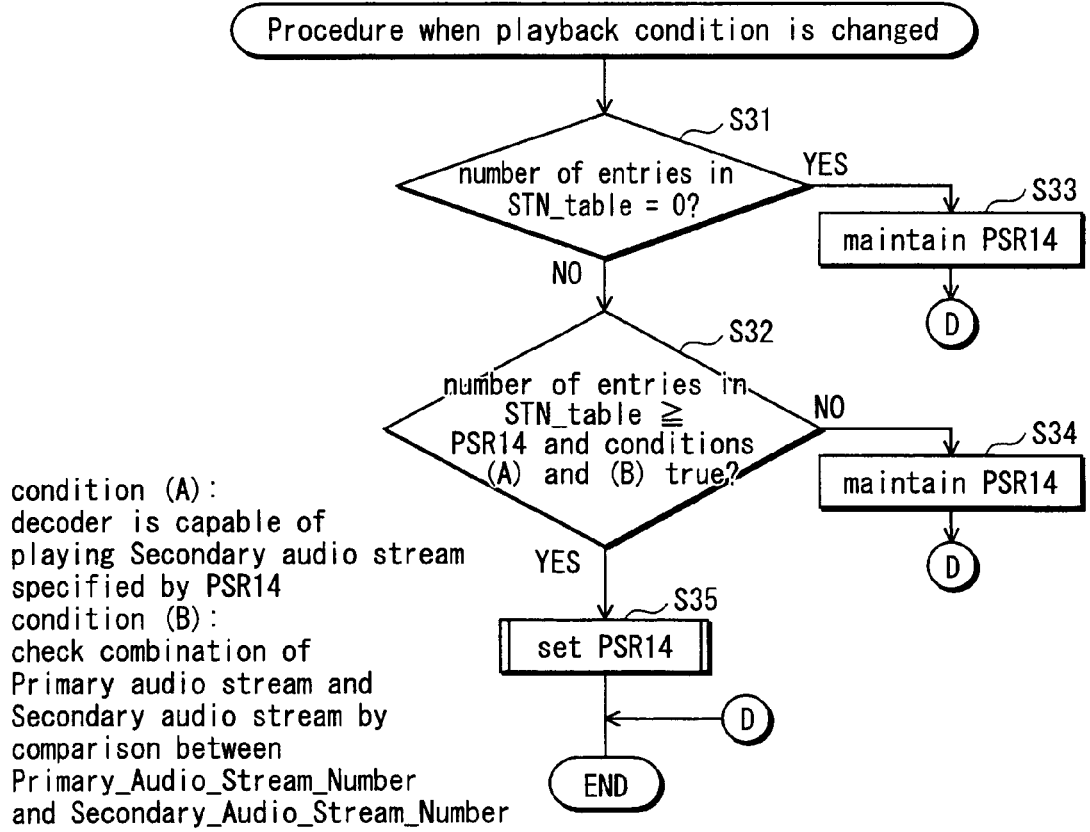
FIG. 42B shows a "Procedure when playback condition is changed" for PSR14.

In such status transitions, "Procedure when playback condition is changed" is performed as shown in FIG. 42B. This procedure sets PSR14 through a combination of two judgment steps S31 and S32.

Step S31 is a judgment as to whether the number of entries in the STN_table is 0. If the number of entries in the STN_table is 0, the value of PSR14 is maintained (step S33).

Step S32 is a judgment, made when the number of entries in the STN_table is not 0, as to whether the number of entries in the STN_table is no smaller than PSR14 and also conditions (A) and (B) are true. Condition (A) is that the playback device has a capability of playing back a Secondary audio stream specified by PSR14. In this embodiment, the decoder mentioned by condition (A) is the decoder internal to the audio amplifier 400. Condition (B) is that the combination of the Primary_Audio_Stream_Number and the Secondary_Audio_Stream_Number is permitted in the STN-table. If step S32 results in NO, the value of PSR14 is maintained (step S34). If step S32 results in YES, PSR14 is set to a new value (step S35).

Figure 43:
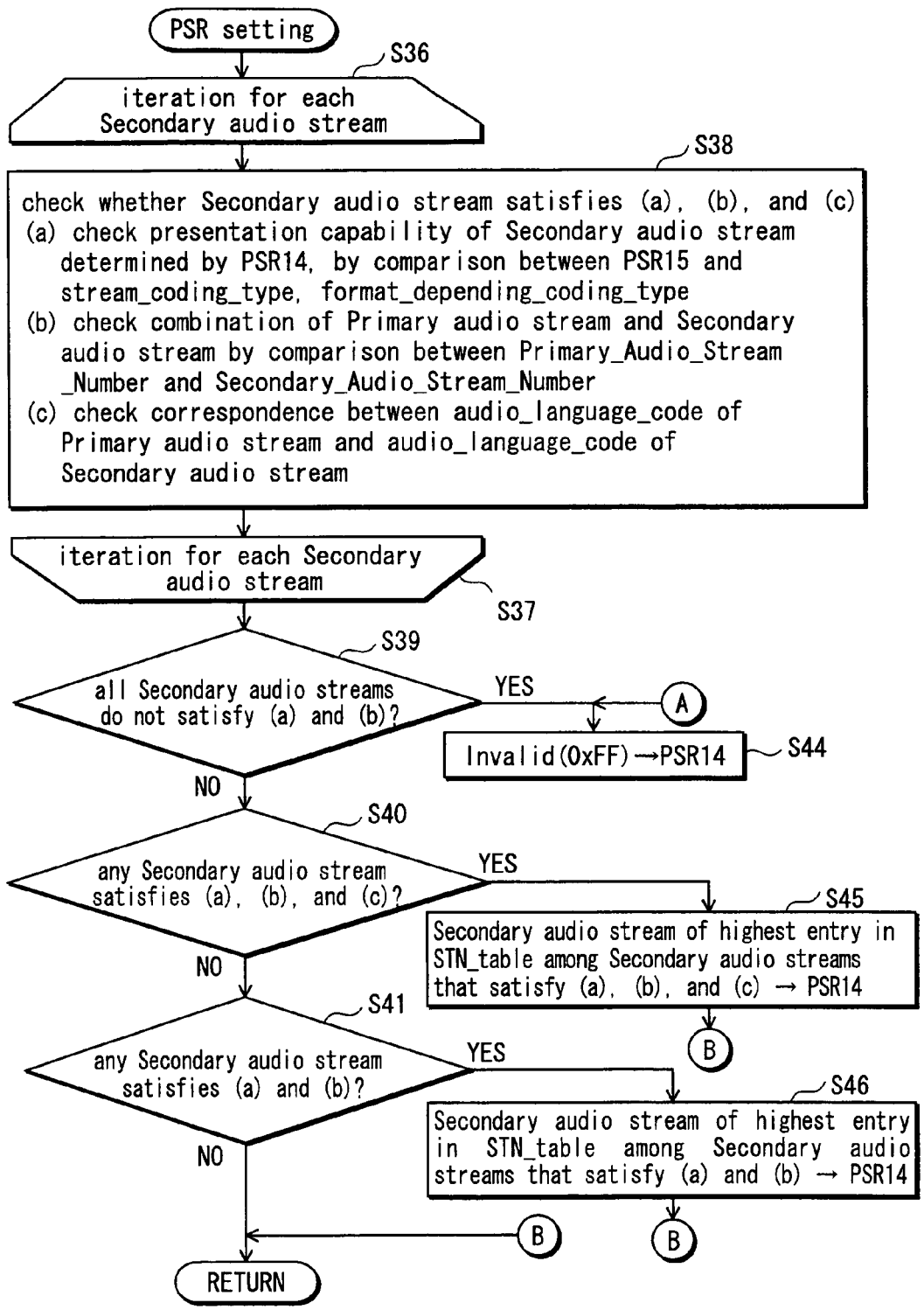
FIG. 43 is a flowchart showing detailed processing of step S35.

FIG. 43 is a flowchart of a detailed procedure of step S35.

Steps S36 and S37 form a loop in which step S38 is performed for each Secondary audio stream listed in the STN_table. In this loop, a Secondary audio stream subjected to processing is called Secondary audio stream i. Step S38 is a judgment as to whether Secondary audio stream i satisfies three conditions (a), (b), and (c).

Condition (a) is that the decoder has a capability of playing back Secondary audio stream i. This judgment is made by comparing the register showing the audio stream playback capability (PSR15) and a stream_coding_type and a format_depending_coding_type of Secondary audio stream i.

Condition (b) is that the Primary audio stream can be mixed with the Secondary audio stream. This judgment is made by checking whether the stream number specified by PSR1 is written in the Comb_info_Secondary_audio_Primary_audio of the Secondary audio stream.

Condition (c) is that a language attribute of Secondary audio stream i is same as the language setting of the stream supply device. This judgment is made by checking whether an Audio_language_code of Secondary audio stream i shown in the STN_table matches a PSR.

Based on a pattern of conditions Secondary audio stream i satisfies, that is, which conditions and how many conditions Secondary audio stream i satisfies among the three conditions, a priority is given to Secondary audio stream i.

After the loop is performed for each Secondary audio stream, steps S39 to S41 and S44 to S46 are performed. Step S39 is a judgment as to whether no Secondary audio stream satisfies conditions (a) and (b). If there is no Secondary audio stream which satisfies conditions (a) and (b), PSR14 is set to the undefined value (0xFF) (step S44).

Step S40 is a judgment as to whether there is any Secondary audio stream that satisfies all conditions (a), (b), and (c). If there is such a Secondary audio stream, PSR14 is set to a stream number of that Secondary audio stream (step S45).

Here, if there are two or more Secondary audio streams that satisfy conditions (a), (b), and (c), these Secondary audio streams are equal in priority. In such a case, one of the Secondary audio streams is selected according to the order of entries in the STN_table in step S45. Which is to say, if there are two or more Secondary audio streams that have a same combination of codec, language attribute, and channel attribute, one of the Secondary audio streams which has a highest entry in the STN_table is selected as a highest-priority Secondary audio stream.

Thus, by adjusting the order of audio stream entries in the STN_table, the author can exercise stream selection controls when authoring, i.e. the author can specify which audio stream has a higher priority for playback.

Step S41 is a judgment, made when there is no Secondary audio stream that satisfies all conditions (a), (b), and (c), as to whether there is any Secondary audio stream that satisfies conditions (a) and (b). If there is any Secondary audio stream that satisfies conditions (a) and (b), PSR14 is set to a stream number of a Secondary audio stream having a highest entry in the STN_table among the Secondary audio streams satisfying conditions (a) and (b) (step S46).

Figure 44:
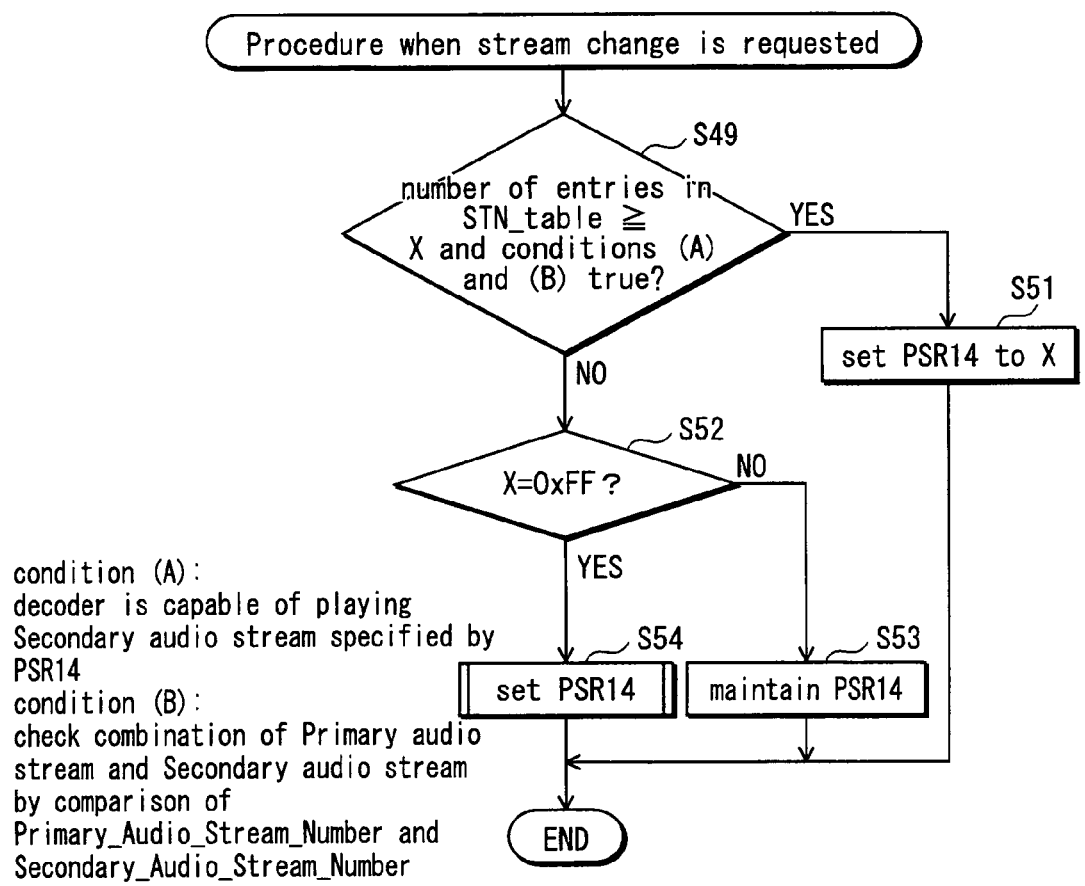
FIG. 44 is a flowchart of a procedure of setting PSR14 upon a stream change.

This completes "Procedure when playback condition is changed". The following describes "Procedure when Stream change is requested". FIG. 44 is a flowchart of a procedure of setting PSR14 at the time of stream change. The difference between this flowchart and the flowchart of FIG. 42B lies in that PSR14 in FIG. 42B has been replaced with X. The value X is based on User Operation information output from the operation reception unit 26 or a button command output from the IG-decoder 13.

In this flowchart, step S49 is a judgment as to whether the number of entries in the STN_table is no smaller than X and also conditions (A) and (B) are true. If the judgment in step S49 results in YES, PSR14 is set to X (step S51).

If X is greater than the number of entries in the STN_table or conditions (A) and (B) are false, a judgment is made as to whether X is 0xFF (step S52). If X is not 0xFF, it means the Secondary audio stream number requested by the user is invalid, so that the value of PSR14 is maintained with the user-designated value X being ignored (step S53).

If PSR14 is 0xFF, PSR14 is set to a new value (step S54). A procedure of step 54 is similar to the procedure shown in FIG. 43, except for the following. The judgment of step S39 is not needed in "Procedure when Stream change is requested", because "Procedure when Stream change is requested" maintains the value of PSR14 without setting PSR14 to the user-designated value X if there is no Secondary audio stream that satisfies any of conditions (a), (b), and (c).

This completes the description of the Procedure execution unit 43.

<Functional Structure, Part 5: Mixing Control Unit 44>

The mixing control unit 44, when a device having an audio decoding capability is connected via HDMI, controls the switch 10a so as to, instead of supplying TS packets constituting a Primary audio stream and TS packets constituting a Secondary audio stream to the audio decoders 7a and 7b, supply these elementary streams to the HDMI transmission/reception unit 27. Also, when a device having an audio decoding capability is not connected via HDMI and the Player Profile information of the stream supply device 300 is 0001b or 0011b, the mixing control unit 44 controls the mixer 9a or 9by so as to mix the playback output of the Primary audio stream with the playback output of the Secondary audio stream or the playback output of the sound data.

In the case where the current playback point on the PlayItem time axis is between the In_time and the Out_time of the SubPlayItem information or the Secondary audio stream is valid in the STN_Table of the current PlayItem information, the Secondary audio stream having the stream number stored in PSR14 is decoded by the audio decoder 7b. Accordingly, the mixing control unit 44 controls the mixer 9a so as to mix the playback output of the audio decoder 7a with the playback output of the audio decoder 7b.

When the Primary audio stream has a surround attribute, the playback output of the Secondary audio stream can be mixed after the Primary audio stream is downmixed so that only a desired component out of L, R, C, LS, RS, LR, RR, and LFE remains. Suppose the Secondary audio stream is the director's commentary. This being the case, by changing the channel of the Primary audio stream to be mixed with the Secondary audio stream in the order of L→C→R, the user can be made feel as if the director is walking around the user. Such a technique is called panning. In panning, sound of a Secondary audio stream (e.g. monaural) having fewer channels than a Primary audio stream is put to use.

When a confirmation operation is performed on a button drawn by a Java application or a button drawn by an IG stream, the mixing control unit 44 controls the mixer 9by so as to mix the sound data with either the playback output of the Primary audio stream or a result of mixing the playback output of the Primary audio stream and the playback output of the Secondary audio stream.

This completes the description of the stream supply device 300 according to this embodiment.

As described above, according to this embodiment, the stream supply device acquires a capability of the audio amplifier via a digital I/F such as HDMI, and sets PSR15 according to the acquired capability. The stream supply device then selects a Primary audio stream from the BD-ROM or the local storage based on PSR15, and pass-through outputs the selected Primary audio stream. In the case where DTS-HD is used as a coding method, a DIB indicates whether extension data is decodable or not. Therefore, an actual playback audio quality can be recognized on the part of the stream supply device beforehand.

Decoding lossless-compressed audio data requires a large amount of computation and a high processing capacity. This being so, there may be a case where the decoder can decode DTS-HD (xLL) but can only support fewer channels than when decoding DTS-ES, DTS-96/24, or the like, due to limitations in processing speed and memory capacity.

Figure 45:
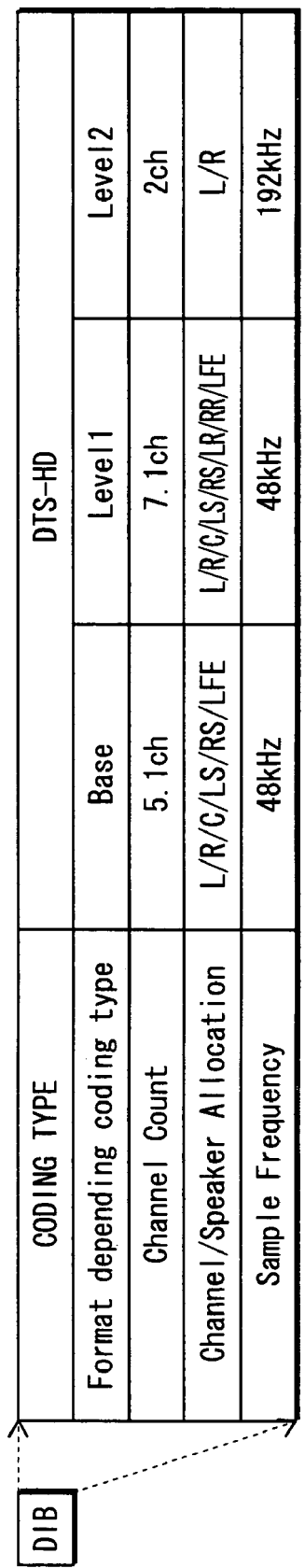
FIG. 45 shows a data structure of a DIB as a modification.

In such a case, when the CODING TYPE is DTS, the audio amplifier can notify the stream supply device of an available number of channels, speaker structure, and sampling frequency for each decodable coding method out of the DTS extension standards such as DTS-ES, DTS-96-24, and DTS-HD (xLL), by improving the DIB as shown in FIG. 45. In this way, the actual playback audio quality can be recognized more accurately on the part of the stream supply device. In the example shown in FIG. 45, the audio amplifier is capable of decoding the Core substream, the DTS-ES Extension substream, and the DTS-96/24 Extension substream. When decoding the Core substream, audio playback can be performed at 5.1 ch and 48 KHz. When decoding the DTS-ES, audio playback can be performed at 7.1 ch and 48 KHz. When decoding the DTS-96/24, audio playback can be performed at 2 ch and 196 KHz.

(Remarks)

Although the above describes the best mode contemplated by the applicant of carrying out the present invention at the time of filing, further improvements and changes can be applied to the following technical aspects. It should be noted that whether to apply these improvements and changes can be determined arbitrarily by a person who practices the invention.

(Processing for Additional Content)

It is desirable to default the stream supply device so that additional content downloaded to the local storage 200 is automatically deleted after several months or several years.

(Substitutes for PIDs)

The above embodiment describes the case where PIDs are used to distinguish a Primary audio stream and a Secondary audio stream, but it is preferable to use different stream_ids of PES packet headers when MPEG2-PS is employed.

Also, it is sufficient to distinguish a Primary audio stream and a Secondary audio stream in a system stream level so that the two audio streams can be differentiated by one demultiplexer. Alternatively, before combining the two streams together, a PID of one of the streams may be replaced so as to avoid overlaps.

(Implementation of the Control Procedures)

The control procedures shown in the flowcharts and the control procedures executed by the functional construction elements in the above embodiment are actually realized by hardware resources. In this sense, these control procedures can be regarded as the creation of a technical idea utilizing natural laws. Hence these control procedures meet the requirement as an "invention of a program".

Production of the Program According to the Present Invention

The program according to the present invention is an executable program (object program) that can be executed by a computer, and is made up of one or more pieces of program code for causing a computer to execute the individual steps of the flowcharts or functional construction elements in the above embodiment. There are various types of program code such as a processor's native code or JAVA byte code. Also, there are various methods for realizing the individual steps by program code. If each step can be realized using an external function, a call statement for calling the external function serves as program code. Also, there is a case where program code for realizing one step belongs to separate object programs. For an RISC processor which has a limited set of instructions, each step of the above flowcharts may be realized by combining an arithmetic instruction, a logic instruction, a branch instruction, and the like.

The program according to the present invention can be produced in the following manner. First, a software developer creates source programs which realize the above flowcharts and functional construction elements using a programming language. When doing so, the software developer creates such source programs that realize the above flowcharts and functional construction elements, using class structures, variables, array variables, and calls for external functions according to a syntax of the programming language.

The created source programs are supplied to a compiler as files. The compiler translates these source programs to generate object programs.

The translation by the compiler is made up of processes such as syntax analysis, optimization, resource assignment, and code generation. In the syntax analysis, lexical analysis, syntax analysis, and semantic analysis of the source programs are performed to convert the source programs to intermediate programs. In the optimization, operations such as basic blocking, control flow analysis, and data flow analysis are performed on the intermediate programs. In the resource assignment, variables in the intermediate programs are assigned to registers or memories in a target processor, in order to adapt to an instruction set of the target processor. In the code generation, each intermediate instruction in the intermediate programs is converted to program code to thereby obtain the object programs.

Having generated the object programs, a programmer activates a linker for the object programs. The linker assigns the object programs and relevant library programs to memory areas and links them together to generate a load module. Such a generated load module is presumed to be read by a computer, and causes the computer to execute the procedures of the flowcharts and the procedures of the functional construction elements in the above embodiment. As a result of the above processes, the program according to the present invention can be produced.

Example of Use of the Program according to the Present Invention

The program according to the present invention can be used as follows.

(i) Use as an Embedded Program

When using the program according to the present invention as an embedded program, the load module which is the program is written to an instruction ROM together with a basic input/output program (BIOS) and various types of middleware (operation system). The instruction ROM is then incorporated in a control unit and executed by a CPU. In this way, the program according to the present invention can be used as a control program of the stream supply device 300.

(ii) Use as an Application

When the stream supply device 300 is equipped with a hard disk, the basic input/output program (BIOS) is included in an instruction ROM, and the various types of middleware (operation system) are preinstalled in the hard disk. Also, a boot ROM for activating a system from the hard disk is provided in the stream supply device 300.

In this case, only the load module is supplied to the stream supply device 300 via a portable recording medium or a network, and installed in the hard disk as one application. As a result, the stream supply device 300 performs bootstrapping by the boot ROM to start the operation system, and has the CPU execute the application. In this way, the program according to the present invention is used.

The stream supply device 300 equipped with a hard disk can use the program according to the present invention as one application. Therefore, the program according to the present invention can independently be assigned, leased, or provided via a network.

(Controller 22)

The construction elements such as the controller 22 shown in the above embodiment can each be realized as one system LSI.

A system LSI is a circuit generated by mounting bare chips on a high-density substrate and packaging them. The system LSI includes a construction in which a plurality of bare chips have an external structure like one LSI, by mounting the plurality of bare chips on a high-density substrate and packaging them (such a system LSI is called a multi-chip module).

There are two types of packaging for a system LSI, i.e. QFP (Quad Flat Package) and PGA (Pin Grid Array). QFP is a system LSI with pins being attached to four side faces of a package. PGA is a system LSI with a large number of pins being attached to an entire bottom surface.

There pins serve as interfaces to other circuits. Since pins in a system LSI have such interface functions, the system LSI can act as a core part of the stream supply device 300 when other circuits are connected to the pins of the system LSI.

The bare chips packaged in the system LSI form a "front end part", a "back end part", and a "digital processing part". The front end part digitizes an analog signal. The back end part converts data obtained as a result of digital processing to an analog signal, and outputs the analog signal.

Each construction element shown in the internal structure diagram of the above embodiment is included in the digital processing part.

As mentioned earlier in the above "use as an embedded program" section, the load module which is the program, the basic input/output program (BIOS), and the various types of middleware (operation system) are written in the instruction ROM. Since the above embodiment especially relates to the production of the load module which is the program, the system LSI according to the present invention can be produced by packaging the instruction ROM storing the load module which is the program as a bare chip.

In actual implementation, SoC or SiP can be used and are desirable. SoC (System on Chip) is a technique of integrating multiple circuits into a single chip. SiP (System in Package) is a technique of combining multiple chips into a single package using a resin or the like. Through the above processes, the system LSI according to the present invention can be produced based on the internal structure diagram of the stream supply device 300 shown in the above embodiment.

An integrated circuit generated in the above manner is called an IC, an LSI, a super LSI, or an ultra LSI, depending on the integration degree.

Further, some or all of the construction elements of the stream supply device/the playback device may be implemented as one chip. Also, the integration is not limited to the above SoC and SiP, and may be performed using a dedicated circuit or a general process. A FPGA (Field Programmable Gate Array) that can be programmed or a reconfigurable processor capable of reconfiguring connections and settings of circuit cells in an LSI after producing the LSI may be used. Also, if an integrated circuit technique that replaces an LSI emerges from advancement of semiconductor technology or other derivative technology, such a technique can be used for the integration of the functional blocks. For instance, biotechnology may be adapted in this way.

INDUSTRIAL APPLICABILITY

The present invention can be applied to a stream playback device, a stream supply device, and the like which constitute a home theater system. The present invention is especially useful when a stream supply device for reading an audio stream from a recording medium and a stream playback device for decoding an audio stream are utilized in a state of being connected via a digital I/F such as HDMI.

The invention claimed is:

1. A stream playback device for playing back an audio stream including audio frames which are each made up of base data and extension data, the base data being for obtaining audio data with a predetermined quality, the extension data being for improving the quality of the audio data obtained by using the base data, comprising:
   a decoder; and
   an interface unit operable to receive the audio stream supplied from a stream supply device,
   wherein the stream playback device has a function of
   (i) notifying the stream supply device whether the base data is usable and whether the extension data is usable in decoding of the audio stream by the decoder, through the interface unit, and
   (ii) (a) in a case where the notification indicates that the extension data is usable, receiving the audio stream including the extension data supplied through the interface unit, without being decoded by the stream supply device, and
   (b) in a case where the notification indicates that the extension data is not usable and the stream supply device is able to decode the extension data, receiving data obtained by decoding the audio stream including the extension data by the stream supply device, supplied through the interface unit.

2. The stream playback device of claim 1, wherein
   the base data is data generated by lossy compression of predetermined audio data, such that the audio data with the predetermined quality is obtained by decoding the audio stream; and
   the extension data includes difference between data generated by lossless compression of the predetermined audio data and the base data, such that the quality of audio data obtained by using the base data by decoding the audio stream is improved.

3. The stream playback device of claim 1, wherein
   the base data is data generated by coding audio data of a predetermined number of channels, and
   the extension data includes difference between the base data and data generated by coding audio data of a larger number of channels than the predetermined number.

4. A stream supply device for selecting any of a plurality of audio streams and supplying the selected audio stream to a playback device, comprising:
   a setting unit operable to set information indicating, in a case where a decoder in the playback device decodes an audio stream including audio frames which are each made up of base data and extension data, the base data being for obtaining audio data with a predetermined quality, the extension data being for improving the quality of the audio data obtained by using the base data, whether the base data is decodable and the extension data is decodable in the decoding of the audio stream by the decoder, from the playback device; and
   an output unit operable to, in a case where the set information indicates that the extension data is decodable, output the audio stream including the extension data to the playback device without being decoded, and in a case where the set information indicates that the extension data is not decodable and the stream supply device is able to decode the extension data, output the audio data including the extension data decoded by the stream supply device, to the playback device.

5. The stream supply device of claim 4, further comprising:
   an acquisition unit operable to acquire, from the playback device, the information indicating, in a case where the decoder in the playback device decodes the audio stream, whether the base data is decodable and the extension data is decodable.

* * * * *